US012585524B2

(12) United States Patent
Hugosson et al.

(10) Patent No.: US 12,585,524 B2
(45) Date of Patent: Mar. 24, 2026

(54) FAULT HANDLING FOR ACCELERATOR-TRIGGERED MEMORY ACCESS REQUEST

(71) Applicant: Arm Limited, Cambridge (GB)

(72) Inventors: Sven Ola Johannes Hugosson, Lund (SE); Klas Magnus Bruce, Leander, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/758,195

(22) Filed: Jun. 28, 2024

(65) Prior Publication Data

US 2026/0003712 A1    Jan. 1, 2026

(51) Int. Cl.
G06F 11/00          (2006.01)
G06F 11/07          (2006.01)

(52) U.S. Cl.
CPC ...... G06F 11/0772 (2013.01); G06F 11/0787 (2013.01); G06F 11/0793 (2013.01)

(58) Field of Classification Search
CPC ............. G06F 11/0772; G06F 11/0787; G06F 11/0793
See application file for complete search history.

(56) References Cited

U.S. PATENT DOCUMENTS

| | | | |
|---|---|---|---|
| 6,480,952 B2 | 11/2002 | Gorishek, IV et al. | |
| 7,865,675 B2 | 1/2011 | Paver et al. | |
| 10,817,441 B2 | 10/2020 | Kumar | |

| | | | |
|---|---|---|---|
| 2002/0062434 A1 | 5/2002 | Chauvel et al. | |
| 2009/0216958 A1 | 8/2009 | Biles et al. | |
| 2010/0305937 A1 | 12/2010 | May | |

(Continued)

FOREIGN PATENT DOCUMENTS

GB          2597709          2/2022

OTHER PUBLICATIONS

Partial International Search Report for PCT/GB2025/051239 mailed Aug. 19, 2025, 19 pages.

(Continued)

*Primary Examiner* — Joshua P Lottich
(74) *Attorney, Agent, or Firm* — NIXON & VANDERHYE P.C.

(57) ABSTRACT

A hardware accelerator comprises accelerator processing circuitry to perform a delegated task on behalf of a processor; control interface circuitry to exchange control signals with the processor to configure the accelerator processing circuitry to perform the delegated task; fault status register storage to store fault status information, the fault status register storage being readable by the processor based on an accelerator register read request received from the processor via the control interface circuitry; and control circuitry to: detect a fault indication received from the processor via the control interface circuitry indicating that a faulting accelerator-triggered memory access request, issued via the control interface circuitry to the processor and specifying a target virtual address, has encountered an address translation fault; and in response to detecting the fault indication, set fault status information in the fault status register storage to indicate information about the faulting accelerator-triggered memory access request that encountered the address translation fault.

24 Claims, 44 Drawing Sheets

(56) References Cited

U.S. PATENT DOCUMENTS

| | | | | |
|---|---|---|---|---|
| 2011/0320860 A1* | 12/2011 | Coneski | G06F 11/0748 | |
| | | | 714/39 | |
| 2013/0031554 A1 | 1/2013 | Hou | | |
| 2014/0049548 A1 | 2/2014 | Rao et al. | | |
| 2014/0101405 A1 | 4/2014 | Papadopoulou | | |
| 2014/0156949 A1* | 6/2014 | Chakrala | G06F 11/073 | |
| | | | 711/144 | |
| 2014/0181359 A1* | 6/2014 | Zhang | G06F 12/08 | |
| | | | 711/6 | |
| 2014/0223137 A1 | 8/2014 | Alexander | | |
| 2014/0282584 A1 | 9/2014 | Feind | | |
| 2014/0333633 A1 | 11/2014 | Zhang et al. | | |
| 2015/0058614 A1 | 2/2015 | Degenaro et al. | | |
| 2016/0132329 A1 | 5/2016 | Gupte et al. | | |
| 2016/0381050 A1 | 12/2016 | Shanbhogue et al. | | |
| 2018/0314583 A1* | 11/2018 | Arimilli | G06F 12/1009 | |
| 2018/0314584 A1* | 11/2018 | Arimilli | G06F 9/45558 | |
| 2018/0314589 A1* | 11/2018 | Arimilli | G06F 13/1673 | |
| 2018/0357178 A1 | 12/2018 | Mathewson et al. | | |
| 2019/0227942 A1* | 7/2019 | Iyer | G06F 12/1036 | |
| 2020/0167291 A1* | 5/2020 | Asaro | G06F 12/1009 | |
| 2020/0341810 A1 | 10/2020 | Ranganathan et al. | | |
| 2021/0042159 A1 | 2/2021 | Rosemarine | | |
| 2022/0138140 A1 | 5/2022 | Santan | | |
| 2022/0188180 A1* | 6/2022 | Ng | G06F 11/0745 | |
| 2022/0237040 A1 | 7/2022 | Shin et al. | | |
| 2022/0261355 A1* | 8/2022 | Speier | G06F 11/0772 | |
| 2022/0309008 A1 | 9/2022 | Koufaty et al. | | |
| 2023/0050383 A1 | 2/2023 | Brewer | | |
| 2023/0168919 A1 | 6/2023 | Zhu et al. | | |
| 2023/0300728 A1 | 9/2023 | Kundu | | |
| 2024/0012564 A1 | 1/2024 | Park | | |
| 2024/0086106 A1* | 3/2024 | Muthiah | G06F 3/0659 | |

OTHER PUBLICATIONS

Arm Limited, "Programmer's Guide ARMv7 Cortex-R Series Programmer's Guide" Jan. 1, 2014, pp. 1-232.

International Search Report and Written Opinion of the International Searching Authority for PCT/GB2025/051237 mailed Jul. 16, 2025, 19 pages.
Y. Hao et al, "Supporting Address Translation for Accelerator-Centric Architectures," 2017 IEEE International Symposium on High Performance Computer Architecture (HPCA), Austi, TX, USA, 2017, pp. 37-48.
M. Gschwind, "Optimizing data sharing and address translation for the Cell BE Heterogeneous Chip Multiprocessor," 2008 IEEE International Conference on Computer Design, Lake Tahoe, CA, USA, 2008, pp. 478-485.
Notice of Allowance dated Aug. 15, 2025 for U.S. Appl. No. 18/758,207, 12 pages.
Examination Report for GB APPlication No. 2413016.3 dated Jul. 2, 2025, 4 pages.
U.S. Appl. No. 18/758,165, filed Jun. 28, 2024, Hugosson.
U.S. Appl. No. 18/758,183, filed Jun. 28, 2024, Hugosson.
U.S. Appl. No. 18/758,207, filed Jun. 28, 2024, Hugosson.
U.S. Appl. No. 18/758,216, filed Jun. 28, 2024, Hugosson.
Robert Bedichek, "Some Efficient Architecture Simulation Techniques," Proceedings of the Winter 1990 USENIX Conference, Jan. 22-26, 1990, 12 pages.
Combined Search and Examination Report for GB Application No. 2413014.8 dated Mar. 26, 2025, 6 pages.
Combined Search and Examination Report for GB Application No. 2413015.5 dated Mar. 19, 2025, 5 pages.
Combined Search and Examination Report for GB Application No. 2413029.6 dated Mar. 5, 2025, 5 pages.
Combined Search and Examination Report for GB Application No. 2413013.0 dated Mar. 21, 2025, 7 pages.
Supplement to Combined Search and Examination Report for GB Application No. 2413013.0 dated Mar. 21, 2025, 1 page.
Combined Search and Examination Report for GB Application No. 2413016.3 dated Mar. 19, 2025, 9 pages.
Office Action dated Oct. 10, 2025 for U.S. Appl. No. 18/758,183, 14 pages.
Google Scholar/Patents search—text refinded (Year: 2025), 2 pages.
Internationall Search Report and Written Opinion of the International Searching Authority for PCT/GB2025/051239 mailed Oct. 20, 2025, 26 pages.

* cited by examiner

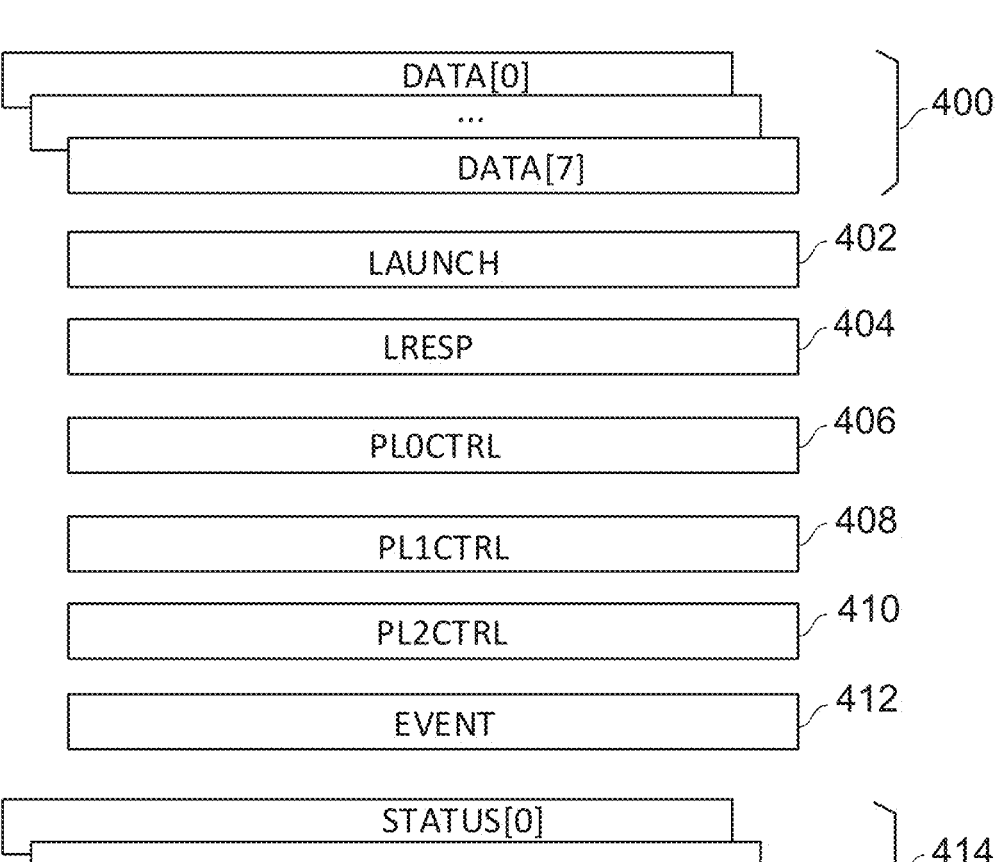

FIG. 4

| Offset* | Name | Rd/Wr | Description |
|---|---|---|---|
| 0x00 – 0x38 | DATA[0:7] | RW | Data port registers, 64byte |
| 0x40 | LAUNCH | W | Operation and command launch |
| 0x48 | LRESP | RW | Launch response (OK/PENDING/UNAVAIL/BUSY/ERROR) |
| 0x60 | PL0CTRL | RW | Per accelerator protection level 0 control |
| 0x68 | PL1CTRL | RW | Per accelerator protection level 1 control |
| 0x70 | PL2CTRL | RW | Per accelerator protection level 2 control |
| 0x78 | EVENT | R | Per accelerator event flag |
| 0x80 – 0xb8 | STATUS[0:7] | R | Per accelerator status registers |

FIG. 5

| Operation | LAUNCH [63:32] | LAUNCH [10:8] | LAUNCH [7] | LAUNCH [6:4] | LAUNCH [3:0] | DATA in | DATA out | Assign context | Supported Mode | Description |
|---|---|---|---|---|---|---|---|---|---|---|
| RESET | 0 | accid | 0 | 0 | 0b0000 | No | No | No | CMD, SR | Reset accelerator |
| CMD | 0 | accid | seq | ndata_m1 | 0b0001 | Yes | No | Yes | CMD | Launch command |
| CMDNR | 0 | accid | seq | ndata_m1 | 0b0010 | Yes | No | Yes | CMD | Launch command no response (streaming) |
| PAUSE | 0 | accid | 0 | 0 | 0b0011 | No | No | No | CMD, SR | Pause accelerator |
| ENTERSR | 0 | accid | 0 | 0 | 0b0100 | No | Yes | No | CMD, SR | Enter save/restore mode |
| EXITSR | 0 | accid | 0 | 0 | 0b0101 | Yes | No | No | SR | Exit save/restore mode |
| SAVE | 0 | accid | 0 | 0 | 0b0110 | Yes | No | Yes | SR | Launch accelerator state save |
| RESTORE | 0 | accid | 0 | 0 | 0b0111 | Yes | No | Yes | SR | Launch accelerator state restore |
| RESUME | 0 | accid | 0 | 0 | 0b1000 | No | No | Yes | CMD, SR | Resume accelerator from pause state |
| RESOLVE | 0 | accid | 0 | 0 | 0b1001 | Yes | No | No | CMD, SR | Resolve faults and exceptions |
| REGREAD | regidx | accid | 0 | ndata_m1 | 0b1010 | No | Yes | No | CMD, SR | Read accelerator register(s) |
| REGWRITE | regidx | accid | 0 | ndata_m1 | 0b1011 | Yes | No | No | CMD, SR | Write accelerator register(s) |

FIG. 6

| Bit-slice | Field name | Read/write | Description |
|---|---|---|---|
| LRESP[0] | LRESP_PENDING | R | If set, indicates a pending hardware LRESP_CODE/LRESP_ERRCODE update (read-only flag, write ignored) |
| LRESP[2:1] | LRESP_CODE | RW | Launch response code (OK/UNAVAIL/BUSY/ERROR) |
| LRESP[7:3] | LRESP_ERRCODE | RW | Error code associated with LRESP_CODE == LRESP_ERROR |
| LRESP[15] | LRESP_DATANZ | R | Set if any of the DATA[0..7] registers are non-zero (read-only flag, write ignored) |

| LRESP_ERRCODE | Name | Description |
|---|---|---|
| 0 | ERRCODE_CSINT | Command Streaming Interrupted. The accelerator became unavailable during command streaming. |
| 1 | ERRCODE_CSOF | Command Streaming Overflow. Too many consecutive launches while command streaming. |
| 2 | ERRCODE_LWPEND | Launch while pending. The LAUNCH register was written with an operation other than CMDMR when LRESP_PENDING was set. |
| 3 | ERRCODE_TIMEOUT | Timeout. Back pressure or no response from accelerator for a long time (TBD, e.g. ~1000cc). |
| 4 | ERRCODE_NOACC | No accelerator. A command was launched to an accelerator ID not present in the system. |
| 5 | ERRCODE_INVAL | Invalid arguments. Invalid content in LAUNCH or DATA[0..7] |
| ... |  |  |
| ... |  |  |
| 16 – 31 |  | Accelerator specific error codes |

FIG.7

| Bit-slice | Field name | Description |
|---|---|---|
| STATUS[0] | STATUS_AVAIL | Set if the accelerator is available. Otherwise the accelerator is unavailable and STATUS is all zero |
| STATUS[1] | reserved | Reserved. RAZ. |
| STATUS[2] | STATUS_IDLE | Set if the accelerator is idle. No current or pending work to do. |
| STATUS[3] | STATUS_READY | Set if the accelerator is ready to accept more commands |
| STATUS[4] | STATUS_FAULT | Set if the accelerator has pending MMU faults |
| STATUS[5] | STATUS_EXCPT | Set if the accelerator has a pending exception other than a MMU fault |
| STATUS[6] | STATUS_PAUSE | Set if the accelerator is paused and needs to be resumed |
| STATUS[7] | STATUS_EVENT | Set if there is a pending event |
| STATUS[8] | STATUS_SRMODE | Set if the accelerator is in save/restore mode |
| STATUS[15:9] | reserved | Reserved. RAZ. |
| STATUS[63:16] | STATUS_USER | Accelerator specific status |

FIG. 9

| Bit slice | Field name | Description |
|---|---|---|
| PLxCTRL[accid*8 + 0] | PLCTRL_AVAIL | Accelerator availability flag |
| PLxCTRL[accid*8 + 1] | PLCTRL_DBGPERM[0] | Debug permissions bit 0 |
| PLxCTRL[accid*8 + 2] | PLCTRL_DBGPERM[1] | Debug permissions bit 1 |
| PLxCTRL[accid*8 + 3] | PLCTRL_DBGPERM[2] | Debug permissions bit 2 |
| PLxCTRL[accid*8 + 4] | *reserved* | |
| PLxCTRL[accid*8 + 5] | *reserved* | |
| PLxCTRL[accid*8 + 6] | *reserved* | |
| PLxCTRL[accid*8 + 7] | *reserved* | |

FIG. 10

| Offset | Name | Rd/Wr | Register pages | | | |
|---|---|---|---|---|---|---|
| | | | PL0 | PL1 | PL2 | PL3 |
| 0x00 | DATA[0:7] | RW | normal | normal | normal | normal |
| 0x40 | LAUNCH | W | normal | normal | normal | normal |
| 0x48 | LRESP | RW | normal | normal | normal | normal |
| 0x60 | PL0CTRL | RW | raz/wi | normal | normal | normal |
| 0x68 | PL1CTRL | RW | raz/wi | raz/wi | normal | normal |
| 0x70 | PL2CTRL | RW | raz/wi | raz/wi | raz/wi | normal |
| 0x78 | EVENT | R | pl0mask | pl1mask | pl2mask | normal |
| 0x80 | STATUS[0:7] | R | pl0mask | pl1mask | pl2mask | normal |

FIG. 11

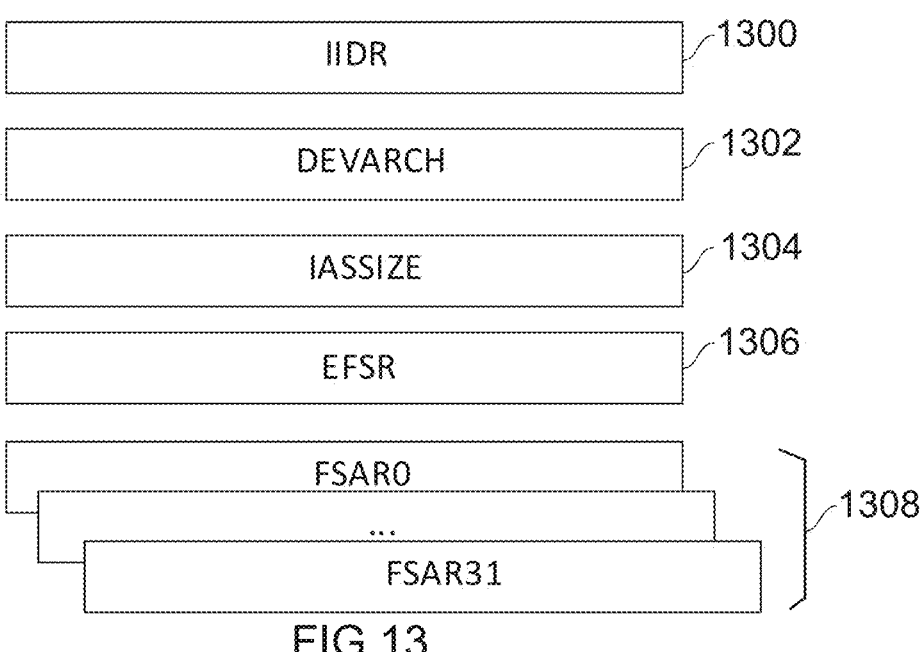

| IIDR | 1300 |
| DEVARCH | 1302 |
| IASSIZE | 1304 |
| EFSR | 1306 |

FSAR0

...

FSAR31

| Regidx | Name | Rd/Wr | Description |
|---|---|---|---|
| 0x0000 | IIDR | R | Implementation Identification Register |
| 0x0001 | DEVARCH | R | Device Architecture Register |
| 0x0002 | IASSIZE | R | Required size in bytes for the accelerator internal state buffer |
| 0x001f | EFSR | R | Exception and Fault Status Register |
| 0x0020 – 0x003f | FSAR0 – FSAR31 | R | Fault Status and Address Registers (up to 32) |

FIG.14

| Bitslice | Field name | Description |
|---|---|---|
| EFSR[31:0] | EFSR_FSARV | Fault Status and Address Register Valid (copy of the FSAR_VALID bits of the FSARn registers) |
| EFSR[32] | EFSR_EXCEPT | General Exception, i.e. an exception that is not a MMU fault. |
| EFSR[47:33] | Reserved | Reserved (RAZ) |
| EFSR[63:48] | EFSR_USER | Accelerator specific general exception information |

FIG.15

| Bit-slice | Field name | Description |
|---|---|---|
| FSARn[0] | FSAR_VALID | If set, the register indicates a valid fault page address. If not set, all 64bits of the register is zero. |
| FSARn[1] | FSAR_WRITE | If set, the fault is caused by a write access. If not set, the fault is caused by a read access. |
| FSARn[2] | FSAR_NOCTX | If set, the fault is caused by the translation context not being available |
| FSARn[11:3] | Reserved | Reserved (RAZ) |
| FSARn[63:12] | FSAR_ADDR | Address of the 4kByte page to which the faulting access(es) were made. |

FIG.16

| Request type | Header data | | | | | | [3:0] | | | | #Payload words |
|---|---|---|---|---|---|---|---|---|---|---|---|
| | TDATA[63:32] | [31:30] | [29:27] | [26:8] | [7] | [6:4] | | | | | |
| RESET | | pl | dbgperm | | | 0 | 0 | 0 | 0 | 0 | 0 |
| CMD | | pl | dbgperm | | seq | ndata_m1 | 0 | 0 | 0 | 1 | 1-8 |
| CMDNR | | pl | dbgperm | | seq | ndata_m1 | 0 | 0 | 1 | 0 | 1-8 |
| PAUSE | | pl | dbgperm | | | 0 | 0 | 0 | 1 | 1 | 0 |
| ENTERSR | | pl | dbgperm | | | 0 | 0 | 1 | 0 | 0 | 0 |
| EXITSR | | pl | dbgperm | | | 7 | 0 | 1 | 0 | 1 | 8 |
| SAVE | | pl | dbgperm | | | 0 | 0 | 1 | 1 | 0 | 1 |
| RESTORE | | pl | dbgperm | | | 0 | 0 | 1 | 1 | 1 | 1 |
| RESUME | | pl | dbgperm | | | 0 | 1 | 0 | 0 | 0 | 0 |
| RESOLVE | | pl | dbgperm | | | 0 | 1 | 0 | 0 | 1 | 1 |
| REGREAD | regidx | pl | dbgperm | | | ndata_m1 | 1 | 0 | 1 | 0 | 1-8 |
| REGWRITE | regidx | pl | dbgperm | | | ndata_m1 | 1 | 0 | 1 | 1 | 1-8 |

FIG. 18B

| Response type | Header TDATA[63:9] | [8:4] | [3:2] | [1:0] | | #Payload words |
|---|---|---|---|---|---|---|
| OK | status[63:2] | | | 0 | 0 | 0-8 |
| BUSY | status[63:2] | | | 0 | 1 | 0 |
| ERROR | 0 | errcode | 0 0 | 1 | 0 | 0 |
| RAS | 0 | | 0 1 | 1 | 0 | 4 |
| STATUS | status[63:2] | | | 1 | 1 | 0 |

FIG. 19B

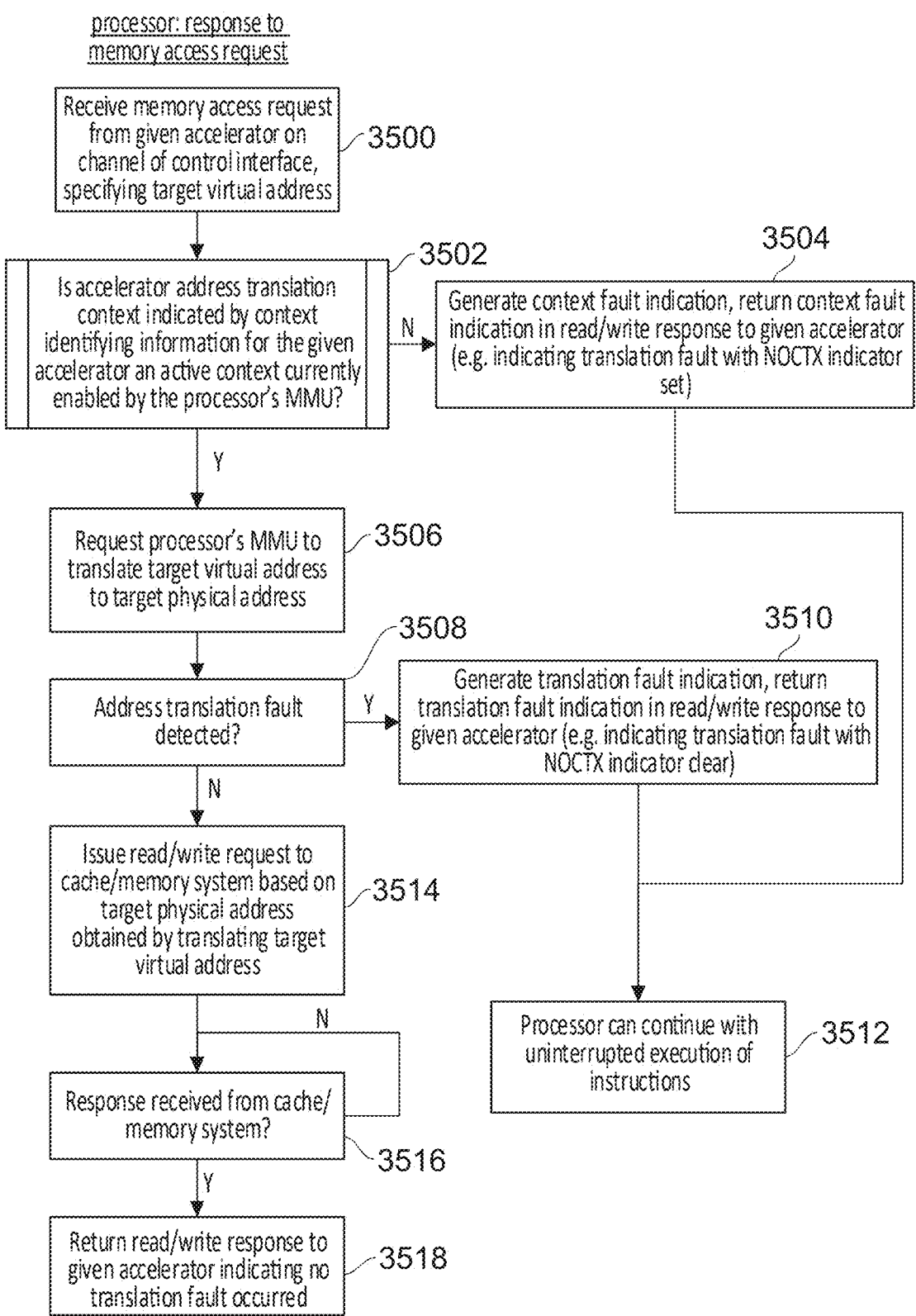

processor: response to
memory access request

Receive memory access request
from given accelerator on
channel of control interface,
specifying target virtual address — 3500

Is accelerator address translation
context indicated by context
identifying information for the given
accelerator an active context currently
enabled by the processor's MMU? — 3502

N → Generate context fault indication, return context fault
indication in read/write response to given accelerator
(e.g. indicating translation fault with NOCTX indicator
set) — 3504

Y

Request processor's MMU to
translate target virtual address
to target physical address — 3506

Address translation fault
detected? — 3508

Y → Generate translation fault indication, return
translation fault indication in read/write response to
given accelerator (e.g. indicating translation fault with
NOCTX indicator clear) — 3510

N

Issue read/write request to
cache/memory system based on
target physical address
obtained by translating target
virtual address — 3514

Response received from cache/
memory system? — 3516

N

Y

Return read/write response to
given accelerator indicating no
translation fault occurred — 3518

Processor can continue with
uninterrupted execution of
instructions — 3512

FIG. 35

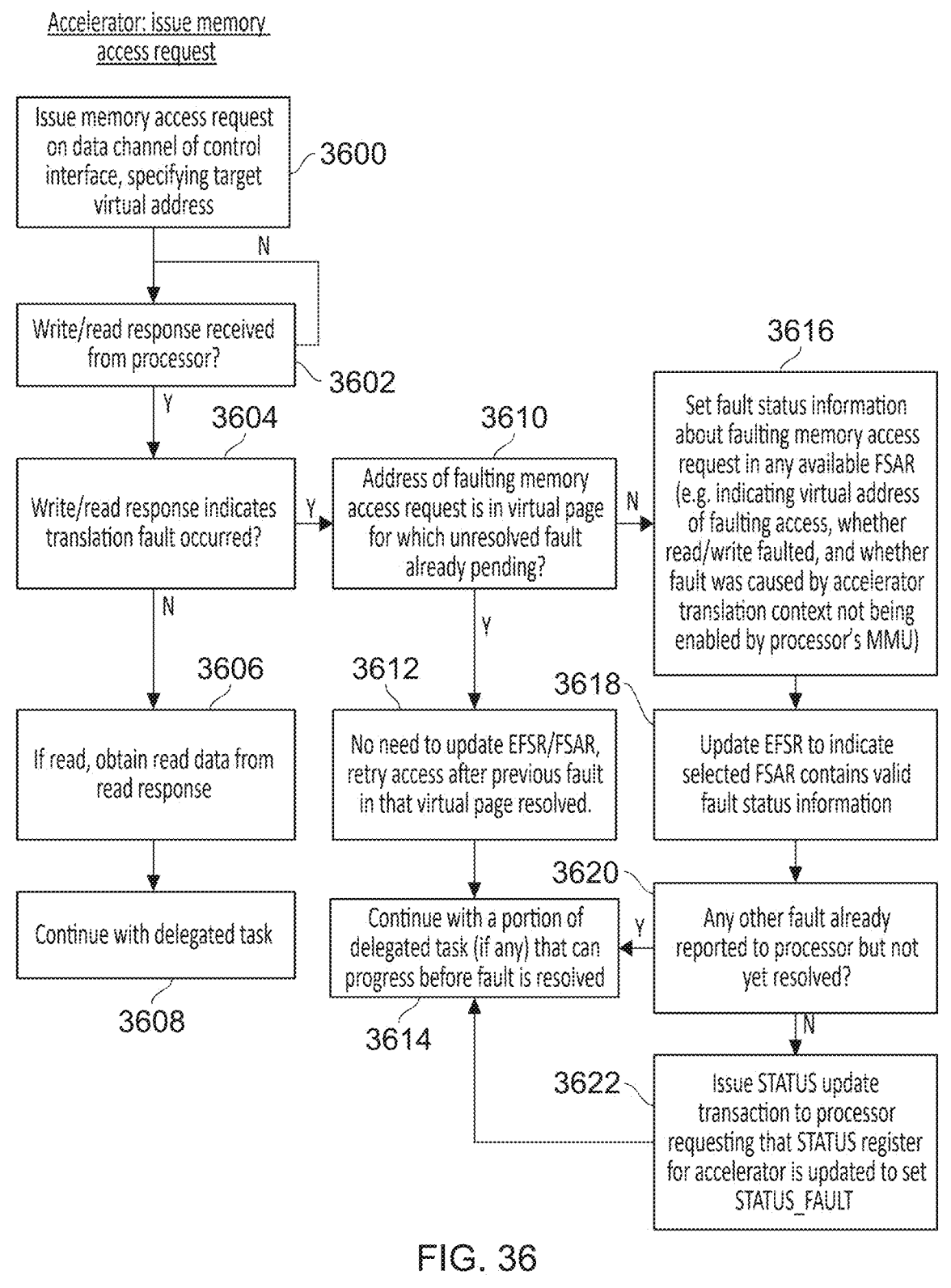

Accelerator: issue memory
access request

Issue memory access request
on data channel of control
interface, specifying target
virtual address — 3600

Write/read response received
from processor?   3602   N

Y   3604

Write/read response indicates
translation fault occurred?

N

3606

If read, obtain read data from
read response

Continue with delegated task

3608

3610

Address of faulting memory
access request is in virtual page
for which unresolved fault
already pending?   N

Y

3612

No need to update EFSR/FSAR,
retry access after previous fault
in that virtual page resolved.

Continue with a portion of
delegated task (if any) that can
progress before fault is resolved

3614

3616

Set fault status information
about faulting memory access
request in any available FSAR
(e.g. indicating virtual address
of faulting access, whether
read/write faulted, and whether
fault was caused by accelerator
translation context not being
enabled by processor's MMU)

3618

Update EFSR to indicate
selected FSAR contains valid
fault status information

3620

Any other fault already
reported to processor but not
yet resolved?   Y

N

3622

Issue STATUS update
transaction to processor
requesting that STATUS register
for accelerator is updated to set
STATUS_FAULT

FIG. 36

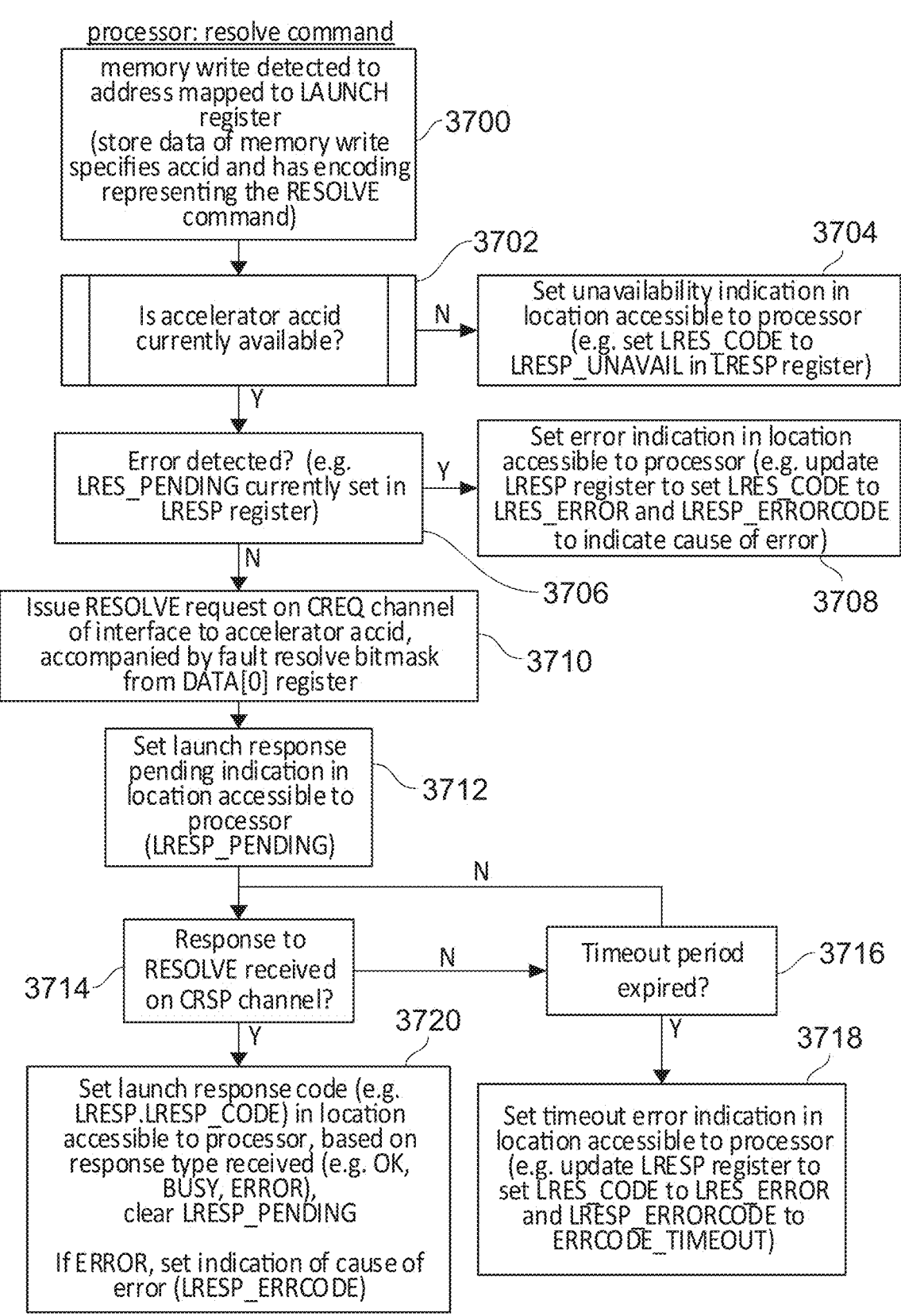

processor: resolve command memory write detected to address mapped to LAUNCH register
(store data of memory write specifies accid and has encoding representing the RESOLVE command) — 3700

Is accelerator accid currently available? — 3702

N → Set unavailability indication in location accessible to processor (e.g. set LRES_CODE to LRESP_UNAVAIL in LRESP register) — 3704

Y

Error detected? (e.g. LRES_PENDING currently set in LRESP register) — Y → Set error indication in location accessible to processor (e.g. update LRESP register to set LRES_CODE to LRES_ERROR and LRESP_ERRORCODE to indicate cause of error) — 3708

3706

N

Issue RESOLVE request on CREQ channel of interface to accelerator accid, accompanied by fault resolve bitmask from DATA[0] register — 3710

Set launch response pending indication in location accessible to processor (LRESP_PENDING) — 3712

N

Response to RESOLVE received on CRSP channel? — 3714

N → Timeout period expired? — 3716

Y

Set launch response code (e.g. LRESP.LRESP_CODE) in location accessible to processor, based on response type received (e.g. OK, BUSY, ERROR), clear LRESP_PENDING If ERROR, set indication of cause of error (LRESP_ERRCODE) — 3720

Y → Set timeout error indication in location accessible to processor (e.g. update LRESP register to set LRES_CODE to LRES_ERROR and LRESP_ERRORCODE to ERRCODE_TIMEOUT) — 3718

FIG. 37

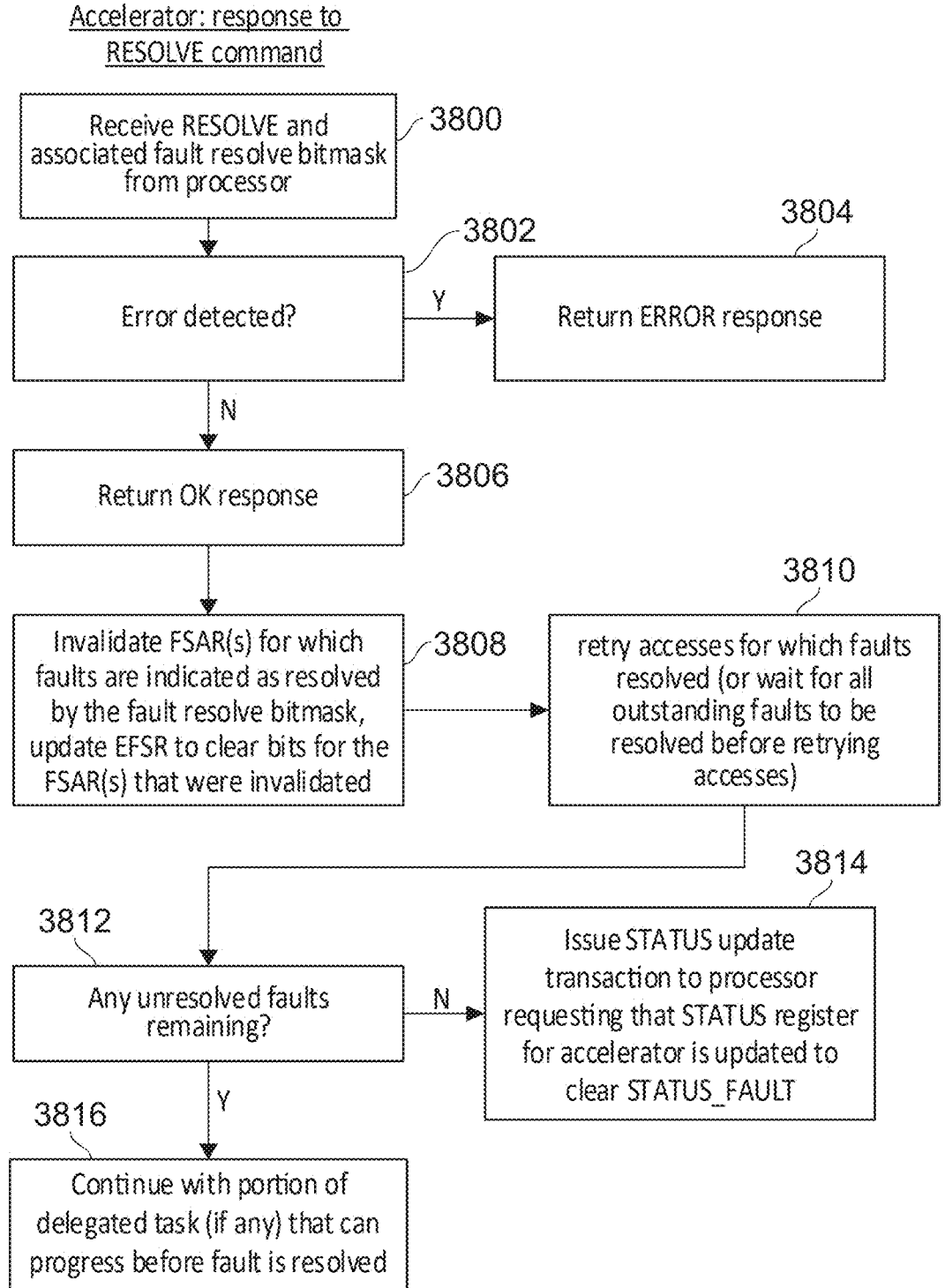

Accelerator: response to
RESOLVE command

Receive RESOLVE and associated fault resolve bitmask from processor — 3800

Error detected? — 3802
Y → Return ERROR response — 3804

N

Return OK response — 3806

Invalidate FSAR(s) for which faults are indicated as resolved by the fault resolve bitmask, update EFSR to clear bits for the FSAR(s) that were invalidated — 3808 retry accesses for which faults resolved (or wait for all outstanding faults to be resolved before retrying accesses) — 3810

Any unresolved faults remaining? — 3812
N → Issue STATUS update transaction to processor requesting that STATUS register for accelerator is updated to clear STATUS_FAULT — 3814

Y

Continue with portion of delegated task (if any) that can progress before fault is resolved — 3816

FIG. 38

Processor: Compound command launch

Processor: Compound command launch
error detection

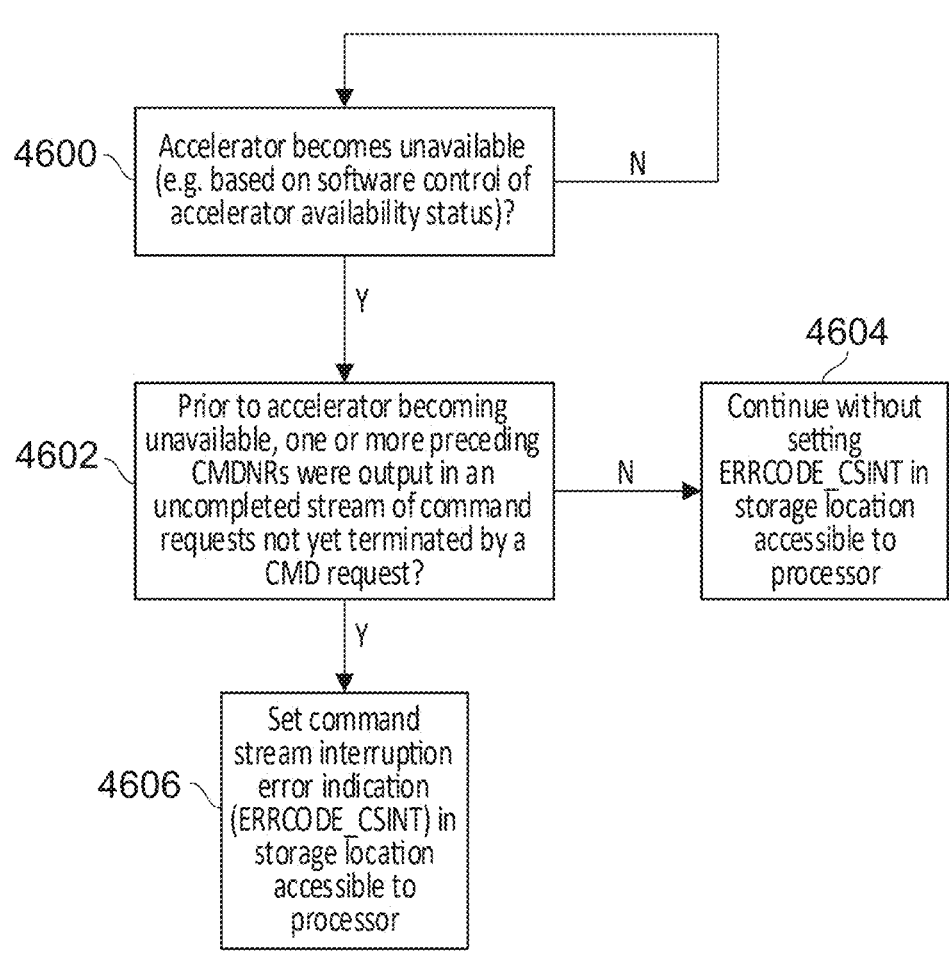

4600 — Accelerator becomes unavailable (e.g. based on software control of accelerator availability status)?

N

Y

4602 — Prior to accelerator becoming unavailable, one or more preceding CMDNRs were output in an uncompleted stream of command requests not yet terminated by a CMD request?

N

4604 — Continue without setting ERRCODE_CSINT in storage location accessible to processor

Y

4606 — Set command stream interruption error indication (ERRCODE_CSINT) in storage location accessible to processor

FIG. 46

FAULT HANDLING FOR ACCELERATOR-TRIGGERED MEMORY ACCESS REQUEST

BACKGROUND

Technical Field

The present technique relates to the field of data processing.

Technical Background

A data processing system may include at least one hardware accelerator, to which software executing on processing circuitry can offload processing of a delegated task. This can allow the delegated task to be carried out asynchronously in the background of other tasks being processed based on instructions executed by the processing circuitry. A hardware accelerator may comprise hardware circuit logic designed to handle a specific function (such as matrix multiplication, cryptographic processing or manipulation of data structures stored in memory) more efficiently than could be achieved on a general purpose processor.

SUMMARY

At least some examples of the present technique provide a hardware accelerator comprising: accelerator processing circuitry to perform a delegated task on behalf of a processor; control interface circuitry to exchange control signals with the processor to configure the accelerator processing circuitry to perform the delegated task; fault status register storage to store fault status information, the fault status register storage being readable by the processor based on an accelerator register read request received from the processor via the control interface circuitry; and control circuitry to: detect a fault indication received from the processor via the control interface circuitry indicating that a faulting accelerator-triggered memory access request, issued via the control interface circuitry to the processor and specifying a target virtual address, has encountered an address translation fault; and in response to detecting the fault indication, set fault status information in the fault status register storage to indicate information about the faulting accelerator-triggered memory access request that encountered the address translation fault.

At least some examples of the present technique provide a processor comprising: control interface circuitry to exchange control signals with at least one hardware accelerator configurable, based on instructions executed by processing circuitry, to perform a delegated task; and control circuitry to: in response to an address translation fault being detected for an accelerator-triggered memory access request received via the control interface circuitry from a given hardware accelerator and specifying a target virtual address, issue a fault indication to the given hardware accelerator via the control interface circuitry; and in response to an accelerator register read instruction specifying the given hardware accelerator and indicating that at least a portion of fault status register storage of the given hardware accelerator is to be read in response to the accelerator register read instruction: issue an accelerator register read request via the control interface circuitry to the given hardware accelerator requesting that the given hardware accelerator returns fault status information specified in said at least a portion of the fault status register storage of the given hardware accelerator; and store the fault status information returned by the given hardware accelerator in at least one software-readable storage location.

At least some examples of the present technique provide a system comprising the hardware accelerator described above and the processor described above.

At least some examples of the present technique provide a system comprising: the hardware accelerator and/or the processor described above, implemented in at least one packaged chip; at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide computer-readable code for fabrication of the hardware accelerator or the processor described above.

At least some examples of the present technique provide a method comprising: executing instructions using processing circuitry; in response to memory access instructions executed by the processing circuitry, performing address translation using memory management circuitry associated with the processing circuitry; via accelerator control interface circuitry, exchanging control signals with at least one hardware accelerator configurable, based on instructions executed by the processing circuitry, to perform a delegated task; and in response to an accelerator-triggered memory access request received at the accelerator control interface circuitry from a given hardware accelerator, translating, using the memory management circuitry associated with the processing circuitry, a virtual address specified by the accelerator-triggered memory access request to a physical address of a memory system location to be accessed in response to the accelerator-triggered memory access request.

At least some examples provide a computer program for controlling a host data processing apparatus to provide an instruction execution environment, the computer program comprising: processing program logic to execute instructions; and accelerator control program logic to control at least one simulated hardware accelerator configurable, based on instructions executed by the processing program logic, to perform a delegated task; wherein: in response to an address translation fault being detected for an accelerator-triggered memory access request triggered by a given simulated hardware accelerator and specifying a target virtual address, the accelerator control program logic is configured to issue a fault indication to the given simulated hardware accelerator via the control interface circuitry; and in response to an accelerator register read instruction processed by the processing program logic specifying the given simulated hardware accelerator and indicating that at least a portion of fault status register storage of the given simulated hardware accelerator is to be read in response to the accelerator register read instruction, the accelerator control program logic is configured to request return of fault status information specified in said at least a portion of the fault status register storage of the given simulated hardware accelerator, and to store the fault status information returned for the given simulated hardware accelerator in at least one software-readable storage location.

BRIEF DESCRIPTION OF THE DRAWINGS

FIG. 4 schematically illustrates an example set of memory-mapped control registers provided in a CPU for controlling operation of one or more core local hardware accelerators;

FIG. 5 is a table providing a description of the control registers illustrated in FIG. 4;

FIG. 6 is a table providing example encodings of a LAUNCH control register;

FIG. 7 illustrates tables providing example encodings of the LRESP control register and the LRESP_ERRCODE field provided by the LRESP control register;

FIG. 9 is a table providing example encodings of a STATUS control register;

FIG. 10 is a table providing example encodings of a protection level control register;

FIG. 11 is a table indicating accessibility of the set of memory-mapped control registers to particular protection levels;

FIG. 13 schematically illustrates an example set of control registers provided in a hardware accelerator;

FIG. 14 is a table providing a description of the control registers illustrated in FIG. 13;

FIG. 15 is a table providing example encodings of an EFSR control register;

FIG. 16 is a table providing example encodings of an FSAR control register;

FIGS. 18A and 18B provide example encodings of a transaction on the CREQ channel from a CPU to a hardware accelerator;

FIGS. 19A and 19B provide example encodings of a transaction on the CRSP channel from a hardware accelerator to the CPU;

FIG. 35 is a flow diagram illustrating a process carried out by a CPU for responding to an accelerator-triggered memory access request;

FIG. 36 is a flow diagram illustrating a process carried out by a hardware accelerator for responding to the outcome of an accelerator-triggered memory access request;

FIG. 37 is a flow diagram illustrating a process carried out by a CPU for issuing a RESOLVE transaction to a hardware accelerator;

FIG. 38 is a flow diagram illustrating a process carried out by a hardware accelerator in response to a RESOLVE transaction;

FIG. 46 is a flow diagram illustrating steps taken by the CPU for detecting an error during launch of a compound command;

DESCRIPTION OF EXAMPLES

Figure 1:
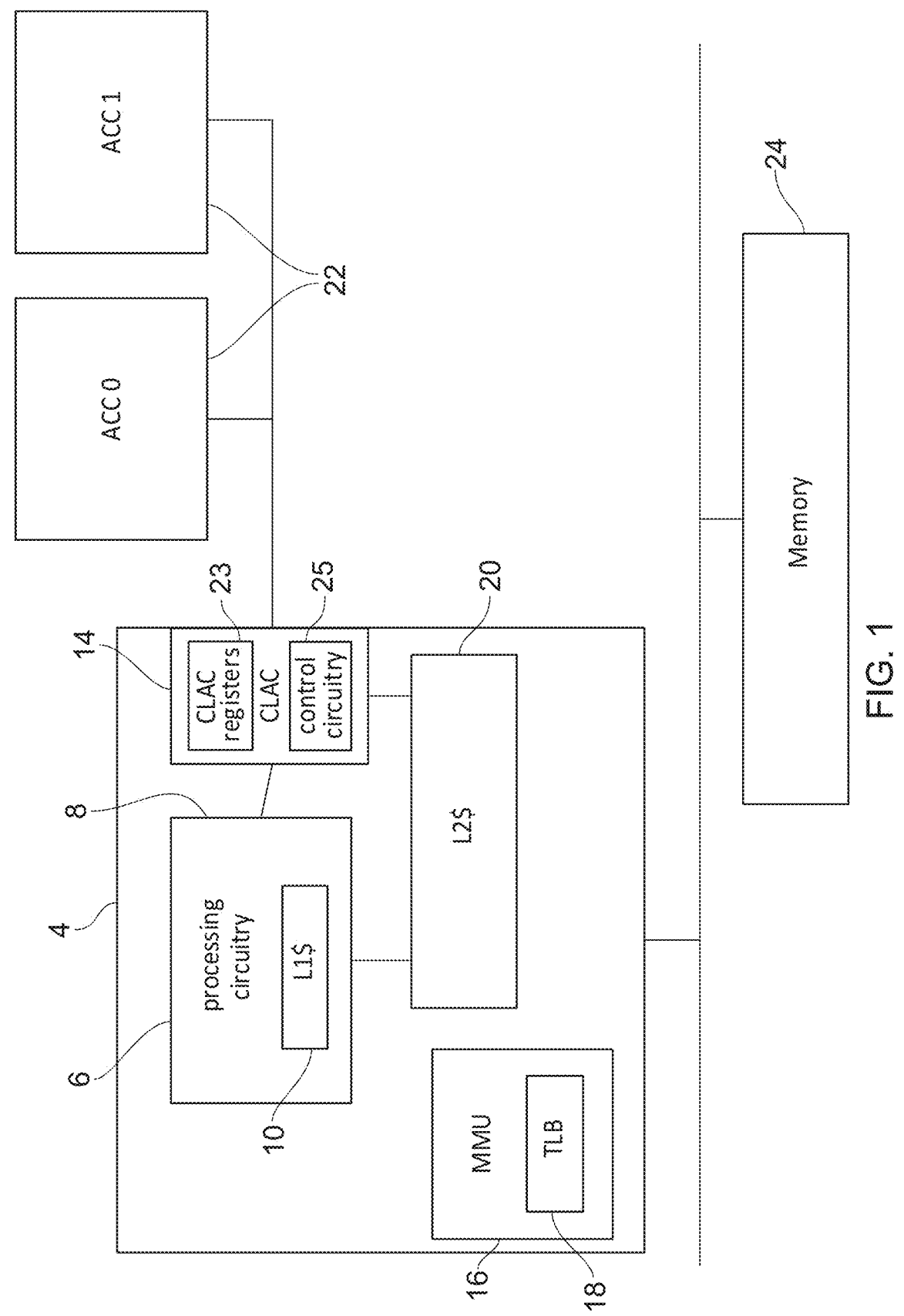
FIG. 1 schematically illustrates a data processing apparatus including a central processing unit (CPU) and hardware accelerators according to the present techniques.

In some examples, an apparatus comprises processing circuitry to execute instructions, memory management circuitry associated with the processing circuitry, to perform address translation in response to memory access instructions executed by the processing circuitry, and accelerator control interface circuitry to exchange control signals with at least one hardware accelerator configurable, based on instructions executed by the processing circuitry, to perform a delegated task. In response to an accelerator-triggered memory access request received at the accelerator control interface circuitry from a given hardware accelerator, the memory management circuitry translates a virtual address specified by the accelerator-triggered memory access request to a physical address of a memory system location to be accessed in response to the accelerator-triggered memory access request.

Hence, the hardware accelerator accesses the memory system using virtual addresses, and reuses the memory management circuitry of the processing circuitry for address translation. This differs from conventional hardware accelerator implementations, which would either access memory using physical addresses to avoid any need for accelerator-triggered memory accesses to be subject to address translation at all, or route accelerator-triggered memory accesses via system memory management circuitry separate from the memory management circuitry associated with the processing circuitry.

As the accelerator-triggered memory access requests specify virtual addresses, and the memory management circuitry of the processing circuitry is reused to translate the virtual addresses specified by a hardware accelerator, this greatly reduces the software complexity in configuring the hardware accelerator, as the hardware accelerator can simply see the same virtual address space as the process running on the processing circuitry that configured the hardware accelerator to perform the delegated task. Unlike systems where physical addresses are used for accelerator-triggered accesses, there is no need for use of memory pinning (software locking of page table entries that map the physical memory used by a hardware accelerator, to prevent those regions of physical memory being reallocated for other purposes until the accelerator has completed its task using that physical memory). Such memory pinning would typically incur a performance cost because a more privileged piece of software may need to be called to manage the memory pinning, interrupting the process that is requesting use of the hardware accelerator. Also, avoiding the need for a separate system memory management unit to translate accelerator accesses helps reduce software control overhead as typically the system memory management unit may have an entirely separate set of control structures configurable by software, compared to the control structures used to control the memory management circuitry associated with the processing circuitry. Hence, reusing the processing circuitry's memory management circuitry (which is also used for translations performed in response to memory access instructions executed by the processing circuitry) for translation of accelerator-triggered memory access requests is helpful for reducing the software overheads associated with configuring the accelerator. This can make it more feasible for the accelerator to be used for relatively short delegated tasks for which the configuration overhead would otherwise be prohibitive, thus giving more opportunities to free the main processing circuitry for other purposes, and hence helping to improve processing performance in the system as a whole.

The hardware accelerator may be configured to perform the delegated task asynchronously with respect to processing of the instructions by the processing circuitry. This contrasts with instructions executed synchronously on a processing pipeline of the processing circuitry.

In some examples, the memory management circuitry may translate the virtual address of the accelerator-triggered memory access request according to address mapping information associated with the virtual address and a given address translation context. The given address translation context comprises an address translation context which was a current address translation context of the processing circuitry at the time of execution of an instruction which causes launch of an accelerator command which causes the accelerator-triggered memory access request to be issued. Hence, the hardware accelerator, once launched to process a given accelerator command, is associated with the same address translation context as the context which was current at the time of launch of the command. This greatly simplifies software overheads for configuring the hardware accelerator, as there is no need for any special control operations to manage accelerator memory, as the hardware accelerator simply operates within the same address translation context as the process which configured the hardware accelerator. It is possible that the current address translation context of the processing circuitry could subsequently change, before the hardware accelerator has completed its delegated task. In that case, the hardware accelerator may remain associated with the translation context which was previously the current address translation context at the time that the accelerator command was launched.

Hence, the accelerator control interface circuitry may be configured to set context identifying information defining an address translation context associated with the given hardware accelerator. In response to an instruction which causes launch of an accelerator command which causes the given hardware accelerator to perform the delegated task, the accelerator control interface circuitry may set the context identifying information to indicate a current address translation context of the processing circuitry as the address translation context associated with the given hardware accelerator. Hence, the current context of the processing circuitry is captured at the time of launch of an accelerator command, so that on receipt of accelerator-triggered memory access requests via the accelerator control interface circuitry, the context which was current at the time of command launch can be identified, even if there has been a subsequent change in the current address translation context of the processing circuitry since the command was launched.

Context fault generating circuitry may be provided to generate a context fault indication in response to detecting, in response to the accelerator-triggered memory access request received from the given hardware accelerator, that the address translation context indicated by the context identifying information for the given hardware accelerator is not an active translation context currently enabled by the memory management circuitry. The number of active translation contexts currently enabled by the memory management circuitry could be one, two or more. The active translation contexts may be associated with control registers defining information for enabling translation table data to be obtained from memory for a given translation context (e.g. the control registers may define a translation table base address and/or translation table format information indicative of a format of a translation table structure). As there may be both a hardware overhead and a software control overhead associated with supporting additional active translation contexts simultaneously, the number of active translation contexts could be limited, and so it is possible that, following one or more context switches at the processing circuitry, the address translation context indicated by the address context identifying information for a given hardware accelerator may no longer be an active context at the time that the given hardware accelerator issues a memory access request. In that scenario, it can be useful to generate a context fault indication, to indicate that the given hardware accelerator may no longer be able to make forward progress until its associated address translation context indicated by the context identifying information becomes active once more.

In some examples the context fault indication may be returned to the given hardware accelerator in response to the accelerator-triggered memory access request for which the inactive translation context was detected. This can help support an asynchronous fault reporting mechanism (rather than signalling a synchronous fault to the processing circuitry immediately on detecting an accelerator-triggered access associated with a currently inactive address translation context), which can be simpler for software to deal with, because the software executing at the time the inactive context fault is detected may not necessarily be the software that configured the given hardware accelerator to perform its task, so it may be confusing for that unrelated software to be presented with an indication of a fault caused by the memory access requested by the given hardware accelerator. By returning the fault indication to the given hardware accelerator, the accelerator can record information about the fault which can later be queried by the software that configured the given hardware accelerator to perform its task.

The at least one hardware accelerator may be private to a processor core comprising the processing circuitry. Hence, the hardware accelerator may be tightly coupled to a specific processor core and may not be shareable with other processor cores. This differs from other hardware accelerator designs where a shared accelerator is provided further out in the memory system which is able to be used by any of two or more processor cores.

In some examples, the apparatus comprises at least one shared private cache accessible both to a processor core comprising the processing circuitry and to the at least one hardware accelerator. The private cache is a cache accessible to that processor core and the at least one hardware accelerator but is inaccessible to any other processor core. In some examples the private cache may be a level-two cache (the processor core also having a level-one cache which may not be accessible to the at least one hardware accelerator).

In some examples, the at least one hardware accelerator may be configurable based on instructions executed by the processing circuitry in an operating state with user-level privilege. For example, the user-level privilege may be the least privileged level of privilege supported by the processing circuitry (e.g. a state less privileged than an operating system level of privilege). Allowing user-level software to directly configure the hardware accelerator becomes feasible with reuse of the processing circuitry's memory management circuitry for translating virtual addresses of accelerator-triggered memory accesses. Direct configuration of the accelerator from user-level software can be extremely beneficial in reducing performance overhead associated with configuration of the accelerator, since it removes the need for user-level application software to call more privileged software (e.g. an operating system or hypervisor) to request access to the accelerator, which would cause a significant delay.

In some examples, the hardware accelerator may be configured to perform its delegated task based on execution of a given class of accelerator control instructions, separate from load/store instructions. For example, an instruction set architecture supported by the processing circuitry may support dedicated accelerator control instructions for functions such as launching accelerator commands, checking accelerator status, reading internal accelerator state, writing other accelerator control registers, etc.

However, in some examples, the apparatus may comprise memory-mapped register storage accessible in response to load/store instructions executed by the processing circuitry specifying target addresses mapped to the memory-mapped register storage, for controlling operation of the at least one hardware accelerator. This can reduce the amount of instruction encoding space incurred for accelerator control in an instruction set architecture.

For example, the memory-mapped register storage may comprise a launch register. In response to the processing circuitry executing a launch-triggering store instruction specifying a store data operand and a target address mapped to the launch register, the processing circuitry may control the accelerator control interface circuitry to issue to a selected hardware accelerator at least one launch request signal having an encoding selected based on the store data operand, to trigger the processing circuitry to perform a given control action. The control action could, for example, be the launch of an accelerator command, entry or exit from a mode for saving/restoring accelerator state, an indication that previous memory faults for accelerator-triggered accesses are being resolved, or the reading/writing of internal accelerator registers. By providing a launch register mapped to a given address in memory, and using the encoding of the store data requested to be written to the address mapped to the launch register to differentiate the particular control action needed, this reduces the number of memory-mapped registers needed for control of accelerator actions.

In some examples, the memory-mapped register storage also comprises at least one data register, each data register programmable in response to a data-programming store instruction executed by the processing circuitry specifying a target address mapped to that data register. In response to the processing circuitry executing the launch-triggering store instruction, the processing circuitry may control the accelerator control interface circuitry to issue to a selected hardware accelerator the at least one launch request signal and at least one data payload packet selected based on contents of the at least one data register. Hence, with a single command launch, as well as the command itself, one or more data payload packets may be transferred, which can reduce the software overhead in configuring the accelerator as it enables a greater volume of data to be transferred to the accelerator in response to a single instance of the launch-triggering store instruction.

In some examples, the launch register is shared between a plurality of hardware accelerators associated with the processing circuitry, and the selected hardware accelerator comprises one of the plurality of hardware accelerators selected based on an accelerator selection field of the store data operand specified by the launch-triggering store instruction. Hence, the control interface comprising the launch register may be shared between multiple accelerators, rather than needing a separate launch register per accelerator. This reduces the circuit area overhead associated with the interface. Similarly, the at least one data register mentioned above could also be shared between multiple accelerators.

In some examples, the memory-mapped register storage comprises a launch response register. In response to the processing circuitry executing a launch-response-checking load instruction specifying a target address mapped to the launch response register, the processing circuitry may read from the launch response register a launch response value specifying: a launch response status value indicative of a status of whether a previous launch request signal issued to a given hardware accelerator is able to be accepted by the given hardware accelerator; and a launch response pending field indicative of whether the launch response status value is valid. Hence, the software executing on the processing circuitry can use the launch-response-checking load instruction to poll the launch response register to check whether a previously issued launch request signal could successfully be accepted by the given hardware accelerator. Given the asynchronous nature of the hardware accelerator with respect to the processing circuitry, it is useful to provide the launch response pending field to allow for variable timing at which the launch response status value becomes valid.

Again, the launch response register may be shared between multiple accelerators, in systems having more than one accelerator associated with the same processing circuitry.

The memory-mapped register storage may also comprise an accelerator status register. In response to the processing circuitry executing an accelerator status-checking load instruction specifying a target address mapped to the accelerator status register, the processing circuitry is may read from the accelerator status register an accelerator status value associated with a corresponding hardware accelerator, the accelerator status value comprising a field indicative of whether any previously launched accelerator commands have been completed by the corresponding hardware accelerator. Hence, the accelerator status register associated with a given hardware accelerator can be checked asynchronously some time after the accelerator has been configured to perform a delegated task, to check whether the task previously delegated to that accelerator has completed.

Unlike the launch register, at least one data register and launch response register (which may be shared between multiple accelerators), the accelerator status register may be specific to a particular accelerator. Hence, in some examples the memory-mapped register storage comprises a plurality of accelerator status registers each corresponding to a respective hardware accelerator and providing the accelerator status value corresponding to that hardware accelerator.

In some examples, the memory management circuitry is configured to perform address translation based on shared software-configurable translation control information specifying information for controlling how the address translation is performed for both the memory access instructions executed by the processing circuitry and the accelerator-triggered memory access request received from the given hardware accelerator. For example, a common set of system registers defined by the instruction set architecture supported by the processing circuitry may control translations for both the memory access instructions executed by the processing circuitry and the accelerator-triggered memory access requests received from the given hardware accelerator. In some examples, in addition to the common set of system registers controlling translations for both processor-triggered and accelerator-triggered memory access requests, there could be at least one further system register which is dedicated to controlling aspects of handling of accelerator-triggered memory access requests (e.g. in one example, a first set of registers defining control information for one translation context could be used for handling either processor or accelerator-triggered memory access requests, but a second set of registers defining control information for a further translation context could be reserved for use by accelerator-triggered memory access requests only).

The memory management circuitry could, at a micro-architectural level, be implemented in different ways. In one example, a single circuit unit could handle the address translations for both the memory access instructions executed by the processing circuitry and the accelerator-triggered memory access request received from the given hardware accelerator, e.g. based on lookups to a shared translation lookaside buffer (TLB) used for both processor-triggered accesses and accelerator-triggered accesses, and/or a shared translation table walk unit for generating addresses of memory accesses issued during translation table walk operations to obtain translation table data from the memory system.

However, in other examples, the memory management circuitry associated with the processing circuitry comprises, as separate micro-architectural units, processor-side memory management circuitry to perform address translation in response to the memory access instructions executed by the processing circuitry; and accelerator-side memory management circuitry to perform address translation in response to the accelerator-triggered memory access request received from the given hardware accelerator. Nevertheless, from a software perspective such separate micro-architectural units may behave as a single instance of memory management circuitry associated with the processing circuitry, because the processor-side memory management circuitry and accelerator-side memory management circuitry may share a common set of software-configurable translation control registers to store translation control information for controlling how the address translation is performed by both the processor-side memory management circuitry and the accelerator-side memory management circuitry. Hence, a single register write operation triggered by software may update translation control information (such as a translation table base address or translation table structure defining information), which may influence translation of both the processor-triggered accesses generated in response to memory access instructions executed by the processing circuitry and the accelerator-triggered accesses triggered by the given hardware accelerator. This is different to a system memory management unit used for handling input/output device triggered memory accesses in a processing system, for which the system memory management unit is architecturally an entirely separate instance of memory management circuitry from the processor's memory management circuitry, having an entirely separate set of control information set by software for configuring the operation of the system memory management unit.

In some examples, a hardware accelerator may comprise accelerator processing circuitry configurable, based on instructions executed by a processor, to perform a delegated task on behalf of the processing circuitry; control interface circuitry to exchange control signals with the processor; and memory access request circuitry to issue, to the processor via the control interface circuitry, an accelerator-triggered memory access request requesting access to a memory system; wherein the accelerator-triggered memory access request specifies a virtual address to be translated, by memory management circuitry associated with the processor, into a physical address of a memory system location to be accessed in response to the accelerator-triggered memory access request. In a corresponding way to the apparatus discussed above, routing virtual address-specifying memory access requests via the processor to enable reuse of the processor's memory management circuitry can be helpful to support reduced software overhead when configuring a hardware accelerator.

In some examples, a hardware accelerator comprises accelerator processing circuitry to perform a delegated task on behalf of a processor; control interface circuitry to exchange control signals with the processor to configure the accelerator processing circuitry to perform the delegated task; fault status register storage to store fault status information, the fault status register storage being readable by the processor based on an accelerator register read request received from the processor via the control interface circuitry; and control circuitry to: detect a fault indication received from the processor via the control interface circuitry indicating that a faulting accelerator-triggered memory access request, issued via the control interface circuitry to the processor and specifying a target virtual address, has encountered an address translation fault; and in response to detecting the fault indication, set fault status information in the fault status register storage to indicate information about the faulting accelerator-triggered memory access request that encountered the address translation fault.

When accelerator-triggered memory access requests specifying a virtual address are routed via a processor, one might expect that any faults arising from the translation of the virtual address detected by the processor should be reported using the standard address translation fault handling mechanisms of the memory management circuitry provided within the processor (e.g. by raising an exception which causes software currently running on the processor to be interrupted). However, the inventors recognised that when the fault is caused by an accelerator-triggered memory access request, that request may be part of a delegated task being performed asynchronously by the accelerator, which is not associated with any particular instruction currently being processed by the processing circuitry. Hence, signalling a fault to the processing circuitry immediately on detecting the address translation fault for an accelerator-triggered memory access request may not be desirable as this may make it difficult for an exception handler to determine which software process or point of program flow is associated with the detected fault.

In examples discussed below, control circuitry is provided in the hardware accelerator to detect a fault indication provided by the processor via control interface circuitry to indicate that a faulting accelerator-triggered memory access request encountered an address translation fault, and in response to detecting the fault indication, the control circuitry sets fault status information in the fault status register storage, to indicate information about the faulting accelerator-triggered memory access request. Hence, an address translation fault detected at the processor for an accelerator-triggered memory access request may be reported back to the accelerator which issued the request, which sets fault status information in fault status register storage which is readable by the processor using a separate accelerator register read request issued by the processor. While it may seem inefficient to introduce an additional back-and-forth between processor and accelerator in order for the software executing on the processor to detect the occurrence of the fault based on the fault status information in the fault status register storage of the accelerator, this can greatly simplify software implementation in a system supporting an accelerator, as the fault handling can be deferred to the point at which the software running on the processor is the software which configured the accelerator to perform the delegated task which encountered the address translation fault for one of its memory accesses.

The control circuitry may be configured to issue a status update message via the control interface circuitry to the processor to request that the processor updates software-readable accelerator status information associated with the hardware accelerator to a value specified by the status update message. The status update message may support at least one encoding indicating that the software-readable accelerator status information associated with the hardware accelerator should be set to indicate to software executing on the processor that the hardware accelerator has encountered an address translation fault for at least one faulting accelerator-triggered memory access request. The status update message could be issued by the accelerator periodically (e.g. at regular intervals), or could be sent at times when there is a specific event to report (such as the occurrence of an address translation fault when no outstanding unresolved address translation faults were pending prior to occurrence of that address translation fault). Hence, the specific timing at which the status update message is sent from the accelerator to the processor can vary, but in general, supporting the ability for the accelerator to report status updates to the processor, including at least one encoding of the status update message which indicates that an address transition fault has been encountered, can be useful to allow the processor to detect when there is a need to issue the accelerator register read request to read the fault status information from the fault status register storage. This helps avoid the need for repeated speculative polling of the accelerator's fault status register storage by software operating on the processor, enabling more efficient usage of bandwidth on the control interface circuitry.

In some examples, in response to receipt of a resolve request received from the processor indicating that a cause of at least one address translation fault has been resolved, the control circuitry of the accelerator may invalidate at least one item of fault status information in the fault status register storage relating to the at least one address translation fault indicated as being resolved. By supporting a resolve request on the interface between the processor and the accelerator, this can provide an efficient mechanism for signalling when software has resolved faults (e.g. by configuring a page table entry to provide an address mapping for the address for which are memory access was requested by the accelerator).

The resolve request may specify a resolve parameter specifying which address translation faults have been resolved and the control circuitry may select which items of fault status information to invalidate based on the resolve parameter of the resolve request. Hence, bandwidth on the control interface between the accelerator and processor can be used more efficiently by enabling multiple different faults to be indicated as resolved in a single resolve request.

In some examples, in response to receipt of the resolve request, the control circuitry may determine whether there are any remaining address translation faults tracked in the fault status register storage which are still unresolved; and in response to determining that there are no remaining unresolved address translation faults tracked in the fault status register storage, issue a status update message via the control interface circuitry to the processor to request that the processor updates software-readable accelerator status information associated with the hardware accelerator to indicate that there are no longer any unresolved address translation faults associated with the hardware accelerator. This can allow the processor to clear a stored indication of fault presence that can be read by software to determine whether fault handling is still required.

In some examples, in response to the resolve request, the control circuitry may also control the accelerator to retry one or more accelerator-triggered memory access requests associated with the fault that has now been indicated as resolved. However, this is not essential, and other implementations of the accelerator may wait until all outstanding faults have been resolved before retrying any affected memory access requests.

In some examples, the fault status register storage comprises: a plurality of fault status registers each configurable to record fault status information about an address translation fault encountered for a corresponding page of virtual address space; and a fault status summary register to store fault status summary information specifying which of the plurality of fault status registers stores valid fault status information. Providing a fault status summary register summarising which of the fault status registers stores valid fault status information can be useful to improve efficiency of the processor (and of bandwidth utilisation on the control interface) when querying fault status information using accelerator register read requests. The software on the processor may trigger an accelerator register read request to read the fault status summary information from the fault status summary register, and then use the fault status summary information to determine which of the other fault status registers need to be read to determine valid information about outstanding faults. This can avoid wasting software overhead and control interface bandwidth unnecessarily on register read requests for fault status registers which do not currently track any valid fault status information.

In some examples, the fault status register storage may store fault status information associated with a given unresolved address translation fault, the fault status information comprising any one or more of: an indication of a virtual page address indicating a page of virtual address space comprising a target virtual address for which the unresolved address translation fault was encountered; an indication of whether the unresolved address translation fault was caused by a read request or a write request; and an indication of whether the unresolved address translation fault was caused by an accelerator address translation context associated with the hardware accelerator being an inactive translation context not currently enabled by memory management circuitry of the processor. Such information can be useful for enabling software executing on the processor to determine the cause of the fault and take action to resolve it.

In some examples, the control interface circuitry comprises at least one memory access request channel, each memory access request channel comprising: an address path to issue a virtual address of an accelerator-triggered memory access request to the processing circuitry; and a response path to return a response message from the processing circuitry to the hardware accelerator in response to a corresponding accelerator-triggered memory access request for which the virtual address was issued over the address path. In some examples, there may be separate memory access request channels for read requests and write requests respectively. Some examples may support multiple independent read request channels and/or multiple independent write request channels, to increase memory access bandwidth for the accelerator. Other examples may support only a single read request channel and/or single write request channel. In general, a given memory access request channel may support an address path by which memory access requests are issued from accelerator to processor and a response channel by which the processor provides a response to a specific memory access request. The control interface circuitry can also support other types of channels, such as a control request channel or control response channel used to exchange control signals other than signals relating to specific memory access requests.

In some examples, the fault indication returned to the accelerator in response to the processor detecting an address translation fault for an accelerator-triggered memory access request may comprise the response message signalled on the response path having an encoding indicating that the corresponding accelerator-triggered memory access request encountered an address translation fault. Hence, signalling the address transition fault may not require any additional response messages, other than the response message which would be provided in any case if the memory access request was successful and did not encounter a fault. This can reduce the additional interface bandwidth consumed by signalling the fault back to the accelerator, compared to approaches with a dedicated fault detection message separate from the response message returned in response to a memory access request. The response message may include a field signalling whether any address translation fault has been encountered for the corresponding memory access request, and in some cases may support two or more different encodings indicating which of two or more types of address translation fault were detected. For example, the encoding of the fault indication may distinguish whether the fault is caused by the address translation context associated with the accelerator-triggered memory access request being an inactive translation context, or whether the fault is associated with an active translation context but has occurred for other reasons (such as the target virtual address not having a corresponding translation table entry configured in the translation table structure associated with the corresponding address translation context, or access permissions indicated in the corresponding translation table entry not being satisfied by the accelerator-triggered memory access request).

The hardware accelerator may be private to a particular processor.

In a corresponding way to the fault handling features described for the accelerator above, a processor may comprise control interface circuitry to exchange control signals with at least one hardware accelerator configurable, based on instructions executed by processing circuitry, to perform a delegated task; and control circuitry to: in response to an address translation fault being detected for an accelerator-triggered memory access request received via the control interface circuitry from a given hardware accelerator and specifying a target virtual address, issue a fault indication to the given hardware accelerator via the control interface circuitry; and in response to an accelerator register read instruction specifying the given hardware accelerator and indicating that at least a portion of fault status register storage of the given hardware accelerator is to be read in response to the accelerator register read instruction: issue an accelerator register read request via the control interface circuitry to the given hardware accelerator requesting that the given hardware accelerator returns fault status information specified in said at least a portion of the fault status register storage of the given hardware accelerator; and store the fault status information returned by the given hardware accelerator in at least one software-readable storage location. By reporting the occurrence of an address translation fault to the given hardware accelerator that issued the faulting accelerator-triggered memory access request, and providing a separate accelerator register read mechanism (triggered by an accelerator register read instruction) to enable the processor to query the fault status information recorded in fault status register storage of the accelerator, this can make it simpler for the fault to be attributed to the software process which configured the delegated task which led to the accelerator issuing the faulting memory access request.

In some examples, the processor may comprise accelerator status information storage circuitry to store software-readable accelerator status information corresponding to at least one hardware accelerator. The control circuitry may be responsive to a status update message received from a given hardware accelerator via the control interface circuitry to update the software-readable accelerator status information associated with the given hardware accelerator to a value specified by the status update message. In response to the status update message having at least one encoding indicating presence of an address translation fault, the control circuitry may update the software-readable accelerator status information associated with the given hardware accelerator to indicate to software executing on the processor that the hardware accelerator has encountered an address translation fault for at least one faulting accelerator-triggered memory access request. Hence, as explained earlier, this can provide a convenient way for software to learn about occurrence of faults associated with accelerator accesses, as the software can read the accelerator status information storage associated with a given accelerator that is maintained by the control circuitry of the processor.

The status update message may also supports at least one encoding indicating that software-readable accelerator status information should be updated to indicate that the software-readable accelerator status information is idle and has no uncompleted delegated tasks pending. This can provide an efficient mechanism for software polling of accelerator status, since a single polling operation of the software-readable accelerator status information to check the current status of a given hardware accelerator may return both information on whether any previously allocated delegated tasks are complete and information on whether any address translation fault has been encountered for an accelerator-triggered memory access request issued by that accelerator.

In some examples, in response to a resolve instruction identifying a given hardware accelerator, the control circuitry may issue a resolve request to the given hardware accelerator via the control interface circuitry to indicate that a cause of at least one address translation fault has been resolved and that the given hardware accelerator can invalidate at least one item of fault status information in the fault status register storage. Supporting the resolve instruction can be helpful for enabling the software that deals with the detected address translation faults to cause the accelerator to be informed that faults have been resolved so that the accelerator can once more resume forward progress in its allocated delegated tasks. As discussed earlier, in some examples the resolve instruction specifies a resolve parameter specifying which address translation faults have been resolved, enabling a single resolve instruction to cause multiple faults to be indicated as resolved.

The resolve instruction may comprise a store instruction specifying store data and specifying a target address mapped to a memory-mapped launch control register, the store data having an encoding indicating that store instruction represents the resolve instruction. Hence, a memory mapped control interface may be used to trigger the resolve request, by executing a store instruction whose address is mapped to the address of a launch control register and using the store data of the store request to encode that this instruction represents the resolve instruction and so should trigger issuing of the resolve request to the given hardware accelerator. The store data can also encode an accelerator selection parameter indicating which accelerator is the given accelerator to which the resolve request is to be sent. In implementations supporting the resolve parameter mentioned above, the resolve parameter may be obtained from a memory-mapped data register in response to execution of the store instruction to the memory-mapped launch control register.

Similarly, the accelerator register read instruction may comprise a store instruction specifying store data and specifying a target address mapped to a memory-mapped launch control register, the store data having an encoding indicating that the store instruction represents the accelerator register read instruction. The store data may also identify which accelerator register is to be read in response to the accelerator register read request sent to the accelerator. The store data can also encode an accelerator selection parameter indicating which accelerator is the given accelerator to which the accelerator register read request is to be sent.

The at least one software-readable storage location (to which the fault status information is returned in response to the accelerator register read instruction) may comprise at least one memory-mapped register. For example, the at least one software-readable storage location may comprise at least one memory-mapped data register used for providing input data to be sent via the control interface to the accelerator or storing output data returned from the accelerator via the control interface.

In some examples, in response to the address translation fault being detected for the accelerator-triggered memory access request, the control circuitry may issue the fault indication to the given hardware accelerator while allowing the processing circuitry to continue uninterrupted execution of instructions. Hence, the fault handling mechanism may be an asynchronous mechanism, which can be dealt with later at a timing chosen by software, rather than requiring immediate interruption of instructions executed by the processing circuitry of the processor.

The fault status information read by the processor in response to the accelerator register read instruction may indicate at least one of: an indication of a virtual page address indicating a page of virtual address space comprising a target virtual address for which an unresolved address translation fault was encountered; an indication of whether the unresolved address translation fault was caused by a read request or a write request; an indication of whether the unresolved address translation fault was caused by an accelerator address translation context associated with the hardware accelerator not currently being enabled by memory management circuitry of the processor; and fault status summary information specifying which of a plurality of fault status registers of the given hardware accelerator specifies valid fault status information.

In some examples, an apparatus comprises processing circuitry to execute instructions, and accelerator control interface circuitry to exchange control signals with at least one hardware accelerator configurable, based on instructions executed by the processing circuitry, to perform a delegated task. The accelerator control interface circuitry comprises control storage corresponding to a given hardware accelerator, the control storage configured to indicate availability of the given hardware accelerator. The control storage may for example be referenced when processing circuitry attempts to trigger an accelerator operation to determine whether the accelerator operation should be allowed to proceed. There are various reasons why a given hardware accelerator may not be available for use by software at a particular time. For example, internal state of the hardware accelerator may be associated with a particular execution context (e.g., a software thread) and the context of the hardware accelerator may not be the same as the context of software executing on the processing circuitry. Hence, whilst the internal state differs between the processing circuitry and a given hardware accelerator, that given hardware accelerator may be unavailable to the processing circuitry (despite being supported by the system as a whole).

In response to determining, in response to the processing circuitry executing a launch instruction requesting that the accelerator control interface circuitry triggers an accelerator operation to be performed by the given hardware accelerator, that whilst the given hardware accelerator is present the control storage indicates unavailability of the given hardware accelerator, the accelerator control interface circuitry is configured to provide a launch outcome indication indicating to the processing circuitry that the given hardware accelerator is unavailable to perform the accelerator operation.

Hence, software executing on the processing circuitry may attempt to trigger an operation to be performed by a given hardware accelerator, and the hardware may provide a mechanism whereby unavailability of the given hardware accelerator can be signalled (e.g. to software) in response to the attempt to trigger the operation.

The inventors have realised that supporting a launch outcome indication, enabling software to request accelerator operations without being certain that the accelerator is available, can lead to improved performance.

For example, an alternative technique may be to ensure that a given hardware accelerator is always available to a given CPU. In examples where a given hardware accelerator is available to software having a corresponding processing context, then this may mean switching the context of a hardware accelerator whenever the context of a corresponding CPU is switched. However, if the context of a particular hardware accelerator is switched whenever the context of a corresponding CPU is switched, then this may unnecessarily interrupt a previous operation being performed by the hardware accelerator. Additionally, switching the context of a hardware accelerator may involve saving and restoring large amounts of internal state to and from memory.

Such context switch operations can be power and time consuming, and can consume large amounts of memory bandwidth. However, if the new CPU context does not need to use the hardware accelerator then these operations may be unnecessary and cause wasted power and performance. Supporting the option for a hardware accelerator to be unavailable to an item of software supports implementations in which context switching of a hardware accelerator is only performed when required, and can hence improve performance and reduce power cost associated with use of a hardware accelerator.

In some examples, in response to determining, in response to the processing circuitry executing the launch instruction, that whilst the given hardware accelerator is present the control storage indicates unavailability of the given hardware accelerator, the accelerator control interface circuitry may be configured to suppress issuing of a launch request signal to the given hardware accelerator, the launch request signal requesting to launch the accelerator operation.

Suppressing issuing of launch request signals to an unavailable hardware accelerator can reduce traffic over a communication interface between the processing circuitry and hardware accelerator, and in some cases can enable simplified accelerator design which does not need to support ignoring incorrectly issued launch request signals.

The launch outcome indication can be provided in different ways. In some examples, the launch outcome indication may be an interrupt or other signal provided directly to the processing circuitry which executed the launch instruction. In other examples, the accelerator control interface circuitry may be configured to provide the launch outcome indication in a status storage location accessible to the processing circuitry. For example, the status storage location may be a register accessible to software executing on the processing circuitry. By providing the launch outcome indication in a status storage location, rather than as an interrupt, this supports implementations giving software a choice regarding whether and when to request the hardware accelerator be made available.

In some examples, the control storage for indicating availability of hardware accelerators is programmable by software to control whether a given hardware accelerator is indicated as available. Hence, a software process can control whether or not certain hardware accelerators are available to another software process. This can enable improved performance, as it can allow previously unavailable hardware accelerators to be made available for use by the processing circuitry, and for example supports implementations using lazy state saving. In particular, a given hardware accelerator may be indicated as unavailable until use of that hardware accelerator is requested, context switched, and then the control storage updated to indicate that the hardware accelerator has been made available. As discussed above, this can provide significant performance improvements.

In some examples, the control storage may be provided in a control register. Providing control storage in a register can enable faster access to the control storage compared, for example, to providing the control storage in memory. In some examples the control register may be identified using an address of a memory system accessible to the processing circuitry, and hence be provided as a memory-mapped control register. The address may for example be a physical address. As will be discussed below, providing the control storage in a memory-mapped control register can support efficient mechanisms for controlling access to the control register, and in particular can enable existing control mechanisms for controlling access to memory to be reused for controlling access to the control register. This can be useful as there may be a desire for a system which enables the control storage to be accessible to certain software processes executing on the processing circuitry (e.g., more privileged software) whilst prohibiting access to the control storage by other software processes.

In some examples, the apparatus comprises a set of protection level control registers. Each protection level control register is provided for controlling operations at a particular protection level.

Requests by the processing circuitry to trigger an accelerator operation may be associated with a particular protection level. Protection levels may be defined as a hierarchy, whereby higher protection levels afford greater levels of access to the hardware accelerators than lower protection levels. There are many ways in which a protection level may be associated with a request (such as which physical address is specified in the request), but in general certain software processes may be prohibited from issuing requests associated with certain protection levels, meaning that different software processes may be provided with different levels of access to the set of hardware accelerators based on which protection level they can use to request accelerator operations. Control circuitry may for example select one or more protection level control registers for determining whether a requested accelerator operation is allowed, where the selection is based on the protection level associated with the request to perform the acceleration operation. Each protection level control register may be associated with a particular protection level, but a selection of further protection level control registers may also be used for controlling operations at a particular protection level (such as an associated protection level control register and all higher level protection level control registers).

In some examples, each protection level control register indicates availability of the given hardware accelerator to software issuing requests to trigger an accelerator operation at a corresponding protection level and all lower protection levels. Hence, the protection level control registers may in some examples provide the control storage indicating availability of a given hardware accelerator.

In some examples, a request to trigger an accelerator operation at a particular protection level may be controlled solely based on the protection level control register corresponding to the particular protection level. However, when software is programming the protection level control registers to control access to the hardware accelerators, rather than setting each protection level control register for each protection level, it may be more effective if the software process sets a single protection level control register for controlling access to a given hardware accelerator for all lower protection levels. Therefore, access to a given hardware accelerator at a given protection level may be controlled by the corresponding protection level control register and all higher protection level control registers. Hence, in some examples, in response to the processing circuitry executing the launch instruction, the accelerator control interface circuitry is configured to determine, based on a combination of control state provided by a subset of the protection level control registers for controlling operations at a protection level equal to or higher than a protection level associated with the launch instruction, whether the given hardware accelerator is available to perform the accelerator operation.

Control state may be combined in several ways. Control state may have a first state to indicate that a particular hardware accelerator is available and a second state to indicate that the particular hardware accelerator is unavailable. The two states could for example be different logic states of a flag or other indicator. Combining control state may comprise bitwise combination of control state indicators. In some examples, combination may be such that if any item of control state indicates unavailability of a given hardware accelerator then said hardware accelerator is unavailable, independent of the other items of access state. For example, if availability is indicated by logic 1 and unavailability is indicated by logic 0 then control state may be combined with a bitwise AND operation. It will be appreciated that this example is not limiting. For example, if availability is indicated by logic 0 and unavailability is indicated by logic 1 then control state may be combined with a bitwise OR operation. By allowing any item of control state to indicate unavailability of a hardware accelerator, then control state set by lower protection levels can prohibit use of a particular hardware accelerator even if the hardware accelerator is indicated as available by higher protection levels. This enables lower protection levels to control access to hardware accelerators without relying on calling code having access to higher protection levels. This does not necessarily allow lower protection levels to override higher protection levels, because code having access to higher protection levels may also be able to set lower protection level control registers and hence reverse changes made by code at lower protection levels. Combining control state in this way can however allow higher protection levels to override lower protection levels and indicate unavailability of a particular hardware accelerator at a particular protection level regardless of the control state set by lower protection levels.

In some examples, the apparatus may comprise at least one memory-mapped control register providing control state, and control register access circuitry to control access to the at least one memory-mapped control register. The control register access circuitry can for example prevent a certain software process from modifying the control state controlling whether a given hardware accelerator is available to that same software process.

For a set of aliasing physical addresses each corresponding to a different physical memory page, the control register access circuitry may be configured to treat a first access request issued by the processing circuitry to access a first physical address in the set of aliasing physical addresses and a second access request issued by the processing circuitry to access a second physical address in the set of aliasing physical addresses as access requests to the same item of control state in a given memory-mapped control register. The control register access circuitry may be configured to handle an access request to an item of control state using access permissions selected depending on which physical address from the set of aliasing physical addresses is used to access the item of control state.

Selecting access permissions based on which physical address is used to access an item of control state can for example allow different software processes executing on the processing circuitry to be provided with differing access to the at least one memory-mapped control register. For example, an access specifying a first aliasing physical address may be permitted to read or write a particular item of control state in a memory mapped control register, whilst an access request to a second aliasing physical address mapped to the same control state may not be permitted to access that control state. As mechanisms may be provided to control access by software to different physical addresses, aliasing of physical addresses means that these same mechanisms can be used to control access to an item of control state in memory-mapped control registers.

In some examples, the at least one memory-mapped control register may comprise a set of protection level control registers, each protection level control register for controlling operations at a particular protection level, and each protection level control register indicating availability of the given hardware accelerator. The at least one memory-mapped control register may comprise a launch register, where executing the launch instruction comprises the processing circuitry writing data to a launch physical address mapped to the launch register, and the accelerator control interface circuitry may be configured to determine availability of the given hardware accelerator based on a combination of control state provided by a subset of the protection level control registers for controlling operations at a protection level equal to or higher than a protection level associated with the launch physical address.

Hence, executing the launch instruction may comprise writing to a launch register using a physical address associated with a particular protection level. Several physical addresses may be mapped to the launch register and may be associated with different protection levels. Hence the request to trigger an accelerator operation may be associated with a particular protection level. Availability of a given hardware accelerator in response to a request to trigger an accelerator operation at a particular protection level may be controlled by each higher protection level. For example, availability of a given hardware accelerator to a given protection level may be controlled by setting control state indicating availability of the given hardware accelerator to a particular protection level in a protection level control register for controlling operations at the particular protection level. As the availability at a particular protection level may be determined by all of the higher protection levels, which may each set control information in separate protection level control registers, the availability of a given hardware accelerator may be determined by combining control state provided by a subset of the protection level control registers for controlling operations at a protection level equal to or higher than a protection level associated with the launch physical address.

In some examples, in response to the processing circuitry executing an accelerator-state-switching-mode instruction, the processing circuitry may be configured to control the accelerator control interface circuitry to issue to a selected hardware accelerator at least one accelerator-state-switching mode request signal to control the hardware accelerator to enter or exit an accelerator state switching mode in which delegated task progress is halted to support saving or restoration of accelerator state. For example, an enter state switching mode request signal may request that a target hardware accelerator enters an accelerator state switching mode (which may elsewhere be referred to as a save/restore mode), and an exit state switching mode request signal may request that a target hardware accelerator exits the accelerator state switching mode. Supporting the state switching mode may enable more efficient context switching of a hardware accelerator, because by halting delegated task progress the internal state of a hardware accelerator may undergo fewer changes, meaning that the saving of internal state to memory can be simplified. An apparatus providing a launch outcome indication can support context switching of hardware accelerator internal state as discussed above, and hence such an apparatus may benefit from a mechanism to simplify saving of internal state to memory to perform such a context switch.

In some examples, in response to issuing the accelerator-state-switching mode request signal, the accelerator control interface circuitry is configured to transfer a portion of internal state to or from the selected hardware accelerator. This can be useful for the processing circuitry to capture some internal accelerator state information of the accelerator when entering the state switching mode and return that captured information for restoration at the accelerator when exiting the state switching mode.

In some examples, the accelerator control interface circuitry is configured to suppress launching of at least a subset of accelerator request signals to a hardware accelerator in the accelerator-state-switching mode. By preventing the processing circuitry from triggering certain hardware accelerator operations for a hardware accelerator in the accelerator-state-switching mode, this can reduce the likelihood of operations being triggered to disrupt a state saving or state restoration operation. Similarly, there may be certain accelerator request signals, for example requesting that a hardware accelerator saves its internal state, resets its internal state, or restores its internal state, for which launching may be suppressed to an accelerator not in the accelerator-state-switching mode.

In some examples, in response to the processing circuitry executing an accelerator state-save instruction, the processing circuitry may be configured to control the accelerator control interface circuitry to issue to a selected hardware accelerator at least one state-save request signal to control the hardware accelerator to save internal state to an identified location in memory.

In some examples, in response to the processing circuitry executing an accelerator state-restore instruction, the processing circuitry may be configured to control the accelerator control interface circuitry to issue to a selected hardware accelerator at least one state-restore request signal to control the hardware accelerator to restore internal state from an identified location in memory.

Supporting state-save and state-restore instructions enables processing circuitry to control context switching of internal state of a hardware accelerator. For example, buffers may be defined in memory storing accelerator internal state for a variety of processing contexts. The identified location in memory may for example be the start address of the buffer associated with a particular context. The state save and state restore instructions allow internal state to be swapped in and out of a hardware accelerator, so that a given hardware accelerator can be reused for processing operations associated with different contexts.

The method of identifying the identified location in memory is not particularly limited. In some examples, the accelerator control interface circuitry may comprise a data control register, and the accelerator control interface circuitry may be configured to identify the identified location in memory using data stored in the data control register. The data control register may provide operation input or output data for a variety of transactions between a processor and a hardware accelerator. The data control register may for example be a memory-mapped control register. Software can write to the data control register to identify an address of a memory buffer, and then issue a state-save or state-restore instruction to use that memory buffer for saving or restoring context information.

In some examples, in response to the processing circuitry executing an accelerator reset instruction, the processing circuitry may be configured to control the accelerator control interface circuitry to issue to a selected hardware accelerator at least one reset request signal to control the hardware accelerator to clear its internal state. The use of a reset request signal can support context switching a given hardware accelerator between contexts having different security requirements. Switching a hardware accelerator from a more secure context to a less secure context may risk exposing sensitive information to the less secure context. The reset request can cause internal storage of the hardware accelerator to be reset, such that the risk of information being leaked between contexts may be reduced. For example, the reset request could be issued between a state saving operation to save internal state of a previous context to memory and a state restore operation to restore internal state of a new context from memory to the hardware accelerator.

In some examples, in response to the processing circuitry executing an accelerator internal state query instruction, the accelerator control interface circuitry may be configured to query an internal state size storage location of at least one hardware accelerator and store the result in a software-accessible storage location. Hardware accelerators may provide a wide range of different functions, and hence different hardware accelerators may provide significantly different amounts of internal state. To enable an appropriate amount of memory to be allocated to each memory buffer for storing internal state of hardware accelerators for context switching, hardware accelerators may provide an internal state size storage location, such as a register (e.g., the IASSIZE register discussed herein), to indicate a size of the internal state of that register. An accelerator internal state query instruction, which in some examples may be a generic instruction for querying registers of the hardware accelerator, can enable the value of the internal state size storage location of hardware accelerators to be made available to the processing circuitry which may be responsible for allocating memory to each memory buffer.

In some examples, an apparatus comprises processing circuitry to execute instructions and accelerator control interface circuitry to exchange control signals with at least one hardware accelerator configurable, based on instructions executed by the processing circuitry, to perform a delegated task. The accelerator control interface circuitry may comprise at least one memory-mapped control register for controlling the at least one hardware accelerator. The memory-mapped control register can for example provide a mechanism by which the at least one hardware accelerator can be controlled by processing circuitry executing load and store operations to addresses mapped to the memory-mapped control registers. Using memory-mapped control registers for controlling a hardware accelerator can for example reduce the number of dedicated hardware accelerator control instructions which may need to be supported by the processing circuitry.

The apparatus may comprise control register access circuitry to control access to the at least one memory-mapped control register. It may be desirable to control how certain software processes executing on the processing circuitry can access the control registers, to provide limits on how certain items of software can control one or more hardware accelerators.

Providing the control registers as memory-mapped control registers means that mechanisms which may already be provided for controlling access of processing circuitry to different memory addresses may be reused for controlling access of the processing circuitry to the control registers. For example, page table entries may be provided for translating virtual addresses specified by a particular software context into physical addresses specifying a location in memory. Hence, software operating in a given address translation context may be prevented from issuing memory accesses targeting a given control register if the given address translation context is not provided with any page table entry which provides an address mapping to the physical address of that given control register. Similarly, even if a page table entry which maps a virtual address to a physical address corresponding to the given control register is provided, that page table entry may nevertheless specify permissions information which can be used to prohibit access from a particular context to the physical address.

In some examples, for a set of aliasing physical addresses each corresponding to a different physical memory page, the control register access circuitry may be configured to treat a first access request issued by the processing circuitry to access a first physical address in the set of aliasing physical addresses and a second access request issued by the processing circuitry to access a second physical address in the set of aliasing physical addresses as access requests to the same item of control state in a given memory-mapped control register. That is, the control register access circuitry may treat two different physical addresses corresponding to different physical pages of memory as addresses mapped to the same item of control state in a given memory-mapped control register.

It might appear counter-intuitive to provide an apparatus in which more than one physical address can be used to access the same item of control state in a memory-mapped register. However, the inventors have realised that supporting address aliasing for accessing the control registers can provide an effective mechanism for handling access requests to the same item of control state in different ways depending on how that access request was issued. If accesses to different addresses in a set of aliasing physical addresses are treated as accesses to the same item of control state, then this allows the physical address specified in the access request to be used to differentiate accesses to be handled in different ways. This can allow increased flexibility in controlling (e.g. imposing limitations on) how processing circuitry can control the at least one hardware accelerator.

For example, the use of a set of aliasing physical addresses can enable access requests issued by different pieces of software (e.g., different threads, different privilege levels, etc.) to be handled differently. Existing mechanisms (e.g. using the page table entries as explained above) may already enable different pieces of software to have access to different physical addresses, and therefore which physical address in the set of aliasing physical addresses is used to access an item of control state may serve to identify the software process responsible for issuing the access request.

In an alternative technique, rather than providing circuitry to treat a set of aliasing physical addresses as accesses the same item of control state, the item of control state could be repeated several times in different registers with each instance of control state accessible by different physical addresses. In this case, the selection of which instance of control state is accessed may determine how the access is handled. However, the use of a set of aliasing addresses to access the same item of control state means that there is no need to provide multiple copies of the same control state and hence reduces the hardware cost associated with implementing multiple physical registers providing the same information. Additionally, the use of aliasing physical addresses reduces software overhead in programming and maintaining the control state, because there can be only a single copy of each control register, rather than setting and maintaining several copies of the same control state.

There may be several ways in which access requests are handled differently depending on which aliasing physical address is accessed by that access request. In some examples, for at least a distinguishing-permissions subset of the at least one memory-mapped control register, the control register access circuitry is configured to handle an access request to a given item of control state stored in the distinguishing-permissions subset of the at least one memory-mapped control register using access permissions selected depending on which physical address from the set of aliasing physical addresses is used to access the given item of control state. Hence, access requests specifying different physical addresses in the set of aliasing physical addresses may be handled using different access permissions.

This can for example allow different software processes executing on the processing circuitry to be provided with differing access to the at least one memory-mapped control register. For example, an access specifying a first aliasing physical address may be permitted to read or write a particular item of control state in a memory mapped control register, whilst an access request to a second aliasing physical address mapped to the same control state may not be permitted to access that control state. As mechanisms may be provided to control access of software to different physical addresses, aliasing of physical addresses means that these same mechanisms can be used to control access to an item of control state in memory-mapped control registers.

In some examples, for the distinguishing-permissions subset of the at least one memory-mapped control register, the control register access circuitry may be configured to select access permissions depending on a protection level associated with a physical address used to access the given item of control state. Hence, one way that different physical addresses can be provided with different access permissions is by associating physical addresses in the set of aliasing physical addresses with a particular protection level, and controlling whether a particular access is allowed depending on the protection level associated with that access. A physical address having a higher protection level may have greater access privileges compared to a physical address having a lower protection level. Hence, protection levels may be defined in a hierarchy. In some examples, a higher protection level may be permitted to access control state inaccessible to a lower protection level, in some examples in addition to having at least the same level of access as each lower protection level. Whilst the hardware of the control register access circuitry may define a relationship between physical addresses and protection levels, a software designer may nevertheless have freedom to decide which software is permitted to access which physical addresses, and hence the software designer is provided with significant freedom to decide how software executing on the processing circuitry is permitted to control the at least one hardware accelerator using the at least one memory-mapped control register.

In some examples, the distinguishing-permissions subset of the at least one memory-mapped control register may comprise a set of protection level control registers. Each protection level control register may be provided for controlling operations at a particular protection level. For example, a protection level control register associated with protection level X may be used for determining whether an operation requested in association with protection level X is permitted. The control register access circuitry may be configured to prevent a physical address associated with a given protection level being used to access a given protection level control register for controlling operations at a protection level equal to or higher than the given protection level. That is, control state provided in a protection level control register associated with a certain protection level may be inaccessible to memory access requests issued to physical addresses associated with the certain protection level or a lower protection level, even if those physical addresses are aliasing physical addresses mapped to the control state in the protection level control register associated with the certain protection level. An access request which is not permitted to access a particular item of control state may be ignored if it is a write access request and may return all zeros if it is a read access request. A protection level control register associated with a particular protection level may however be accessible to access requests associated with a higher protection level than the associated protection level. Hence, a subset of registers may be provided which correspond to the hierarchy of protection levels. This can be useful for allowing software having access to a certain protection level to set control state associated with that protection level for indicating how software at a certain protection level would like to control the at least one hardware accelerator.

In some examples, the control register access circuitry may be configured to handle an access request to an item of control state stored in a given set of the at least one memory-mapped control register using access permissions determined based on access state stored in at least one other memory-mapped control register. That is, at least one memory-mapped control register may provide information defining how at least one other memory-mapped control register may be accessed by the processing circuitry. Providing access state in a software accessible location such as a register enables access permissions to the control state to be varied over time by software executing on the processing circuitry. In a similar way to the control state stored in the memory-mapped control registers, a set of aliasing physical addresses may be treated by the control register access circuitry as accesses to the same item of access state. Hence, access schemes used to control access to the control state may also be used for the access state. In some examples, the access state may be a subset of the control state. In some examples, the same information may be used as both access state and control state. For example a particular protection level control register may provide an indication of whether or not a given hardware accelerator is available, and said indication may be used both to control whether software can issue commands to the given hardware accelerator as well as controlling access to control registers associated with the given hardware accelerator.

In some examples, the control register access circuitry may be configured to select access state for determining access permissions for the item of control state depending on which physical address in the set of aliasing physical address is used to access the item of control state. As discussed above, it can be beneficial to control whether an access to an item of control state is permitted depending on which physical address in the set of aliasing physical addresses is used to access the item of control state. In some examples this may involve selecting an item of access state depending on which physical address is specified by an access request for accessing the control state.

In some examples, the set of protection level control registers discussed above may provide access state for determining permissions for accessing at least one item of control state stored in a memory-mapped control register. Access to the protection level control registers may be controlled to prohibit a given protection level or lower protection levels from accessing a protection level control register associated with the given protection level. Hence, the protection level control registers can provide an effective location for storing access information defining access permissions for lower protection levels, for example.

In some examples in which access state is provided in protection level control registers, the control register access circuitry may be configured to determine access permissions by combining access state stored in a selected subset of protection level control registers for controlling operations at a protection level equal to or higher than the protection level associated with the aliasing physical address used to access the item of control state. That is, a memory access request may specify a physical address mapped to a particular item of control state, and a protection level may be associated with that request based on which physical address is specified from of a set of aliasing physical addresses. The protection level control registers corresponding to the associated protection level and higher may be combined to provide the access permissions for controlling the access request. As discussed above, the protection level control registers may be accessible to protection levels higher than the protection level associated with that protection level control register. Hence, combining access state provided in the associated protection level control register and higher means combining access state which may have been set by each protection level higher than the protection level associated with the memory access request. This can hence provide a mechanism by which a given memory access request is controlled based on permissions information set by each of the higher protection levels, without requiring each of the higher protection levels to have set access permissions in the same location. Combining several protection level control registers means that each protection level only needs to set its own permissions in an associated protection level control register, but the effective control imposed on the memory access request may depend on the control settings set by software associated with each of the higher protection levels.

Access state may be combined in several ways. Access state may have a first state to indicate that access to a particular register is allowed and a second state to indicate that access to the particular register is not allowed. The two states could for example be different logic states of a flag or other indicator. Combining access state may comprise bitwise combination of access state indicators. In some examples, combination may be such that if any item of access state prohibits access to a given register then access is prohibited independently of the other items of access state. For example, if accessibility is indicated by logic 1 and inaccessibility is indicated by logic 0 then access state may be combined with a bitwise AND operation. It will be appreciated that this example is not limiting. For example, if accessibility is indicated by logic 0 and inaccessibility is indicated by logic 1 then access state may be combined with a bitwise OR operation. By allowing any item of access state to indicate inaccessibility of a control register, then this means that access state set by lower protection levels can prohibit access even if access is allowed by higher protection levels. This enables lower protection levels to provide control over access to control state without relying on calling code having access to higher protection levels. This does not necessarily allow lower protection levels to override higher protection levels, because code having access to higher protection levels may also be able to set lower protection level control registers and hence reverse changes made by code at lower protection levels. Combining access state in this way can however allow higher protection levels to override lower protection levels and indicate inaccessibility of a particular register at a particular protection level regardless of the access state set by lower protection levels.

As discussed above, in some examples, the control register access circuitry may be configured to control access to access state in a protection level control register based on a protection level associated with a physical address in the set of aliasing physical addresses used to access said protection level control register. Hence, access of the processing circuitry to access state can be limited in similar ways to access to control state. In particular, this can prevent code executing on the processing circuitry being able to update access state and grant itself permission to access certain items of control state. A given protection level control register associated with a given protection level may for example only be accessible by memory access requests specifying physical addresses associated with a protection level higher than that given protection level.

The selection of registers in the given set of memory-mapped control registers comprising control state to which access is controlled based on access state specified in other memory-mapped control registers is not particularly limited. In some examples, certain hardware accelerators may be indicated as unavailable at certain times to certain protection levels. One or more items of control state may be associated with a particular hardware accelerator (in comparison to one or more other items of control state which may be shared between hardware accelerators). Access state may be set to control access to control state which is specific to a particular hardware accelerator, to enable software executing on the processing circuitry to keep control state associated with unavailable hardware accelerators private.

In particular, the given set of memory-mapped control registers may comprise an event control register for indicating whether an event has occurred at the at least one hardware accelerator, and/or a status control register for indicating a current status of a given hardware accelerator. The event and status control registers may provide sensitive information regarding a particular hardware accelerator, and hence it may be desirable to support access control state which enables access to these control registers to be denied for software to which the corresponding hardware accelerators are unavailable.

It has been described above how different access permissions may be selected based on which physical address is used to access a distinguishing-permissions subset of memory-mapped control registers. However, there may be certain memory-mapped control registers for which access permissions do not depend on which physical address is used to access that control register. Hence, in some examples, for at least a non-distinguishing-permissions subset of the at least one memory-mapped control register, the control register access circuitry may be configured to handle an access request to the item of control state using the same access permissions regardless of which physical address in the set of aliasing physical addresses is used to access the item of control state.

The use of a set of aliasing physical addresses for accessing a non-distinguishing-permissions control register may be beneficial even when the selection of physical address does not affect the access permissions used to handle the memory access request. For example, there may be one or more other attributes which can be relevant when handling a memory access request which could be signaled by selecting a particular physical address for the memory access request.

In addition, address aliasing can be useful in systems where multiple copies of register physical addresses are provided in different physical memory pages, where certain registers accessible via the physical memory page are in a distinguishing-permissions subset. A particular item of software may issue memory requests in a particular physical page of memory comprising physical addresses associated with a particular protection level so that the distinguishing-permissions subset of registers are accessed via that particular protection level. Including addresses of non-distinguishing-permissions control registers in the same page of memory as distinguishing-permissions control registers (and hence using address aliasing for the non-distinguishing-permissions control registers) means that software can issue a greater proportion of memory access requests to the memory-mapped control registers using the same page of memory. Enabling software to issue memory access requests to the same page of physical memory can allow translation information to be re-used for a greater proportion of memory access requests and hence can improve performance.

The non-distinguishing-permissions subset of memory-mapped control registers may comprise control registers from which sensitive information cannot be determined, and via which control information cannot be set incorrectly. For example, the non-distinguishing-permissions memory-mapped control registers may include a launch register which, when written to by the processing circuitry, controls the accelerator control interface circuitry to issue to a selected hardware accelerator a control signal. It may be desirable to allow each of a set of aliasing physical addresses mapped to the launch register to have access to the launch register so that each protection level is able to request a control signal be sent to a hardware accelerator (e.g. to request that the accelerator starts a new delegated task). Mechanisms may be provided to prevent control signals being issued to unavailable hardware accelerators (e.g. based on control state stored in other memory-mapped control registers), and hence there may be no requirement to limit access to the launch register based on which physical address is specified in a memory access request.

The non-distinguishing-permissions memory-mapped control registers may also or alternatively include a launch response register for indicating a launch response received from the selected hardware accelerator in response to the control signal, and/or a data register for indicating a data payload packet to be transmitted to the selected hardware accelerator. As with the launch register, these registers may be shared between several hardware accelerators, and may not provide any sensitive information or access controls.

In some examples, the apparatus may comprise memory management circuitry to perform address translation from virtual addresses to physical addresses, wherein the memory management circuitry is configured to determine whether a memory access request issued by a particular software process to a given virtual address is permitted to access a given physical address in the set of aliasing physical addresses. The memory management circuitry may provide a mechanism which restricts access of particular software processes to particular physical addresses, and hence which limits how software processes may access the set of memory-mapped control registers to control the set of hardware accelerators.

The memory management circuitry may control whether a particular translation is permitted based on at least one of whether a page table entry mapping the given virtual address to the given physical address has been established, and, if a page table entry mapping the given virtual address to the given physical address has been established, based on page table permissions associated with a page of virtual memory comprising the given virtual address. The page table information may be set by software, giving a software designer freedom to decide how access to the memory-mapped control registers may be granted to various software processes.

In some examples, the apparatus may comprise address storage configured to indicate a control register structure base address, addresses of each of the at least one memory-mapped control register being derivable from the control register structure base address. Hence, memory management circuitry may be configured to translate a given virtual address into a physical address for accessing the set of memory-mapped control registers based at least on the control register structure base address.

A protection level may be determined using a physical address in various ways. For example, the physical address may be used to lookup a table to associate a protection level with that physical address. In other examples, a relationship between physical addresses and protection levels may be hardwired. In some examples, the apparatus may comprise access mapping circuitry to detect, based on selected bits of a physical address in the set of aliasing physical addresses, which protection level is associated with that physical address.

In some examples, the aliasing physical addresses corresponding to the same item of control state may be provided at the same offset position within respective physical memory pages. This can enable different software processes to specify accesses to a given item of control state in the same way, with these virtual addresses being translated to different aliasing physical addresses by using a portion of the virtual address as an offset applied to different physical page addresses.

In some examples, the physical memory pages corresponding to the set of aliasing physical addresses may be provided at respective offsets from a register structure base address. For example, the physical memory pages corresponding to the set of aliasing physical addresses may be provided consecutively in a given portion of physical address space. This can be useful when deciding how to allocate physical memory, as the register physical pages may be allocated together to a region of physical address space not associated with storage locations in the memory system. In addition, providing physical memory pages at respective offsets from a register structure base address means that a particular physical address for a particular protection level may be calculated in a straightforward manner. For example, an offset corresponding to a particular protection level may be added to the control register structure base address to calculate the base address of a physical memory page comprising physical addresses for accessing the control registers in the particular protection level.

In some examples, an apparatus comprises processing circuitry to execute instructions, memory management circuitry associated with the processing circuitry, to perform address translation in response to memory access instructions executed by the processing circuitry, and accelerator control interface circuitry to exchange control signals with at least one hardware accelerator configurable, based on instructions executed by the processing circuitry, to perform a delegated task. The memory management circuitry is configured to support accelerator-triggered memory access requests from a given hardware accelerator that are associated with a translation context.

There is a possibility that an accelerator-triggered memory access request is associated with a different translation context than processor-triggered memory access requests from the processing circuitry. For example, after the accelerator has been configured to perform a task associated with a first translation context, a context switch may occur at the processing circuitry, and subsequent accesses from the accelerator may thereafter relate to a different context to the second translation context that is currently active at the processing circuitry.

One approach to handling the differing translation contexts is for the memory management circuitry to support only a single active translation context at a time, and if an accelerator-triggered memory access request is received from a different context to the currently active translation context, to either simply reject the accelerator-triggered memory access request with a fault indication indicating it cannot be serviced yet, or to trigger the processing circuitry to cause a context switch such that the active translation context of the memory management circuitry is the same as that of the accelerator-triggered memory access request. However, this approach would incur a performance cost, because accelerator-triggered accesses may be delayed and a more privileged piece of software, such as an operating system, may need to be called to manage the context switch, thus interrupting the process being executed by the processing circuitry. Nevertheless, embodiments supporting only a single active translation context at a time are possible and can be used.

Hence, in some examples, to improve performance, the memory management circuitry is configured to maintain a plurality of active translation contexts within a given translation regime. Each of the active translation contexts are defined by context information stored in a corresponding set of context control registers. Further, the apparatus comprises context fault generating circuitry to generate a context fault indication in response to an accelerator-triggered memory access request being associated with a translation context other than one of the plurality of active translation contexts. Since the memory management circuitry maintains a plurality of active contexts, as long as the hardware accelerator is using one of those active contexts, the hardware accelerator may access memory regardless of whether the processing circuitry is using a different active context. Therefore, the memory management circuitry can support processing an accelerator-triggered memory access request even if it is in a different translation context to the current context associated with the processing being carried out on the processing circuitry (which can be relatively likely when the processor executes a context switch while the accelerator still continues with a task previously configured prior to the context switch). Hence, supporting multiple active translation contexts can greatly improve performance by reducing the frequency with which accelerator-triggered memory access requests encounter a fault.

When there is a plurality of active translation contexts, the context-fault generating circuitry may identify that the accelerator-triggered memory access request is associated with a particular translation context. The context-fault generating circuitry may determine whether the translation context specified by the accelerator-triggered memory access request matches one of the plurality of active translation contexts. If there is a mismatch, such as when the translation context specified by the accelerator-triggered memory access request does not match any of the plurality of active translation contexts, the context-fault generating circuitry generates the context fault indication.

An active translation context may be defined as a translation context for which the memory management circuitry is currently enabled to obtain page table data from memory based on a current configuration of the context information stored in the corresponding set of context control registers. In examples that further comprise a translation data cache, such as a translation lookaside buffer (TLB), the entries of the translation data cache may include page table data associated with inactive translation contexts. Therefore, while the memory management circuitry may be enabled obtain that page table data of an inactive translation context from the translation data cache, it would not be currently enabled to obtain that page table data from memory.

For obtaining the page table data from memory, the memory management circuitry may perform a page table walk. Accordingly, the context information in a corresponding set of context control registers provide information, based on which, the memory management circuitry is enabled to perform the page table walk.

In some examples, it is possible for the memory management circuitry to fail to obtain the page table data corresponding to a target virtual address specified by the accelerator-triggered memory access request, even when the accelerator-triggered memory access request is associated with an active context. This may occur for various reasons, such as software not having configured a page table entry corresponding to the target virtual address, or having set incorrect information in the page tables (e.g. information not correctly encoded as a valid page table entry format). In response to such a failure to obtain the page table data, the memory management circuitry may generate a translation fault indication, which has a different encoding to the context fault indication. Accordingly, the processing circuitry and/or the hardware accelerator will be capable of differentiating between a translation fault indication and a context fault indication.

The context information may include various types of data for identifying one of the active contexts or, as above, information to enable the memory management circuitry to obtain page table data from memory. In some examples, the context information comprises a base address of a page table and/or table defining information indicative or one or more portions of an input address to be used for indexing into one or more levels of the page table. Accordingly, the memory management circuitry may use the context information for the purpose of translating a input address (e.g. a virtual address or intermediate physical address) specified in the accelerator-triggered memory access request into an output address (e.g. an intermediate physical address or physical address).

Hence, when multiple active translation contexts are supported, registers may be provided to simultaneously store multiple instances of the base address and/or multiple instances of the table defining information, so that page table walks are enabled to any of the active translation contexts without needing to reconfigure the context information in the control registers.

In some examples, the accelerator control interface circuitry is configured to return the context fault indication to the given hardware accelerator. Hence, as noted above for the fault handling, it can be useful to report the inactive context fault back to the accelerator, as this supports an asynchronous fault reporting mechanism which enables faults to be attributed to the software which configured the accelerator. In response to the context fault indication, the given hardware accelerator can store fault identifying information which can later be read by the processor issuing an accelerator register read request as mentioned earlier.

In some examples, even when a context fault indication is generated, the context fault generating circuitry is configured to generate the indication while allowing the processing circuitry to continue uninterrupted execution of instructions. Hence, software currently executing on the processing circuitry (which might not necessarily be the same as the software associated with the task being performed by the accelerator) does not need to be interrupted, thereby further avoiding the incurrence of a performance cost by the processing circuitry.

In accordance with the present techniques, the hardware accelerator is configured to perform the delegated task in association with the translation context which was a current translation context of the processing circuitry at the time of execution of an instruction for configuring the given hardware accelerator to perform the delegated task. Accordingly, any accelerator-triggered memory access requests generated as part of the delegated task are associated with that translation context. This allows the processing circuitry to configure the hardware accelerator to use one active translation context before potentially switching to a different active translation context, with both active translation contexts being able to be maintained as active contexts simultaneously by the memory management circuitry.

In some examples, the accelerator control interface circuitry is configured to record the translation context to be used as the accelerator translation context. For example, one of the instructions for configuring the given hardware accelerator to perform the delegated task may cause the processing circuitry to write the current context of the processing circuitry to a register or other storage element comprised in the accelerator control interface circuitry. On receipt of accelerator-triggered memory access requests from a given accelerator, the stored context identifier associated with that accelerator can be used to determine which context the memory access request relates to, and this context can then be confirmed with indications of the currently active translation contexts at the memory management circuitry to determine whether the context fault indication should be generated.

The processing circuitry may be configured to support a plurality of translation regimes. Different translation regimes may be associated with different behaviours and/or procedures of address translation. For example, one translation regime may define a single stage of address translation, such that a virtual address is translated directly into a physical address, while other translation regimes may involve multiple stages, such that a virtual address is translated into an intermediate physical address, which can then be translated into a physical address. Also, different translation regimes may be associated with different items of control register state for controlling address translation. In some examples, the active translation contexts that are maintained by the memory management circuitry comprises two or more active translation contexts associated with a same translation regime.

The current translation regime of the processing circuitry may be dependent on and/or identified by a current security state and/or privilege level of the processing circuitry. For example, in a more secure state/more privileged level, the current translation regime may include one address translation stage, whereas in a less secure state/less privileged level, the current translation regime may include two or more address translation stages. It will be appreciated that control states other than security state or privilege level may also influence the translation regime that is used, such as a virtual address being within a given range.

In some examples, when identifying whether the translation context specified by the accelerator-triggered memory access request matches one of the plurality of active translation contexts, the context fault generating circuitry is configured to refer to one or more of: an address space identifier, a virtual machine identifier, a privilege level, a security state, and an indication of a current translation regime. Any one or more of these may be stored in the corresponding set of context control registers as part of the context information.

When the plurality of active translation contexts is changed, for example so that a previously inactive translation context is made active or a previously active translation context is made inactive, the processing circuitry may update the context information associated with one or more of the plurality of active translation contexts in response to the execution of instructions.

In some examples, the memory management circuitry may be capable of identifying the source of a memory access request in order to differentiate between accelerator-triggered memory access requests and processor-triggered memory access requests. In other examples, the accelerator-triggered memory access request contains explicit or implicit identifying information to enable the memory management circuitry to determine that a particular memory access request is an accelerator-triggered memory access request.

The memory management circuitry supporting a plurality of active translation contexts may also be implemented micro-architecturally as a single circuit unit or as separate processor-side and accelerator-side units as described previously.

In some examples, a system includes the apparatus as described above and the hardware accelerator. The hardware accelerator comprises accelerator processing circuitry configurable, based on instructions executed by the processing circuitry, to perform a delegated task on behalf of the processing circuitry; control interface circuitry to exchange control signals with the apparatus; and memory access request circuitry to issue, to the apparatus via the control interface circuitry, the accelerator-triggered memory access request requesting access to a memory system and wherein the accelerator-triggered memory access request specifies a virtual address to be translated, by the memory management circuitry, into a physical address of a memory system location to be accessed in response to the accelerator-triggered memory access request.

In some examples, an apparatus comprises processing circuitry to execute instructions; and accelerator control interface circuitry to exchange control signals with at least one hardware accelerator configurable, based on instructions executed by the processing circuitry, to perform a delegated task; in which: the accelerator control interface circuitry is responsive to an accelerator command launch instruction executed by the processing circuitry, to output a command request to a given hardware accelerator associated with command data for configuring the given hardware accelerator to perform the delegated task. Hence, in such an example, the accelerator command launch instruction may be one of (at least) two types. An accelerator command-with-response launch instruction may be supported which, when executed by the processing circuitry, causes the command request to comprise a command-with-response request indicating that the given hardware accelerator is to acknowledge the command data associated with the command-with-response request. Such an indication that the given hardware accelerator is to acknowledge the command data may be included explicitly or implicitly in the command-with-response request (e.g. in some examples the command type may be sufficient to implicitly identify that an acknowledgement is required, so no specific request for acknowledgment may be needed). Accordingly, it can be expected that the given hardware accelerator would provide an acknowledgement that the command data has been received, which may be verified by further instructions executed by the processing circuitry. Also, an accelerator command-without-response request may be supported which, when executed by the processing circuitry, causes the command request to comprise a command-without-response request indicating that the given hardware accelerator does not need to acknowledge the command data associated with the command-without-response request.

It will be appreciated that for large workloads in which command data is frequently being output to the given hardware accelerator, a significant amount of the exchanged control signals would be the given hardware accelerator repeatedly returning acknowledgements to the apparatus. In some scenarios, this could be an excessive use of power and/or communication bandwidth, when such fine-grained acknowledgements may not be necessary. Also, reducing the number of acknowledgements returned by the accelerator can reduce software overhead at the processing circuitry in use cases where the software is polling for an accelerator acknowledgement before proceeding with a subsequent operation.

Hence, in some use cases, it is possible to utilise a stream of requests comprising both command-with-response requests and command-without-launch requests in order to output command data to the given hardware accelerator while controlling the extent to which the given hardware accelerator acknowledges the command data. For example, a sequence of one or more accelerator command-withoutresponse launch instructions may be used followed by an accelerator command-with-response launch instruction, with the final acknowledgement received in response to the accelerator command-with-response launch instruction serving to acknowledge each of the items of command data transferred in the sequence as a whole.

Therefore, greater control can be provided over the frequency of acknowledgements being communicated from the given hardware accelerator. Furthermore, since the two variants of command request are output in response to execution of the command launch instructions, such control may be provided directly to software being executed by the processing circuitry.

In some examples, the accelerator control interface circuitry is configured to generate a command stream interruption error indication in response to detecting that the given hardware accelerator has become unavailable following output of one or more command-without-response requests of an uncompleted stream of command requests which has not yet terminated with a command-with-response request. The hardware accelerator may become unavailable for a variety of reasons, such as a more privileged process assigning the accelerator to perform delegated tasks on behalf of a different process. This could mean that an earlier portion of the command stream already sent before the accelerator became unavailable will no longer be actioned and so would need to be resent after the process which sent the unfinished command stream regains use of the accelerator. Hence, it is useful to set a specific error indication indicating that the hardware accelerator became unavailable part way through an uncompleted stream of command requests, to give an indication that some of the command data has likely been lost and so would need resending later.

When an interruption occurs for the uncompleted stream of command requests, some remedial action may be required in order to complete the stream of command requests correctly. In some examples, the software, and by extension the processing circuitry may re-execute the accelerator command launch instructions associated with the uncompleted stream of command requests. Accordingly, to allow the software to identify that the interruption has occurred, the accelerator control interface circuitry is configured to record the command stream interruption error indication in a software-readable storage location that is accessible to the processing circuitry. The command stream interrupt error indication may have a different encoding from other error indications associated with the accelerator, to enable software to better identify the cause of the error.

Despite the interruption occurring for the uncompleted stream of command requests, it may still be possible for further accelerator command launch instructions to be executed by the processing circuitry (e.g. software may already have executed the launch instructions before it detected that the command stream interruption error has occurred). However, it is recognised that errors may occur in the configuration of the given hardware accelerator if the given hardware accelerator launches a new command having previously been interrupted when processing an uncompleted stream of command requests. Therefore, in some examples, the accelerator control interface circuitry is configured to maintain the command stream interruption error indication until the processing circuitry performs an error indication clearing operation (e.g. by re-executing the accelerator command launch instructions associated with the uncompleted stream of command requests). While the stream interruption error indication is maintained, the accelerator control interface circuitry is configured to suppress outputting further command requests, thereby reducing any potential errors occurring in the configuration of the given hardware accelerator.

When outputting command data to some examples of hardware accelerator, there may be a point at which the hardware accelerator cannot accept more command data without first acknowledging the command data that has already been received. For example, a hardware accelerator may buffer the received command data until that command data has been acknowledged. Therefore, it is possible for the hardware accelerator to run out of buffer capacity if a stream of command data is too long. Accordingly, the accelerator control interface circuitry may impose a maximum limit on a number of consecutive command-without-response requests to the given hardware accelerator.

The result of exceeding this maximum limit can vary, but in some examples, the accelerator control interface circuitry generates an overflow error indication, which may further be recorded in a software-readable storage location accessible to the processing circuitry. The overflow error indication allows software to take some appropriate action to resolve the overflow, such as by causing the re-execution of the associated accelerator command launch instructions including an accelerator command-with-response launch instruction as appropriate to not exceed the maximum limit. In other examples where the maximum limit is exceeded, the accelerator control interface circuitry may replace a next command-without-response request to the given hardware accelerator with a command-with-response request. Replacement of the command request by the hardware allows the output of command data to continue and avoids the performance cost in having to interrupt an ongoing process in software so that an overflow error handler can resolve the overflow.

In some examples, the accelerator command launch instructions comprise store instructions specifying an address mapped to a launch control storage location of the accelerator control interface circuitry. When executed, the processing circuitry causes data to be stored to the address mapped to the launch control storage location. In some examples, the data stored by the accelerator command launch instructions is not the command data, but rather some other launch data (e.g. the launch data may define the type of command being launched, which accelerator is the given hardware accelerator, etc.). The command data itself may instead be obtained, in response to the store instruction, from at least one data register of the accelerator control interface circuitry. That at least one data register is writable by software executing on the processing circuitry, such that software is capable of writing the command data into the at least one data register before executing an accelerator command launch instruction.

The accelerator command-with-response launch instruction and the accelerator command-without-response launch instruction can be differentiated from each other in a number of ways. In some examples, each instruction is individually defined in an instruction set architecture (e.g. each instruction having a unique opcode identifying it as an accelerator command launch instruction). In other examples, where the accelerator command launch instruction comprises a store instruction specifying an address mapped to a launch control storage location of the accelerator control interface circuitry, the accelerator control interface circuitry is configured to identify whether a given store instruction corresponds to the accelerator command-with-response launch instruction or the accelerator command-without-response launch instruction based on an encoding of the store data specified by the given store instruction. This allows the processing circuitry to re-use ordinary store instructions for triggering the respective types of command-with-response and command-without-response requests.

In some examples, it is useful for an acknowledgement from the given hardware accelerator to be expressly verified by software. Accordingly, in response to receiving an acknowledgement of the command data associated with the command-with-response request from the given hardware accelerator, the accelerator control interface circuitry may set a corresponding response state in a response storage location that is readable by software executing on the processing circuitry. The use of command-without-response requests can help reduce the number of times software needs to poll the response storage location when transferring a given amount of command data, so can improve processing performance for the software.

The corresponding response state may vary depending on the acknowledgement received from the given hardware accelerator. The response state may be any one of: an indication that the given hardware accelerator has accepted the command-with-response request and, if applicable, one or more preceding command-without-response requests; an indication that the given hardware accelerator is busy; and/or an error indication indicating that the given hardware accelerator has detected an error associated with the command-with-response request or the one or more preceding command-without-response requests. By setting a corresponding response state in this way in a storage location that is readable by software, the software can either verify that the command request has been accepted or determine that some remedial action may be required (e.g. by re-executing the accelerator command launch instructions).

When outputting a stream of command requests, a command-with-response request may be associated with one or more preceding command-without-response requests. In some examples, although the accelerator control interface circuitry may only receive an acknowledgement of the command-with-response request (without individual acknowledgements of each of the one or more preceding command-without-response requests), the accelerator control interface circuitry may nonetheless interpret that acknowledgement as an acknowledgement of the one or more preceding command-without-response requests.

Accordingly, despite the fact that no acknowledgement of the command-without-response requests is explicit communicated, an implicit acknowledgement of the command-without-response requests can be included in the acknowledgement of the command-with-response requests.

In some examples, it is useful for the given hardware accelerator to be able to identify which command requests are to be considered in groups, such that when a command-with-response request is received, an acknowledgement may be considered to acknowledge any preceding command-without-response requests that are considered to be in the same group. The indication of command groupings can also be helpful for managing internal buffers provided at the accelerator for buffering command data. Therefore, in some examples, the accelerator control interface circuitry outputs a command-with-response request comprising an indication of whether the command-with-response request is associated with one or more preceding command-without-response requests.

Similarly, the accelerator control interface circuitry may indicate that a command-without-response request is the first of a new stream of one or more command requests associated with configuring the given hardware accelerator to perform the delegated task. Accordingly, the given hardware accelerator will expect to receive additional command requests associated with the same delegated task.

In some examples, a hardware accelerator comprises accelerator processing circuitry configurable, based on instructions executed by a processor, to perform a delegated task on behalf of the processor; and control interface circuitry to exchange control signals with the processor; in which: the control interface circuitry is responsive to a command request associated with command data, to configure the hardware accelerator to perform the delegated task based on the command data. When the command request is a command-with-response request, the control interface circuitry is configured to output a signal to the processor indicating an acknowledgement of the command data associated with the command-with-response request, whereas when the command request is a command-without-response request, the control interface circuitry is configured to suppress outputting the signal to the processor indicating the acknowledgement of the command data associated with the command-without-response request.

The hardware accelerator may comprise a task buffer, in which the control interface circuitry stores the command data. The task buffer may be used to temporarily store command data received in one command request or command data cumulatively received in a plurality of command requests. In some examples, the hardware accelerator may anticipate a plurality of command requests in response to receiving a command request specifying that the command request is a first request of a stream of one or more command requests associated with configuring the hardware accelerator to perform the delegated task. In such examples, the control interface circuitry may initialise a portion of the task buffer allocated for a stream of command data. Accordingly, the portion of the task buffer is kept available for later command requests in the stream associated with the same delegated task.

As discussed above, a stream of command requests received by the hardware accelerator may be considered in groups, e.g. as indicated by the processor. Accordingly, when a command-with-response request is associated with one or more preceding command-without-response-requests, the acknowledgement that is output in response to the command-with-response request may also serve as an acknowledgement of the command-without-response requests. Accordingly, the control interface is not required to output as many acknowledgements, and may instead acknowledge the command data in groups.

The specific information contained in such an acknowledgement may vary. In some examples, the acknowledgement of the command data associated with the command-with-response request may be indicative of one of: the hardware accelerator having accepted the command-with-response request and, if applicable, one or more preceding command-without-response requests; the hardware accelerator being busy; and the hardware accelerator having detected an error associated with the command-with-response request or the one or more preceding command-without-response requests. By including such indications in the acknowledgement, the processor is then able to perform any additional action as necessary.

Particular examples will now be described with reference to the Figures.

FIG. 1 schematically illustrates a data processing apparatus comprising a central processing unit (CPU) 4. The CPU 4 may include one or more processor cores, although only one core is shown in FIG. 1.

The CPU 4 comprises processing circuitry 6 to execute instructions defined in an instruction set architecture (ISA) to carry out data processing operations represented by the instructions. The processing circuitry 6 performs operations on data loaded from a memory system, and may store the results back to the memory system. In this example the memory system includes a level one cache 10, a level two cache 20, and main memory 24, but it will be appreciated that this is just one example of a possible memory hierarchy and other implementations can have further levels of cache or a different arrangement. For example, separate level one caches 10 may be provided for instructions and data. The provision of caches 10, 20 within the CPU 4 enables faster access to data than from memory 24 (which can include on-chip and/or off-chip memory 24).

The CPU 4 also comprises a memory management unit 16 (MMU, an example of memory management circuitry), to perform address translation in response to memory access instructions executed by the processing circuitry. The MMU 16 translates virtual addresses specified by memory access requests into physical addresses identifying storage locations of data in the memory system. The MMU 16 has a translation lookaside buffer (TLB) 18 for caching address translation data from page tables stored in the memory system, where the page table entries of the page tables define the address translation mappings and may also specify access permissions which govern whether a given process executing on the pipeline is allowed to read, write or execute instructions from a given memory region.

The data processing apparatus also includes one or more hardware accelerators 22 configurable, based on instructions executed by the processing circuitry 6, to perform a delegated task, asynchronously with respect to operations performed by the processing circuitry 6 in response to executed instructions. A hardware accelerator 22 is unique (private) to a single processor core 4, and therefore may be referred to as a core local accelerator (CLA). The hardware accelerator 22 is controlled by, and communicates with the memory system via, an associated processor core 4. The CPU 4 therefore comprises accelerator control interface circuitry 14 (a core local accelerator control module (CLAC)) to exchange control signals with the at least one hardware accelerator 22.

The hardware accelerators 22 access the memory system via the CPU 4, and issue accelerator-triggered memory access requests using virtual addresses. In response to an accelerator-triggered memory access request received at the accelerator control interface circuitry 14 from a given hardware accelerator 22, the MMU 16 translates a virtual address specified by the accelerator-triggered memory access request to a physical address of a memory system location to be accessed in response to the accelerator-triggered memory access request. Hence, the hardware accelerator reuses the memory management circuitry of the processing circuitry for address translation. The MMU 16 may translate the virtual address of an accelerator-triggered memory access request according to address mapping information associated with the virtual address and a given address translation context. The address translation context may be an address translation context which was a current address translation context of the processing circuitry 6 at the time of execution of an instruction which caused launch of an accelerator command which caused the accelerator-triggered memory access request to be issued (e.g., the address translation context at the time a task was delegated), and hence may be a different address translation context to a current address translation context of the processing circuitry 6.

As will be discussed below, in some examples, address translation faults arising from translation of accelerator-triggered memory accesses may be handled differently to faults arising from translation performed in response to memory access instructions executed by the processing circuitry 6. In particular, faults arising from translation of accelerator-triggered memory accesses may be signaled to the hardware accelerator 22 which issued the request and may not trigger an exception, enabling fault handling for those accesses to be deferred until a point at which the software running on the processor 6 is the software which configured the accelerator 22 to perform the delegated task which encountered the address translation fault for one of its memory accesses.

Figure 2:
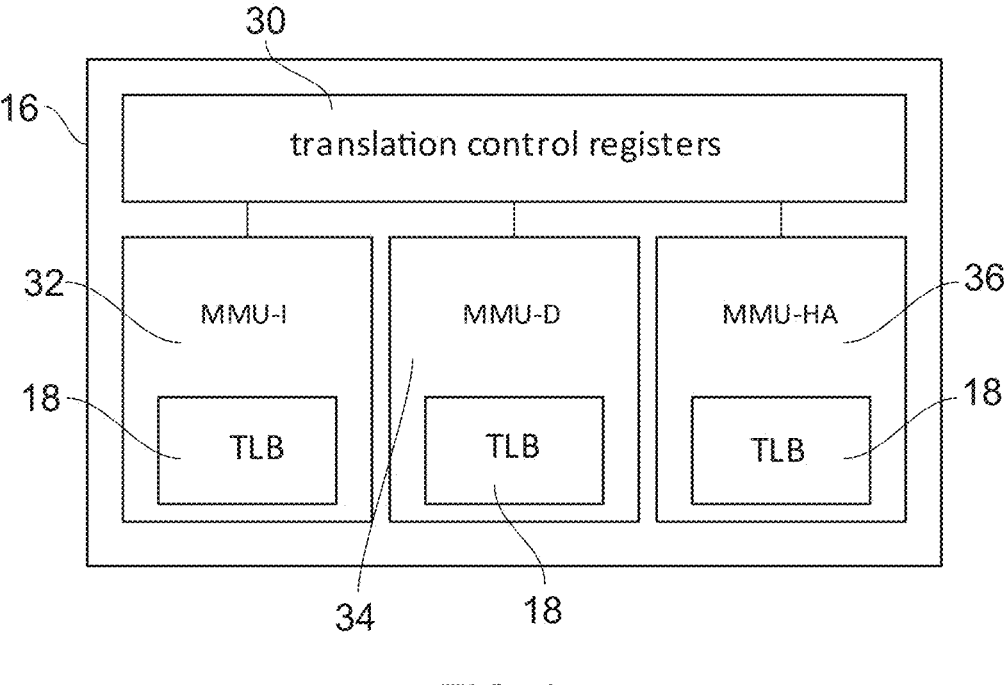
FIG. 2 schematically illustrates an example MMU which may be provided by a CPU in the present techniques.

FIG. 2 schematically illustrates one example of the MMU 16 configured to support address translation for one or more hardware accelerators. As shown in FIG. 2, the MMU 16 comprises a common set of translation control registers 30, for specifying information for controlling how the address translation is performed for both the memory access instructions executed by the processing circuitry and the accelerator-triggered memory access request received from the given hardware accelerator. The MMU 16 comprises, as separate micro-architectural units, processor-side MMU circuitry 32 and 34 to perform address translation in response to the memory accesses of the processing circuitry 6, and accelerator-side MMU circuitry 36 to perform address translation in response to the accelerator-triggered memory access request received from a given hardware accelerator 22. In the example of FIG. 2 the processor-side MMU circuitry comprises separate circuitry for performing address translation for memory accesses to access instructions (MMU-I 32) and data (MMU-D 34). Each instance of circuitry within the MMU may comprise a separate TLB 18 for storing cached copies of page table information specific to translations performed by that unit.

Despite being provided in some examples as separate micro-architectural circuitry, from a software perspective the MMU 16 acts as a single unit because it is configurable via a common set of software-configurable translation control registers 30. Hence, a single register write operation by the processing circuitry 6 may update translation control information (such as a translation table base address or translation table structure defining information), which may influence translation of both the processor-triggered accesses generated in response to memory access instructions executed by the processing circuitry 6 and the accelerator-triggered accesses triggered by a given hardware accelerator 22. Hence, from an architectural point of view the MMU 16 in FIG. 2 can be viewed as a single memory management unit, even if it comprises separate sub-components dedicated to particular classes of access requests.

Figure 3:
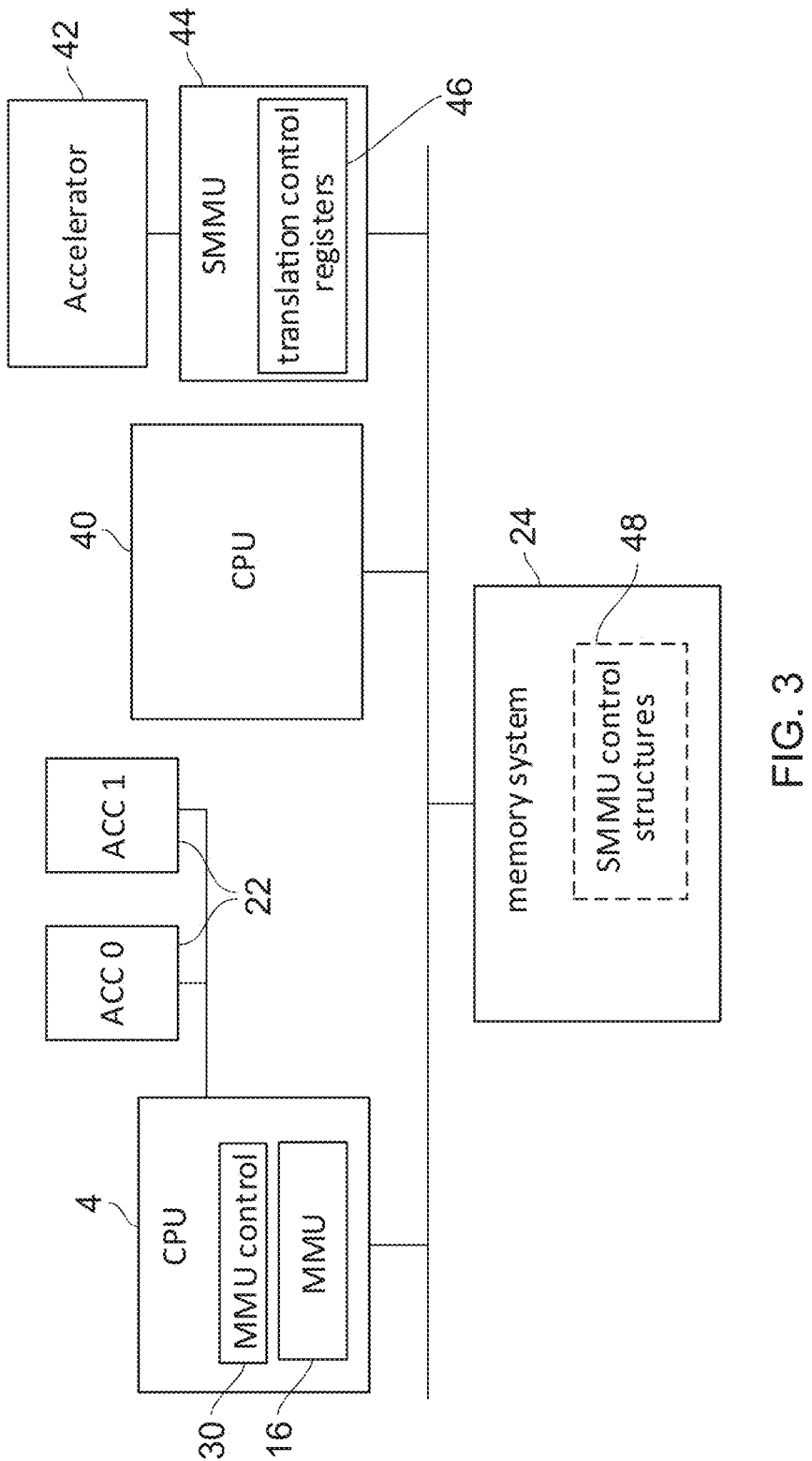
FIG. 3 schematically illustrates a data processing system.

FIG. 3 schematically illustrates a data processing system comprising the CPU 4 (having one or more hardware accelerators 22) and memory 24 shown in FIG. 1, in addition to a further CPU 40, a non-local hardware accelerator 42, and a system memory management unit (SMMU) 44.

CPU 40 is a separate processor to CPU 4. Therefore, CPU 40 does not have access to core local hardware accelerators 22 local to CPU 4, as these hardware accelerators are private to CPU 4. In comparison, CPU 40 and CPU 4 may both delegate tasks to the non-local accelerator 42. Tasks may be delegated to the non-local hardware accelerator 42 via a memory bus, in comparison to core local accelerators 22 to which tasks may be delegated via a private communication channel between CPU 4 and the core local accelerators 22 (that communication channel being discussed in greater detail below).

In comparison to core local accelerators 22 which issue accelerator-triggered memory access requests to the CPU 4 for translation, the non-local accelerator 42 issues, for translation, memory access requests to a system memory management unit (SMMU) 44 separate from the memory management circuitry associated with a particular processor. The SMMU 44 controls address translation using a set of translation control registers 46 which are entirely separate from the control registers 30 used to control address translation for the MMU 16. A particular processor 4, 40 may control the SMMU translation control registers 46 by writing to an SMMU control structure 48 in memory 24. Hence, there is a considerably higher control overhead associated with CPU 4 updating control state 46 for SMMU 44 compared with updating control state 30 for MMU 16, as updating SMMU 44 control state 46 involves accessing a control structure 48 in memory instead of writing to local registers 30. The SMMU 44 is architecturally visible as an entirely separate translation unit compared to the MMU 16 in the CPU 4.

In some examples, the processing circuitry 6 may support execution of instructions in an ISA providing a class of accelerator control instructions, separate from load/store instructions, for controlling the accelerator interface circuitry 14 to perform functions such as launching accelerator commands, checking on accelerator status, reading internal accelerator state, writing other accelerator control registers, etc.

However, in other examples, the CPU 4 may comprise memory-mapped register storage accessible in response to load/store instructions executed by the processing circuitry 6 specifying target addresses mapped to the memory-mapped register storage. Hence, accelerator commands may be triggered by execution of load/store instructions which specify addresses mapped to the memory-mapped register storage, illustrated in FIG. 1 as the "CLAC registers" 23. The CPU 4 (via the accelerator interface circuitry 14) may control operation of the at least one hardware accelerator 22 by writing to and reading from the memory-mapped register storage. Hence, the processing circuitry 6 can control operation of a hardware accelerator 22 using conventional load/store instructions (with the address of the load/store instructions distinguishing accelerator control instructions from other load/store instructions targeting locations in the memory system 10, 20, 24).

FIG. 4 schematically illustrates an example set of memory-mapped control registers 23 provided in CPU 4 for controlling operation of one or more core local hardware accelerators 22. In particular, FIG. 4 illustrates control registers which may be provided for controlling a set of up to eight hardware accelerators 22 (it will be appreciated that while a maximum of 8 accelerators is supported by the register state encoding shown, a given hardware implementation may not necessarily have that many accelerators, and also that the maximum of 8 is just one example, while other examples may support a different maximum number of accelerators).

FIG. 5 provides an example arrangement of the memory-mapped registers in a memory page and indicates whether each register is read only (R), write only (W), or both readable and writable (RW). The physical address of each memory-mapped register can be derived by combining a base address of the physical register page with the offset associated with a particular memory-mapped control register.

Various example encodings for the memory-mapped control registers and hardware accelerator registers are provided in Figures below. It will be appreciated that while these encodings may assign certain bits to a particular field, the selection of specific bits of registers used to indicate particular pieces of information is arbitrary, and other examples could assign different bits for each piece of information.

As shown in FIG. 4 the set of memory-mapped control registers 23 comprises a set of eight data port registers 400 (DATA). The DATA registers are used to store input and output parameters for control commands communicated between the CPU 4 and a hardware accelerator 22. Examples of using the DATA registers will be discussed below. In the example of FIG. 4, each DATA register stores 64 bits of data so that the set of DATA registers collectively stores 64 bytes of data. However, it will be appreciated that the size of each DATA register and the number of DATA registers provided may both be varied within the scope of the present techniques (and it is noted that, while in this example the number of DATA registers happens to match the maximum number of accelerators supported (eight), this is not essential and there is no reason why the number of DATA registers has to match the maximum number of accelerators—the maximum size of DATA that can be transferred with one command can be selected independent of the maximum number of accelerators supported).

It is noted that the DATA registers 400 do not provide the main path for communicating processing data between the memory system and the hardware accelerator 22. As will be discussed with reference to FIG. 17, separate read and write paths are provided for the communication of processing data between memory and the hardware accelerators (via the interface circuitry 14). The DATA registers 400 are provided to enable parameters to be specified by software for different control commands for controlling the hardware accelerator 22.

The set of memory-mapped control registers 23 also comprises a LAUNCH register 402. Processing circuitry 6 can cause accelerator control signals to be issued to a given hardware accelerator 22 by writing to the LAUNCH register 402.

FIG. 6 provides an example encoding scheme for the LAUNCH register. As illustrated in FIG. 6, writing different values to the LAUNCH register indicates that the processing circuitry 6 requests the hardware accelerator control interface circuitry 14 to initiate different operations for performance by the hardware accelerator 22. In the encoding of FIG. 6, a launch operation type field is provided by bits [3:0] of the LAUNCH register, the launch operation type field identifying a particular operation type. A launch payload size field is provided by bits [6:4] of the LAUNCH register, the launch payload size field identifying, for operations involving transactions supporting a variable number of payload words, a number of payload words of the transaction (those payload words being obtained from the DATA registers mentioned earlier). A sequence indicator field "seq" is provided by bit [7] of the LAUNCH register, the sequence indicator field supporting the use of compound commands, as discussed below. A target hardware accelerator identifying field is provided by bits [10:8] of the LAUNCH register, the target hardware accelerator identifying field identifying a target hardware accelerator 22 for the operation. A register identification field is provided by bits [63:32] of the LAUNCH register, used to identify at least one target register for REGREAD and REGWRITE operations for reading from and writing to registers of the hardware accelerator 22.

The DATA in/out columns of FIG. 6 indicate whether the corresponding command causes data to be transferred from the DATA registers 400 to a given hardware accelerator (DATA in) or from a hardware accelerator to the DATA registers (DATA out). The assign context column indicates whether the accelerator translation context is assigned at operation launch, to be discussed below. The mode column indicates in which modes the operation is supported, the two supported modes including the CMD (command) mode and the SR (save/restore mode) to be discussed below.

FIG. 6 illustrates the encoding of the LAUNCH register which, when written to by the processing circuitry 6, requests the interface circuitry 14 to initiate any of the following commands (depending on encoding of the launch operation type field LAUNCH[3:0]):

RESET requests that the interface circuitry 14 initiates an operation to request that a target hardware accelerator clears its internal state.

CMD and CMDNR are used to request the interface circuitry 14 to launch accelerator-specific control commands to a target hardware accelerator. The encoding of the communicated accelerator-specific command will depend on the DATA registers 400. CMD and CMDNR provide a mechanism by which details of a delegated task may be communicated with a target hardware accelerator. CMD instructs the interface circuitry 14 to issue a command-with-response request to the target hardware accelerator, and CMDNR instructs the interface circuitry 14 to issue a command-without-response request to the target hardware accelerator, where as discussed further below the support for the CMDNR command can be useful to reduce the number of times the accelerator needs to acknowledge command launch events and reduce the number of times software needs to poll a launch response register.

PAUSE requests that the interface circuitry 14 initiates an operation to request that a target hardware accelerator enters a paused mode.

ENTERSR and EXITSR request that the interface circuitry 14 initiates an operation to request a target hardware accelerator to enter or exit a save/restore mode (SR mode in the supported mode column). The save/restore mode supports saving and restoring of internal state of a hardware accelerator to and from memory, for example by preventing issuing of memory transactions.

SAVE and RESTORE request that the interface circuitry 14 initiates an operation to request internal state of a target hardware accelerator to be saved to, or restored from, a buffer data structure in memory. The address of the buffer data structure is identified using the DATA registers 400, e.g., using the single register DATA[0]. The size of the buffer can be determined based on the IASSIZE register in the hardware accelerator 22, described in FIG. 13.

RESUME requests that the interface circuitry 14 initiates an operation to request that a target hardware accelerator continues processing by leaving a paused state.

RESOLVE requests that the interface circuitry 14 initiates an operation to signal to a target hardware accelerator that a number of faults have been resolved. Software sets a 32 bit bitmask in the DATA[0] register to indicate which faults are resolved from a set of 32 possible faults indicated by the hardware accelerator 22 (discussed below). When the LAUNCH register is written with a RESOLVE encoding, this causes a RESOLVE request specifying the bitmask to be issued to the target hardware accelerator indicated by the accid field specified in the data written to LAUNCH register.

REGREAD and REGWRITE request that the interface circuitry 14 initiates an operation to read from, or write to, one or more consecutive registers of the target hardware accelerator 22. A 32 bit register index is specified in the register identification field, LAUNCH[63:32], of the LAUNCH register 402 to identify a target register, and a number of registers is indicated in the ndata_m1 field of the LAUNCH register 402. The hardware accelerator control interface circuitry 14 is therefore configured to read from or write to the indicated number of accelerator registers with consecutive accelerator register identifiers, starting from the identifier of the target register. The DATA registers 400 are used to store the input or output of the write or read operations respectively. FIG. 4 indicates eight DATA registers, and the registers of the hardware accelerator 22 may have the same size as the 64 bit DATA registers, meaning that REGREAD and REGWRITE may in this example support reading or writing of up to eight consecutive registers. However, other examples may encode the accelerator registers to be read/written in a different way, e.g. using a bitmap to identify which accelerator registers are to be read/written. As shown in FIGS. 4 and 5, the set of memory-mapped control registers 23 also comprises a launch response LRESP register 404. The LRESP register 404 is used to indicate a response to a previous write to the LAUNCH register 402.

Figure 8:
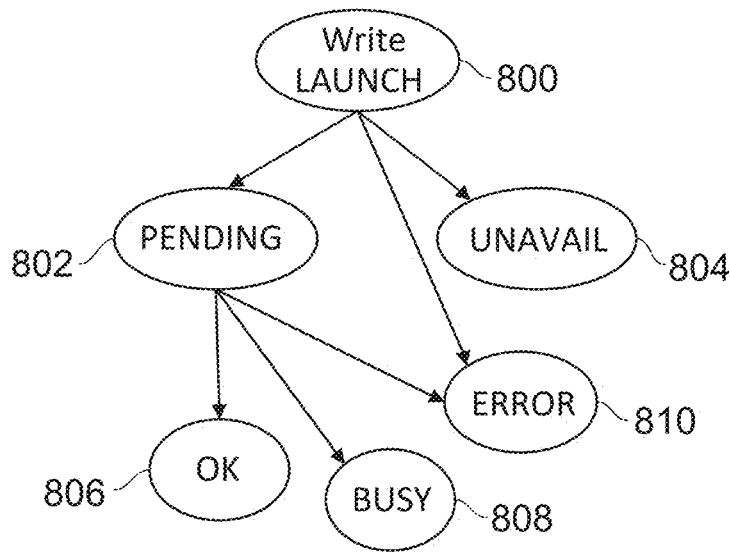
FIG. 8 is a state diagram illustrating states of a hardware accelerator indicated by the LRESP control register.

FIG. 7 provides example encodings of the LRESP register 404. FIG. 8 is a state diagram indicating states of a hardware accelerator 22 indicated by LRESP 404.

LRESP[0] is the LRESP_PENDING field, and indicates that a response to a previous LAUNCH is still pending. A response is pending if an operation has been signaled to a given hardware accelerator but a response to that signal has not yet been received. If software polls the LRESP register when LRESP_PENDING is set, this may indicate that the software should try again later as the contents of the other fields cannot be relied on. As shown in FIG. 8, a given hardware accelerator enters the pending state 802 first after writing to LAUNCH at stage 800, unless the given hardware accelerator is unavailable or an error is identified by the interface, in which case the hardware accelerator directly enters the ERROR state 810 without needing to wait for a response from the accelerator. Availability of the given hardware accelerator can be determined locally at the CPU 4 and hence entry into the unavailable state 804 does not depend on a response from the given hardware accelerator.

LRESP[2:1] provides an LRESP_CODE field indicating, when a response is not pending, a response to the operation triggered by writing to LAUNCH. LRESP_CODE identifies whether the operation was successfully launched using the OK state 806 (this does not necessarily mean that the operation requested by the command launch has necessarily completed, but at least indicates that the accelerator can accept the request to perform that operation). For CMD, CMDNR, SAVE and RESTORE operations OK indicates successful start (and progress can be monitored using the STATUS register), whereas for other operations OK indicates successful completion. LRESP_CODE indicates that the given hardware accelerator was busy using the BUSY state 808, there has been an error using ERROR state 810, or whether the accelerator is unavailable using UNAVAIL state 804.

If LRESP_CODE=LRESP_ERROR, then the target hardware accelerator 22 of the most recent LAUNCH is in an error state and software executing on processing circuitry 6 of the CPU 4 must clear the LRESP_CODE before it is possible to launch a new operation (otherwise writes to LAUNCH may be ignored). LRESP[7:3] provide an LRE-SP_ERRCODE field in the case that the LRESP_CODE indicates an ERROR. Example encodings of LRESP_ERR-CODE are provided in the bottom half of FIG. 7. In this example, LRESP_ERRCODE may include 5 bits and hence may have 32 possible encodings. Each encoding may correspond to a different error.

For example, the encodings of LRESP_ERRCODE may indicate: ERRCODE_CSINT when an accelerator has become unavailable during command streaming.

ERRCODE_CSOF when too many CMDNR commands have been launched consecutively during command streaming without an intervening CMD command.

ERRCODE_LWPEND when the LAUNCH register was written to with an operation other than CMDNR whilst LRESP_PENDING was set.

ERRCODE_TIMEOUT when no response has been received from an accelerator for above a predetermined number of cycles.

ERRCODE_NOACC when the accid written to the LAUNCH[10:8] does not correspond to an accelerator present in the system.

ERRCODE_INVAL when the LAUNCH or DATA[0:7] registers include invalid content.

LRESP_ERRCODE may also provide error codes specific to particular types of accelerator to provide greater flexibility in error reporting.

As shown in FIGS. 4 and 5, the set of memory-mapped control registers 23 also comprises a set of status reporting registers STATUS[0:7]414. Unlike the other registers 400 to 412, which are shared between hardware accelerators, the STATUS registers are each unique to a particular hardware accelerator 22. Each STATUS register 414 is used to report information about a corresponding hardware accelerator 22 to the CPU 4. An example encoding of a STATUS register is provided in FIG. 9. At least some fields of the STATUS register (and in the example of FIG. 9, all fields with the exception of STATUS_AVAIL) are set in response to status transactions sent by a corresponding hardware accelerator to the CPU 4, as illustrated in FIG. 20M.

As illustrated in FIG. 9, the STATUS register may provide a number of fields indicating properties of the given hardware accelerator, as follows: STATUS[0] provides a STA-TUS_AVAIL field indicating whether the corresponding hardware accelerator is available. If the hardware accelerator is not available, then the STATUS register reads as zero.

STATUS[1] and STATUS[15:9] in the example of FIG. 9 are reserved and read as zero.

STATUS[2] provides a STATUS_IDLE field indicating whether the corresponding hardware accelerator is in an idle state. In the idle state the accelerator does not have any current or pending work to do.

STATUS[3] provides a STATUS_READY field indicating whether the corresponding hardware accelerator 22 is ready to accept more commands from the CPU 4.

STATUS[4] provides a STATUS_FAULT field indicating whether the corresponding hardware accelerator has a pending address translation fault.

STATUS[5] provides a STATUS_EXCEPT field indicating whether the corresponding hardware accelerator has a pending exception other than an address translation fault.

STATUS[6] provides a STATUS_PAUSE field indicating whether the corresponding hardware accelerator is in a paused state.

STATUS[7] provides a STATUS_EVENT field indicating whether the corresponding hardware accelerator has a pending event.

STATUS[8] provides a STATUS_SRMODE field indicating whether the corresponding hardware accelerator is in the save/restore (SR) mode or the CMD mode.

STATUS[63:16] provides a STATUS_USER field which can be used to provide status information specific to a particular type of hardware accelerator 22.

The set of memory-mapped control registers 23 also comprises an EVENT register 412.

The EVENT register 412 provides a flag per hardware accelerator 22 indicating whether that hardware accelerator has a pending event.

A basic example of the use of the memory-mapped control registers to control a given hardware accelerator follows. A code segment for implementing this example may be surrounded by memory barrier instructions (data memory barrier DMB) to prevent errors arising from reordering.

1. Write command information to DATA[ ] register(s)
2. Write to LAUNCH register, identifying desired operation and target hardware accelerator
3. Read LRESP register, poll if LRESP_PENDING
4. If LRESP_OK, poll STATUS register of target hardware accelerator to monitor for completion of operation The set of memory-mapped control registers 23 shown in FIGS. 4 and 5 also comprises three protection-level (PL) control registers PL0CTRL 406, PL1CTRL 408, and PL2CTRL 410, which may be collectively referred to as PLxCTRL registers (x being 0, 1 or 2). The protection level control registers can be used to indicate whether a given hardware accelerator 22 is available to code executing on the processing circuitry 6 of the CPU 4 capable of issuing memory accesses in a particular protection level. The concept of protection levels will be described below, but in general accesses to the memory-mapped registers may be associated with a given protection level in a hierarchy of protection levels. In some cases, the protection level associated with an access request depends on a physical address of that access request. Physical addresses for accessing the set of control registers in a particular protection level may be defined in a physical page of memory, such that there may be a number of "register pages" of physical memory, each register page associated with a particular protection level and providing addresses for accessing the control registers in that particular protection level. Addresses mapped to the same control register may be provided at the same position in each register page, as indicated by the offset column of FIG. 11.

Mechanisms can be used to control whether code can issue an access in a given protection level, for example page table entries in an MMU may restrict access from a particular instance of code to addresses associated with a particular protection level, preventing that instance of code from accessing the memory-mapped control registers in a particular protection level.

FIG. 10 indicates an example encoding of each PLxCTRL register. As shown in FIG. 10, each PLxCTRL register provides, for each accelerator, 8 bits of control information. Hence, a 64 bit PLxCTRL register can support up to eight hardware accelerators 22. For each accelerator, as one of the eight bits of control information, each PLxCTRL register provides an availability bit PLCTRL_AVAIL indicating whether that accelerator is accessible for operations launched from protection level PLx. The PLxCTRL registers can also be used to mask access to the EVENT and STATUS registers so that accesses in certain protection levels are unable to observe details of hardware accelerators which are unavailable to that protection level.

FIG. 11 is a table indicating the accessibility of memory-mapped registers 23 from particular protection levels. The data register, launch register, and launch response register (DATA, LAUNCH, and LRESP) are accessible to all accesses from any protection level. Hence, these are examples of a non-distinguishing-permissions subset of memory-mapped registers as mentioned earlier, as these registers can be accessed from any protection level (from any of the aliasing physical addresses mapped to those registers).

Each protection level control register PLxCTRL controls access to hardware accelerators for protection level PLx. Hence, each PLx control register is not settable by protection level PLx or any lower protection levels. Therefore, for example, PL1CTRL is inaccessible to accesses associated with protection levels PL0 or PL1, but is accessible to accesses associated with protection levels PL2 or PL3. Attempted accesses to a PLxCTRL register from a protection level not permitted to access that register will be treated as RAZ/WI (read-as-zero, write ignored).

Figure 30:
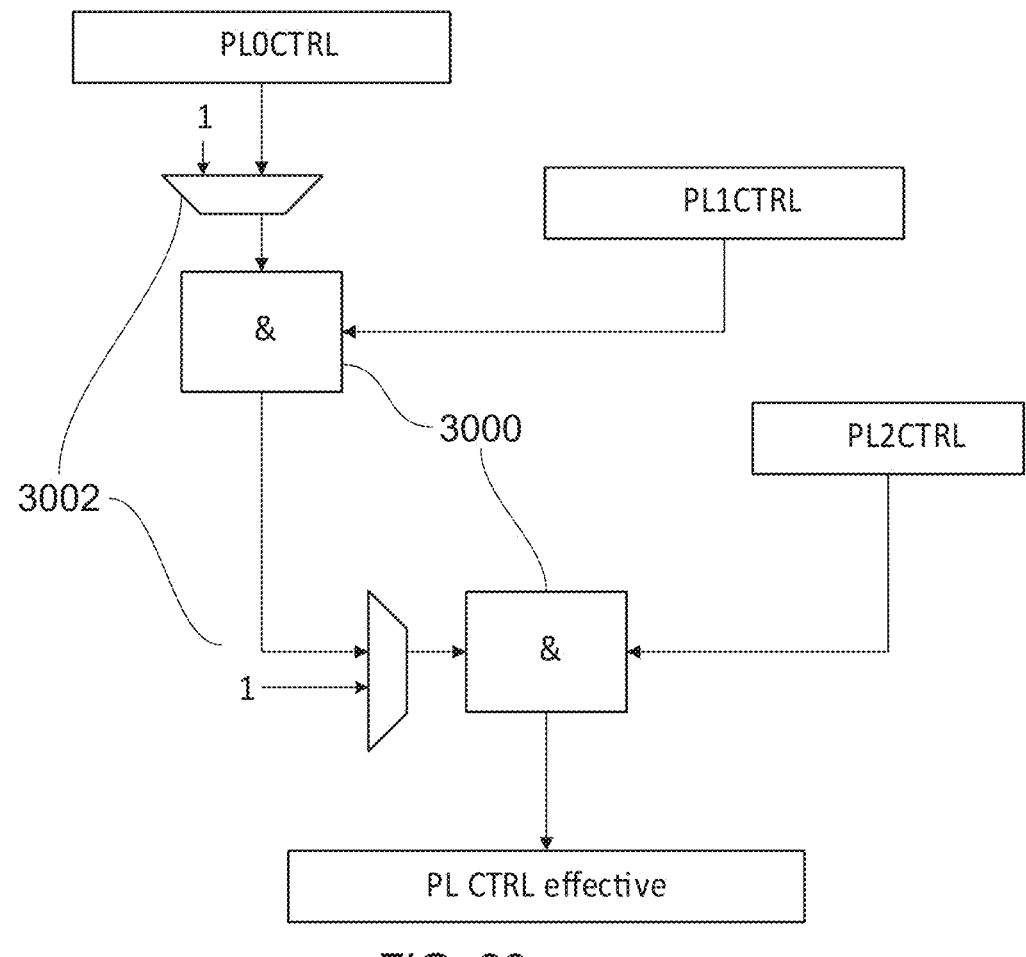
FIG. 30 schematically illustrates example logic for combining protection level control registers.

The EVENT and STATUS registers may contain sensitive information relating to the operation of a particular hardware accelerator 22. Therefore, access to the EVENT and STATUS registers is masked based on the PLxCTRL registers to prevent a protection level to which a given hardware accelerator is unavailable from accessing the EVENT or STATUS information associated with that hardware accelerator. FIG. 30 will describe how a mask can be generated for a particular protection level from the PLxCTRL registers, but in general the mask for controlling access to EVENT or STATUS registers at a particular protection level is based on a combination of the PLCTRL_AVAIL flag in the protection level registers associated with that particular protection level or higher.

Hence, the PLxCTRL registers and EVENT and STATUS registers are examples of a distinguishing-permissions subset of memory-mapped registers as discussed earlier, as the permission to access these registers depends on which of the aliasing physical addresses is used to access these registers.

Figure 12:
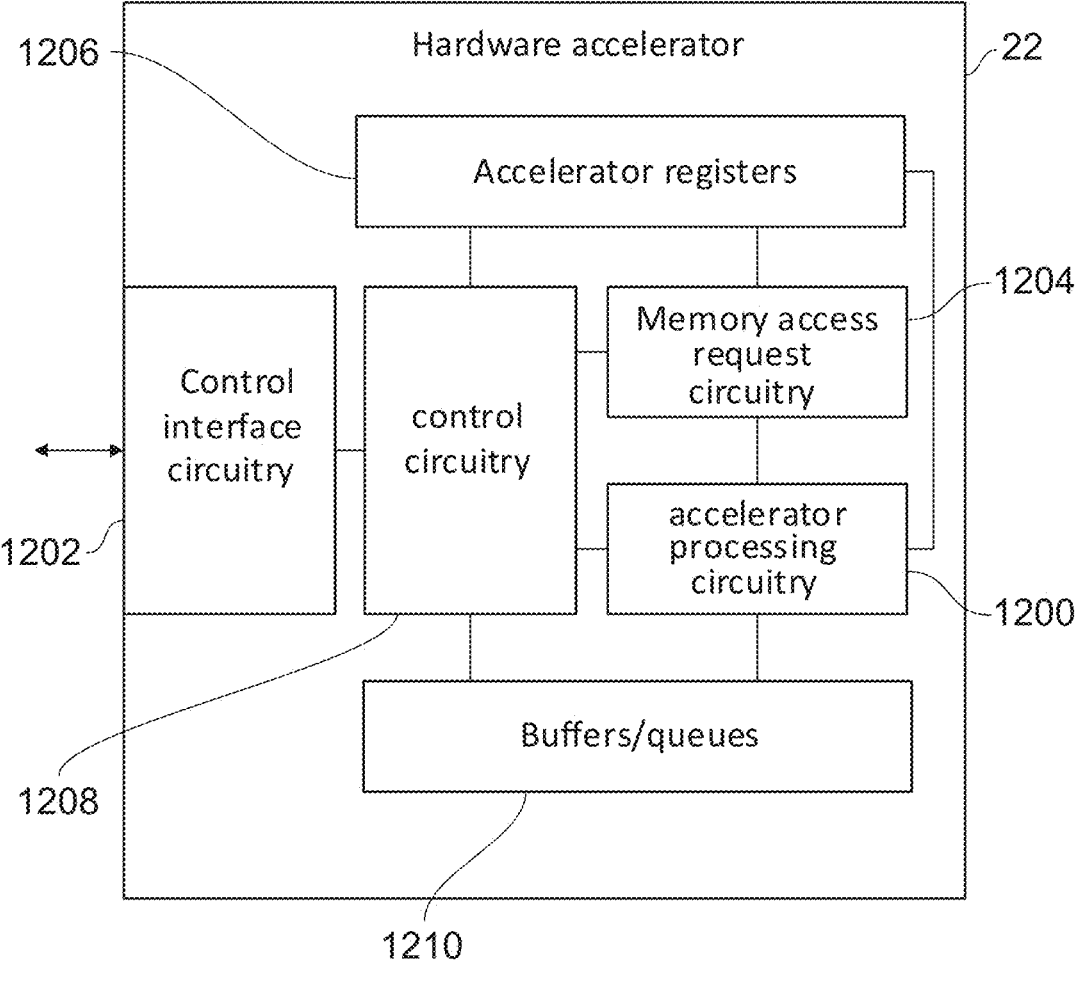
FIG. 12 schematically illustrates an example configuration of a core local hardware accelerator.

FIG. 12 schematically illustrates an example configuration of a core local hardware accelerator 22. The techniques described herein are applicable to a wide range of hardware accelerators which may be configured to support a range of delegated tasks. It will therefore be appreciated that the example of FIG. 12 is not intended to correspond to any one particular hardware accelerator, and instead represents common circuitry which may be provided (at least functionally) by many different types of hardware accelerator.

The hardware accelerator 22 of FIG. 12 comprises accelerator processing circuitry 1200 to perform a delegated task on behalf of the processor 4 and control interface circuitry 1202 to exchange control signals with the hardware accelerator control interface 14 of the processor 4 to configure the accelerator processing circuitry 1200 to perform the delegated task. The hardware accelerator may also provide memory access request circuitry 1204 to issue, to the processor 4 via the control interface circuitry 1202, an accelerator-triggered memory access request requesting access to a memory system. The accelerator-triggered memory access request specifies a virtual address to be translated by the MMU 16 of the processor 4 into a physical address of the memory system location to be accessed in response to the accelerator-triggered memory access request.

The hardware accelerator 22 also provides accelerator registers 1206. A number of accelerator registers which may be provided in all hardware accelerators will be described with reference to FIGS. 13 to 16, but in general there may be flexibility in the number and type of registers provided by individual hardware accelerators to support efficient performance of different delegated tasks.

The hardware accelerator 22 also provides control circuitry 1208 to control operation of the hardware accelerator 22 and buffers 1210 for storing data for processing by the hardware accelerator 22.

In some examples, the accelerator 22 could also have at least one cache for caching data previously obtained from memory.

FIG. 13 illustrates a number of accelerator registers 1206 which may be provided by each hardware accelerator 22. In one example, the accelerator registers 1206 are 64 bit registers identified by a 32 bit register index. As described above, the contents of the accelerator registers may be accessible to software executing on the processor 4 using REGREAD and REGWRITE operations. It will be appreciated that if a hardware accelerator is unavailable to a given protection level, then software will be unable to launch REGREAD and REGWRITE operations from that protection level, and hence access to internal state of the hardware accelerator 22 can be limited to software to which that accelerator is available.

FIG. 14 is a table providing a summary of the registers illustrated in FIG. 13. The set of accelerator registers 1206 includes:

IIDR register 1300 is an implementation identification register and DEVARCH register 1302 is a device architecture register. The IIDR and DEVARCH registers can be used to indicate the version of the accelerator control architecture supported by a particular hardware accelerator, so that as future improvements are made to the architecture software the CPU can identify which version is in use at the accelerator.

IASSIZE register 1304 provides an indication of the size of internal state of the hardware accelerator. For example, the IASSIZE may indicate how much memory would be required to store the contents of the internal buffers of the hardware accelerator. When carrying out SAVE and RESTORE operations to store and load internal state to and from memory, the value indicated by IASSIZE is used by software of the processor 4 to determine a size of a buffer to allocate for the internal accelerator state.

The exception and fault status register (EFSR) 1306 and fault status and address registers (FSAR) 1308 collectively identify faults encountered by the hardware accelerator during processing of a delegated task. In the example of FIG. 13, 32 separate FSARs are provided, each configured to identify a memory translation fault encountered during processing, with the EFSR 1306 identifying which of the FSARs indicates valid status information about translation faults, as well as indicating errors other than translation faults.

An example encoding of the EFSR 1306 is provided in FIG. 15. In this example, EFSR[31:0] provide an EFSR_FSARV field providing 32 flags, each flag corresponding to one of the FSAR registers 1308. Each flag indicates, for the respective FSAR register, whether that register validly identifies a translation fault. EFSR[32] provides an EFSR_EXCEPT field indicating whether the hardware accelerator 22 has encountered a general exception other than a translation fault, and EFSR[63:48] provides an EFSR_USER field which can be used to identify information relating to the general exception.

An example encoding for each FSAR 1308 is provided in the table of FIG. 16. FSARn[0] provides an FSAR_VALID field identifying whether that FSAR validly indicates a fault, and is a copy of the corresponding flag in the EFSR_FSARV field of the EFSR 1306. If the FSAR_VALID field indicates that the FSAR is invalid, then the FSAR reads as all zeros.

FSARn[1] provides an FSAR_WRITE field indicating, for an address translation fault, whether that address translation fault was raised in response to a write access or a read access.

FSARn[2] provides an FSAR_NOCTX field indicating a context fault indication when the address translation context of the accelerator-triggered memory access request does not match an active translation context in the MMU 16. As described earlier, the address translation context for a given accelerator-triggered memory access request may differ from a current address translation context of the processor 4 and that address translation context may not be one of the one or more active translation contexts supported by the MMU 16 at the time the access request is issued.

FSARn[63:12] provide an FSAR_ADDR field indicating the address of the memory page (e.g., a 4 KB page) to which the faulting access(es) were made.

Hence, the set of FSAR registers 1308 enable up to 32 different faulting addresses to be identified. The FSAR registers may be set in response to an indication from the processor 4 that a particular accelerator-triggered memory access request has encountered an address translation fault. Providing the EFSR and FSAR registers can enable fault handling for accelerator-triggered memory access requests to be deferred, so that they can be handled at a point at which software running on the processor 4 is the software which configured the hardware accelerator 22 to perform the delegated task which encountered the address translation fault. This can greatly simplify software implementation in a system supporting asynchronous hardware accelerators, where the software running on the processor 4 at the time an address translation fault is encountered may be completely independent of the delegated task which caused the address translation fault to be encountered.

Figure 17:
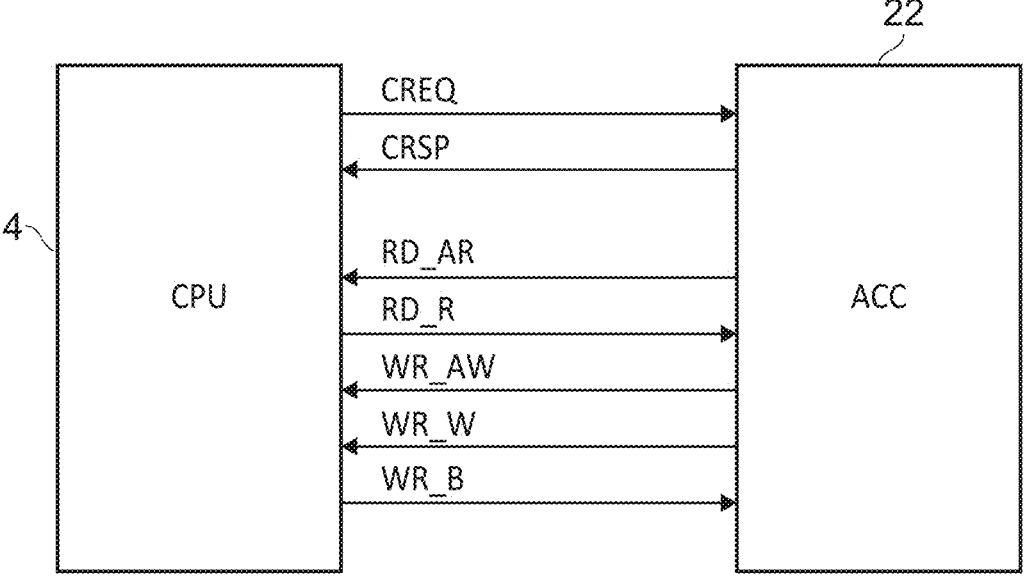
FIG. 17 schematically illustrates communication channels between a CPU and a hardware accelerator.

FIG. 17 illustrates communication channels between a CPU 4 and a given hardware accelerator 22. FIG. 17 illustrates that there are two groups of channels: control channels and memory interface channels.

The control channels comprise a control request channel (CREQ) and a control response channel (CRSP). The memory interface channels comprise a read address channel (RD_AR), a read data channel (RD_R), a write address channel (WR_AW), a write data channel (WR_W), and a write response channel (WR_B). In some examples, multiple read and/or write channels may be supported, and hence for example two or more copies of the RD_AR and RD_R channels may be provided, and so on.

In the case that multiple accelerators are provided, messages communicated on the memory interface channels may specify an accelerator ID (accid) as part of the transaction ID, while for the control channels the accid may be provided as a separate signal. To support a CPU 4 and hardware accelerator 22 running at different frequencies, the channels may use asynchronous bridges.

Accelerator-triggered memory access requests (writes and reads from the accelerator to the memory system) and responses are issued over the memory interface channels. In some examples, the memory interface channels may support multiple transactions being in flight at the same time, identifying each outstanding transaction using a unique transaction ID.

The write response channel WR_B indicates whether the write transaction succeeded or faulted. In the case of a read transaction, the read data channel (RD_R) may be used to indicate whether the read transaction faulted for setting the FSAR and hence provision of a separate read response channel is not required. In the case of a fault occurring for a read or write transaction, an FSAR register 1308 of the accelerator 22 may be set to indicate the faulting address.

The CREQ channel carries messages from the CPU 4 to the hardware accelerator 22. The CRSP channel carries messages from the accelerator 22 to the CPU 4. Transactions over the control interface channels may correspond generally to the operations triggered by writing to the LAUNCH register, as illustrated in FIG. 6, and response messages sent by the accelerator 22 to the CPU 4 in response to such operations. In particular, the CPU 4 may initiate transactions on the control interface to launch accelerator commands, access accelerator registers, pause or reset the accelerator, save or restore accelerator state, and to resume the accelerator after an exception or pause. The accelerator 22 may initiate transactions on the control interface to inform the CPU 4 about accelerator status changes.

Figures 18A, 19A:
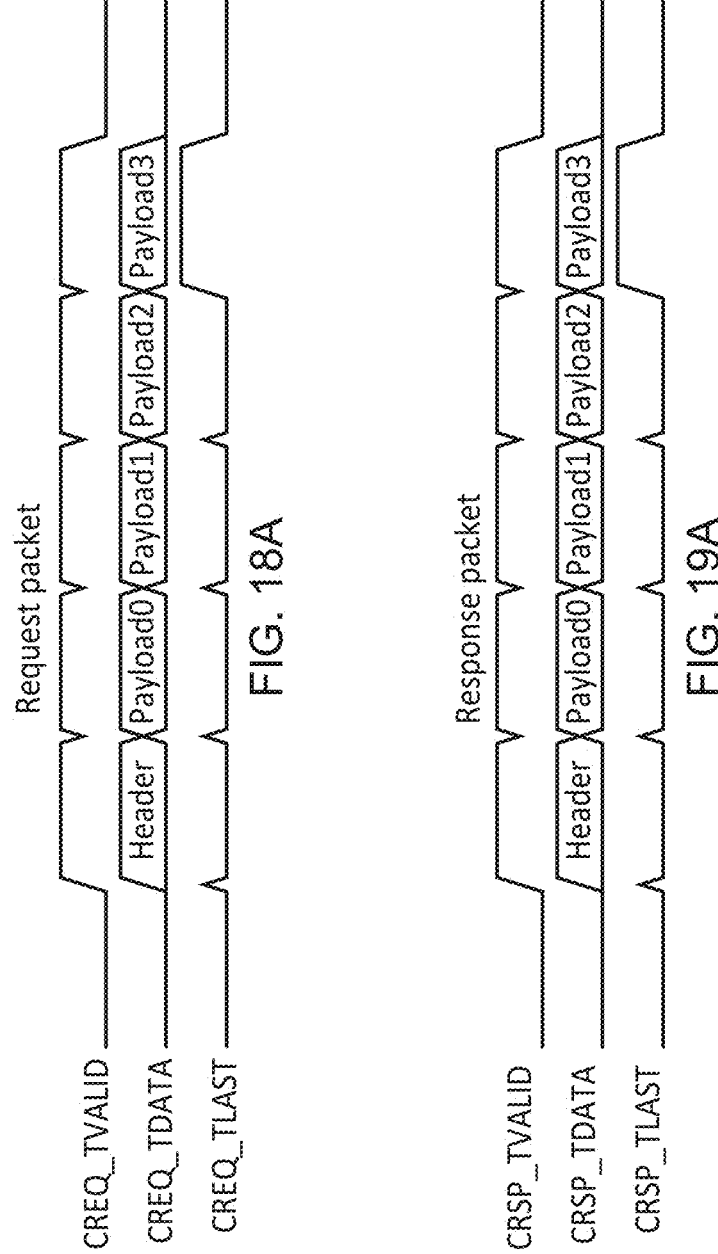

FIG. 18A provides an example encoding of a request packet on the CREQ channel. A request packet on the CREQ channel comprises a 64 bit header word followed by up to eight 64 bit payload words. The TLAST signal indicates the last word in the packet. FIG. 18B provides an example encoding of the header word of the CREQ request packet.

As shown in FIG. 18B, the encoding of bits [63:32] and [7:0] of the header packet is the same as the corresponding bits of the LAUNCH register. TDATA[3:0] identifies the request type from the list of operations which may be identified by the LAUNCH register, as shown in FIG. 6. During the header cycle, TDATA[6:4] indicates the length of the following payload along with the TLAST signal as follows:

payload_length=CREQ_TLAST?0: CREQ_TDATA[6:4]+1

Hence, if in the header cycle the TLAST signal is not asserted, the total payload length expected can be calculated from CREQ_TDATA[6:4]+1. It can be useful for the accelerator 22 to be able to calculate the payload length during the header cycle, for the purpose of determining how much buffer space to reserve for the expected payload.

TDATA[7] provides the seq bit indicated by the LAUNCH register. TDATA[63:32] provide the 32 bit register identifier for a register access transaction.

In addition to the bits of the LAUNCH register, TDATA [29:27] indicates debug permissions associated with the context issuing the transaction. TDATA[31:30] indicates the protection level of the context issuing the transaction (determined by the CLAC control interface 14 based on the target physical address of the store instruction which caused the command to be launched).

The contents of the payload packets are provided by the DATA[ ] control registers 400 of the CPU 4.

FIG. 19A provides an example encoding of the response packet on the CRSP channel.

A response packet comprises a 64 bit header word followed by up to eight 64 bit payload words.

The TLAST signal indicates the last word in the packet.

FIG. 19B summarises the encoding of the header word for the header packet for the CRSP response packet. The response type is indicated by bits 3:0 of the response word, and indicates whether the response is OK, BUSY, ERROR, RAS, or a STATUS response (which can be used to set the LRESP_CODE field of the LRESP register 404 of the CPU 4). The remainder of the header word indicates an error code when the transaction is an error response (for setting the LRESP_ERRCODE field of the LRESP register) and status bits for setting the STATUS register corresponding to the accelerator 22 which sent the CRSP response.

Figure 20A:
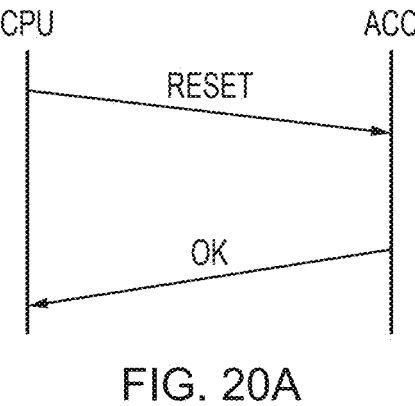
FIGS. 20A-20N are ladder diagrams illustrating transactions communicated between a CPU and a hardware accelerator.
Figure 20B:
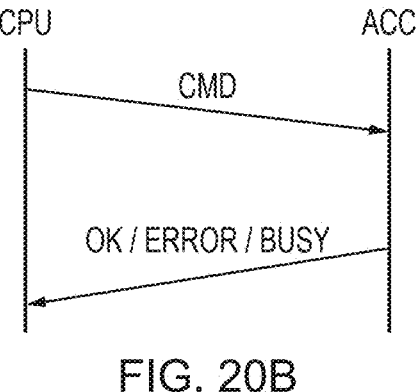
Figure 20C:
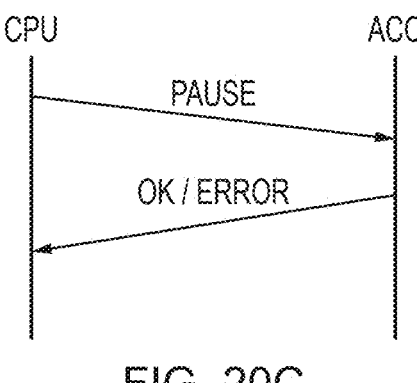
Figure 20D:
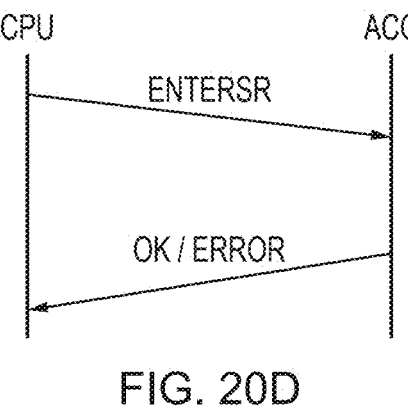
Figure 20E:
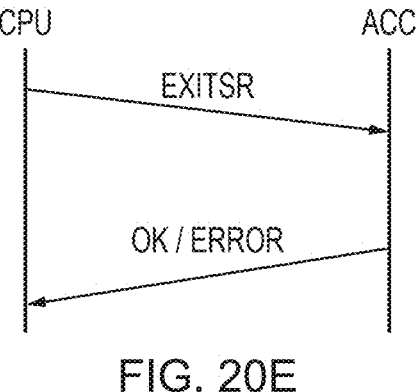
Figure 20F:
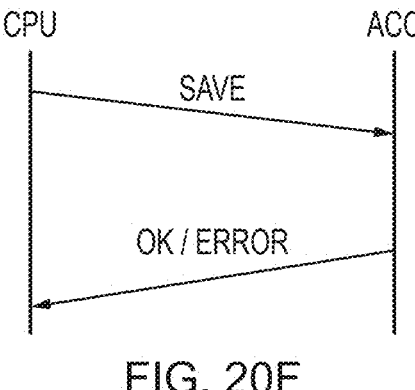
Figure 20G:
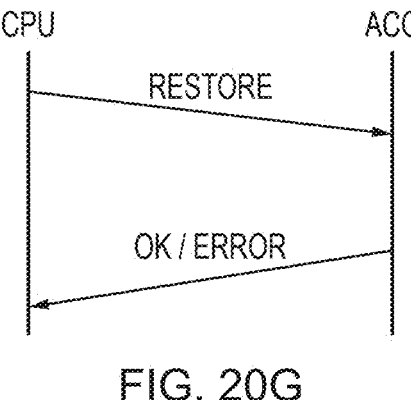
Figure 20H:
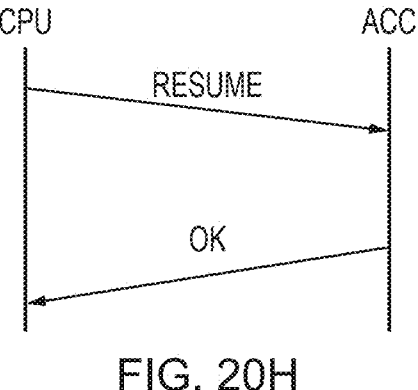
Figure 20I:
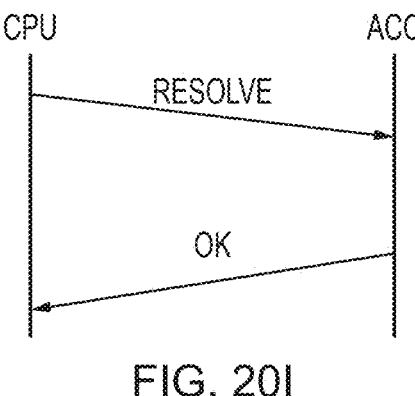
Figure 20J:
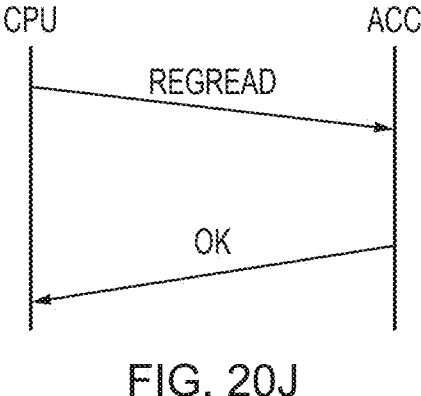
Figure 20K:
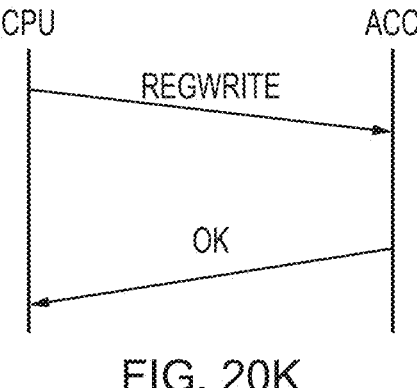
Figure 20L:
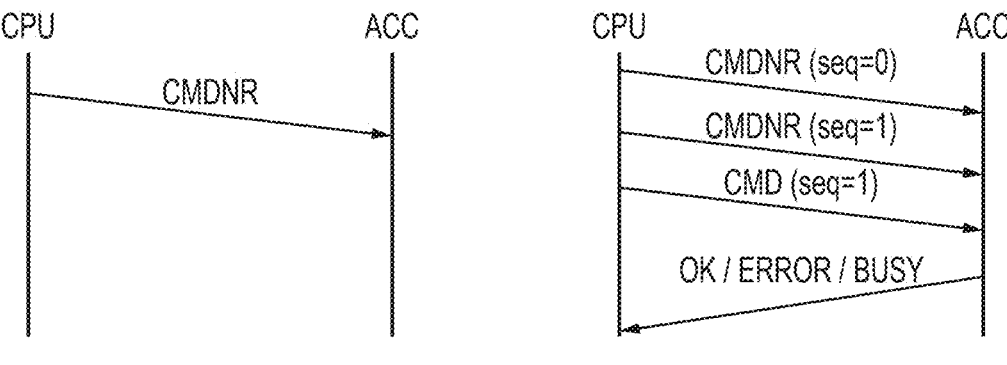
Figure 20M:
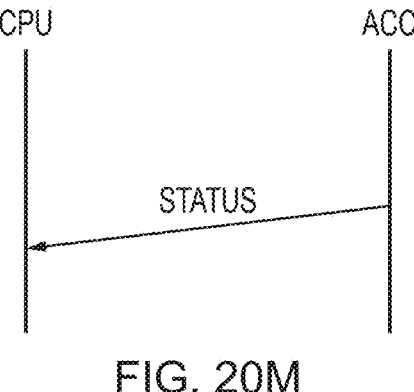
Figure 20N:
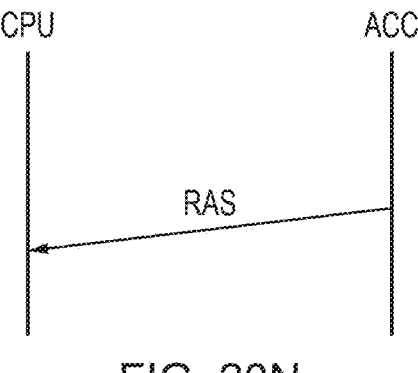

FIGS. 20A to 20N illustrate the communication of transactions over the CREQ and CRSP control interface channels between a CPU 4 and a hardware accelerator 22. In one example the transactions may be issued in response to execution of dedicated control instructions by the processing circuitry 6 of the CPU 4. However, in another example the transactions issued by the CPU 4 are issued in response to software writing data identifying the transaction and a target hardware accelerator to the LAUNCH register (in the format illustrated in FIG. 6).

FIG. 20A illustrates a RESET transaction issued by a CPU 4. The RESET transaction is not followed by any payload packets, and requests the target hardware accelerator to clear its internal state. The hardware accelerator sends an OK response packet without payload when the operation is completed and the accelerator is ready to receive requests.

FIG. 20B illustrates a CMD command transaction issued by a CPU 4. The command transaction is used to launch an accelerator command for execution. The CMD transaction (an example of the command-with-response request mentioned earlier) includes a header followed by up to 8 payload packets transferring up to 64 bytes of command data. The number of payload data words minus one is indicated by the ndata_m1 field. The format of the command data depends on the particular hardware accelerator (e.g. the command data in the payload packets could define accelerator-specific operation commands which instruct the accelerator to carry out certain operations for a delegated task—the details of these operation commands can vary significantly from one accelerator implementation to another, and so are not within the scope of the accelerator control interface architecture).

In response to a CMD transaction, the accelerator responds with either: an OK transaction (without payload), an ERROR transaction, or BUSY transaction. The OK transaction indicates that the task identified by the command has been successfully started. During execution of the command, the accelerator 22 can also send status updates to the CPU 4 to indicate events such as faults and command completion.

FIG. 20C illustrates a PAUSE transaction issued by a CPU 4, requesting the hardware accelerator to enter a pause state. The accelerator will stop issuing memory access requests and will wait for all outstanding memory transactions to complete. The accelerator 22 then responds with an OK transaction (without payload) or an ERROR transaction.

FIG. 20D illustrates an enter save/restore mode ENTERSR transaction issued by a CPU 4 to the target hardware accelerator 22. The ENTERSR transaction requests that the accelerator enters a save/restore mode to support the saving and restoring of internal accelerator state to and from memory. The accelerator will stop issuing memory accesses and will wait for all outstanding memory transactions to complete. The accelerator then responds with an OK (with up to 8 words of payload packets) or ERROR response packet. The payload data of the OK response packet holds save-restore state (srstate).

FIG. 20E illustrates an exit save/restore mode EXITSR transaction issued by a CPU 4 to the target hardware accelerator 22. The EXITSR transaction has a payload of 8 words containing the srstate corresponding to a new context of the hardware accelerator following a context switch. The exit save/restore transaction requests the accelerator to exit save/restore mode and set the srstate to the srstate transferred in the payload of the EXITSR request packet.

The accelerator responds with an OK (without payload) or ERROR response packet.

FIG. 20F illustrates a SAVE transaction issued by a CPU 4 to the target hardware accelerator 22. The SAVE transaction has one payload word indicating an address in memory. The SAVE transaction requests the target hardware accelerator 22 to save its internal state to a memory buffer located at the address given in the payload data. The accelerator responds with an OK or ERROR response packet. The OK (without payload) response message indicates that the save operation started successfully. During the save operation the accelerator will send status updates to indicate events such as faults and command completion.

FIG. 20G illustrates a RESTORE transaction issued by a CPU 4 to the target hardware accelerator 22. The RESTORE transaction has one payload word indicating an address in memory. The RESTORE transaction requests the target hardware accelerator 22 to restore its internal state from a memory buffer located at the address given in the payload data. The accelerator responds with an OK or ERROR response packet. The OK (without payload) response message indicates that the restore operation started successfully. During the restore operation the accelerator will send status updates to indicate events such as faults and command completion.

FIG. 20H illustrates a RESUME transaction issued by a CPU 4 to the target hardware accelerator 22. The resume transaction resumes accelerator operation from pause state. The accelerator responds with an OK (without payload) response packet.

FIG. 20I illustrates a RESOLVE transaction issued by a CPU 4 to the target hardware accelerator 22. The RESOLVE transaction has one payload word, in which bits 31:0 provide a 32 bit mask, each bit corresponding to one of the FSAR registers 1308 of the accelerator 22. The resolve transaction indicates to the hardware accelerator which of the address translation faults indicated by the FSAR registers have been resolved. The accelerator responds with an OK (without payload) response packet. In response to the resolve transaction, the accelerator 22 can (depending on implementation choice) retry memory accesses associated with addresses for which faults have been resolved, or alternatively can wait until all outstanding faults have been resolved before resuming issuing the affected memory access requests.

FIG. 20J illustrates a register read REGREAD transaction issued by a CPU 4 to the target hardware accelerator 22. Up to 8 accelerator registers with consecutive register identifiers can be read with a single transaction. The first register to read is indicated by the regidx data field in the REGREAD request. The number of registers to read minus 1 is indicated by the ndata_m1 data field in the REGREAD request. The accelerator responds with an OK response packet. The payload data of the response packet contains the register read data. The returned register read data may be allocated in the DATA registers in order of the ascending register identifiers, e.g., the first read payload word may be allocated in DATA[0], then DATA[1] and so on. For example, if there is only one accelerator register read by REGREAD, then this may be returned to DATA[0].

FIG. 20K illustrates a register write REGWRITE transaction issued by a CPU 4 to the target hardware accelerator 22. The register write transaction is used to write accelerator registers. Up to 8 accelerator registers with consecutive register identifiers can be written with a single transaction. The first register to write is indicated by the regidx data field in the REGWRITE request. The payload data of the REG-WRITE request contains up to 8 words of register data to write to the indicated registers. The accelerator responds with an OK (without payload) response packet. As with REGREAD, the DATA registers may be used in ascending register identifier order. Therefore, data from DATA[0] may be written to the accelerator register identified by the specified register identifier, the data from DATA[1] written to the consecutive accelerator register, and so on.

FIGS. 20A to 20K illustrate transactions issued by a CPU 4 which receive responses from the target hardware accelerator 22. However, the technique also supports issuing of transactions by a CPU 4 without expecting a response, and issuing of transactions by the hardware accelerator 22 without being prompted by a transaction from the CPU 4.

FIG. 20L illustrates a command without response CMDNR transaction (an example of the command-without-response request mentioned earlier). The command-without-response transaction launches an accelerator command similar to the command (CMD) transaction, transferring up to 8 words of payload data. However, in response to the CMDNR transaction the accelerator is not required to provide any response. Using the CMDNR transaction the CPU 4 can launch multiple consecutive commands without waiting for accelerator responses in between. This allows for a higher command rate (and reduced software overhead at the CPU side because of the reduced frequency with which the CPU needs to poll LRESP 404 for launch response code updates). As shown in the right hand part of FIG. 20L, a first command in a compound sequence of commands may be indicated by setting bit 7 in the header packet, providing the seq field, to zero. Subsequent CMDNR commands may be issued with seq=1, and the sequence of commands may be terminated by a CMD command with seq=1, to which a response is expected.

The hardware accelerator responds to the final CMD command with OK, ERROR, or BUSY as described above with reference to the CMD command. The response provided by the hardware accelerator may be in relation to any one or more of the sequence of commands so that, if any one of the CMDNR commands in the sequence contained an error, the hardware accelerator can respond to the terminating CMD command with ERROR, even though the CMD command itself may not have contained an error.

FIG. 20M illustrates a STATUS update transaction issued by the hardware accelerator 22 to the CPU 4. The STATUS transaction provides a status update to the CPU 4 in the header packet. It is used by the accelerator to asynchronously inform the CPU about the status of ongoing work, such as indicating faults and command completion. The status update transaction consists of a standalone STATUS response packet. In response to the STATUS response packet, the CPU-side CLAC interface 14 updates the STATUS register 414 corresponding to the accelerator 22 which sent the STATUS response packet, to update any of the STATUS conditions shown in FIG. 9 based on the status indications indicated in the STATUS response packet.

FIG. 20N illustrates a RAS transaction issued by the hardware accelerator 22 to the CPU 4. The RAS transaction is used to report a reliability, availability, and serviceability (RAS) error to the CPU 4. For example, the accelerator 22 may have error detection circuitry (e.g. based on error correcting codes associated with stored data values, and/or on redundant circuit elements which operate in lockstep and can detect errors based on divergence of the data obtained by the redundant circuit elements), which can report a RAS error when such an error is detected. The payload of the RAS response packet holds an error record which indicates the cause of the RAS error. Any known RAS scheme may be used for detecting and reporting RAS errors.

Figure 21:
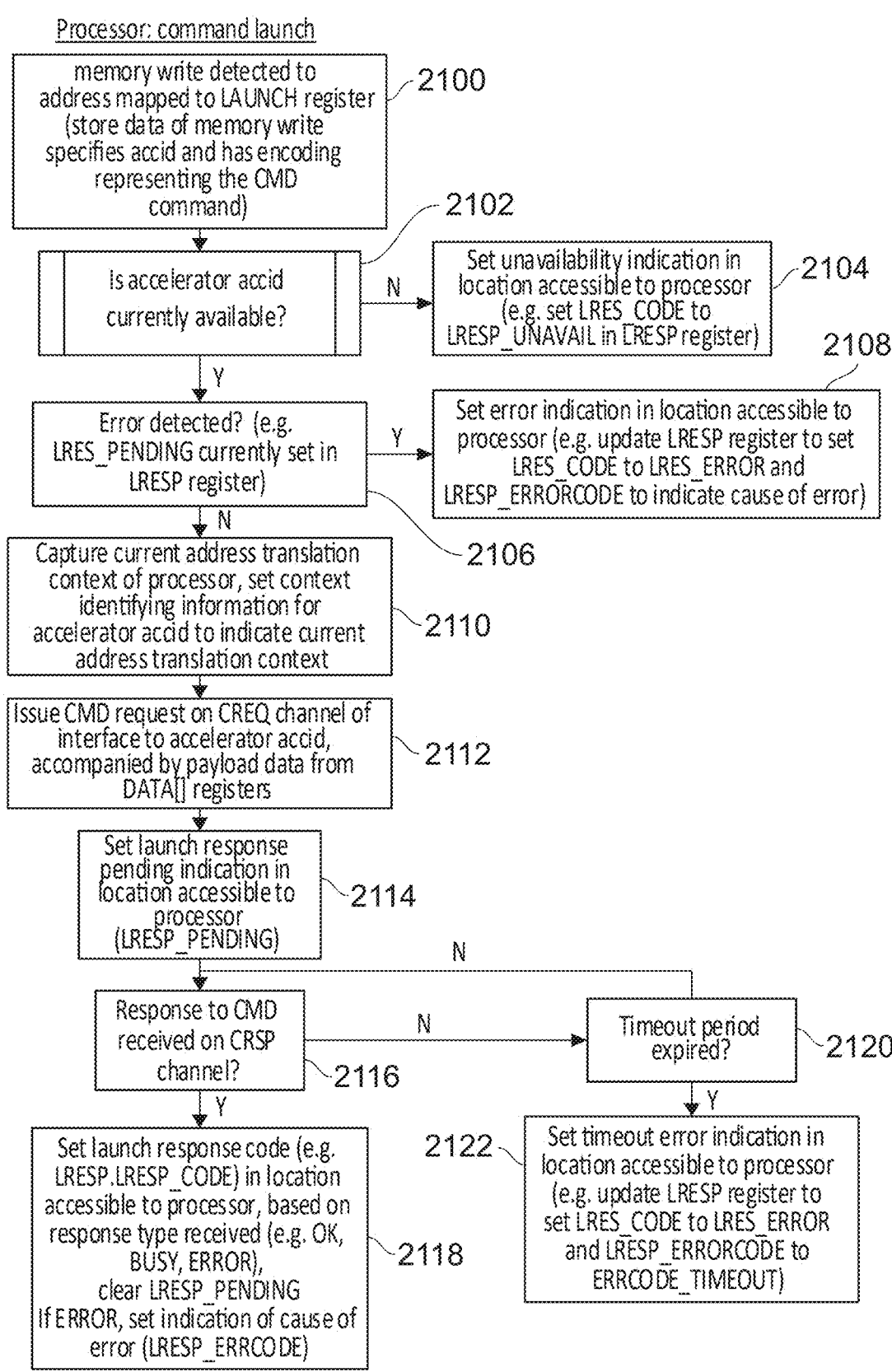
FIG. 21 is a flow diagram illustrating a process carried out by a CPU for issuing a CMD transaction.

FIG. 21 is a flow diagram illustrating the steps performed at a CPU 4 during a process of launching a command to a target hardware accelerator 22 from the CPU 4, for example to delegate a task for processing by the hardware accelerator 22. It will be appreciated that FIG. 21 is merely an example and that certain steps illustrated in FIG. 21 may be reordered or excluded altogether.

Figure 25:
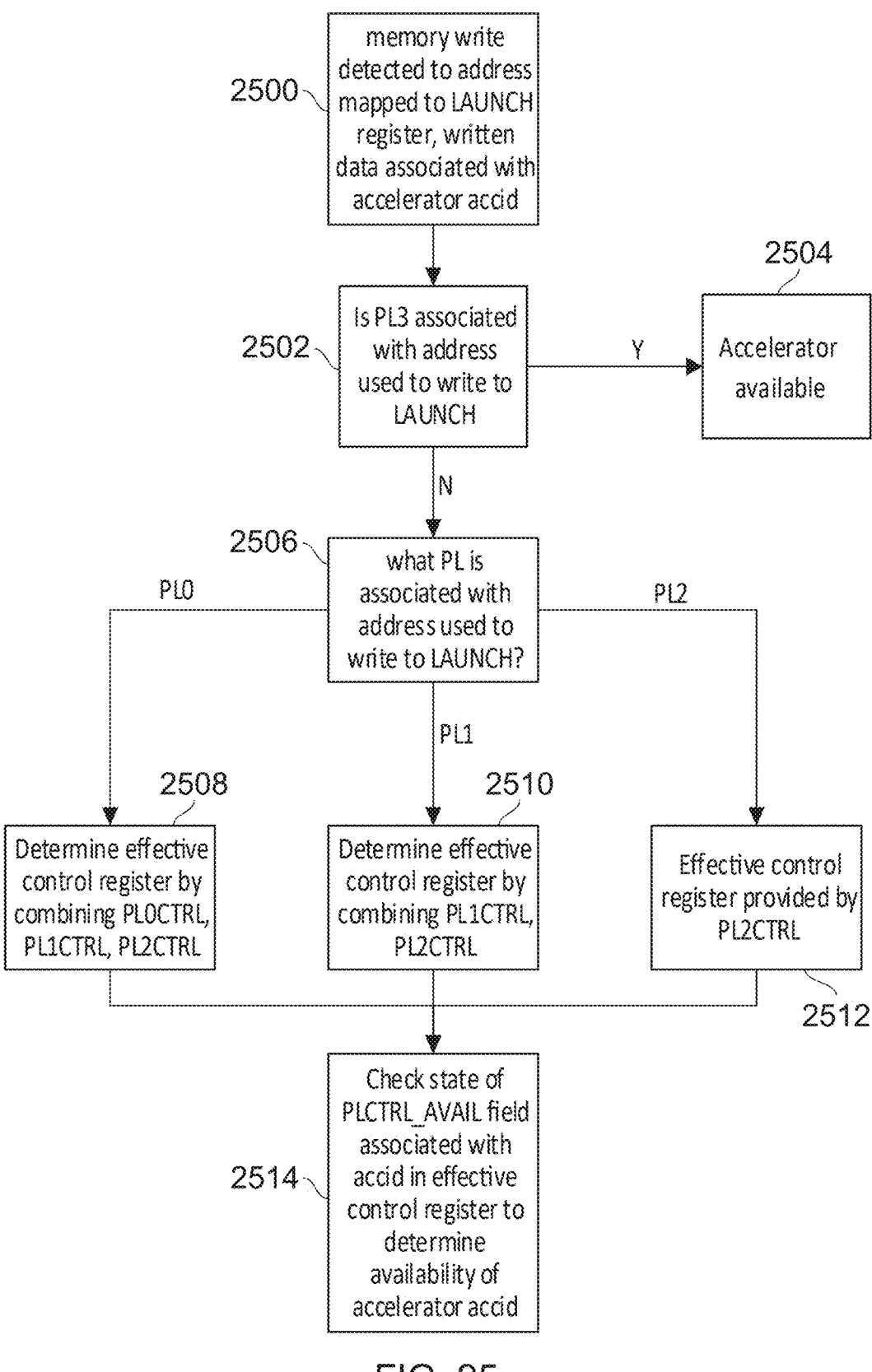
FIG. 25 is a flow diagram illustrating a process of determining availability of a given hardware accelerator in response to a request to launch an accelerator operation.

At step 2100 the CPU 4 executes a write instruction to write data to a physical address mapped to the LAUNCH register. The written data has an encoding representing the CMD operation indicated in FIG. 6, and specifies the target hardware accelerator in the accid field. At step 2102 the CPU 4 determines, based on the PLxCTRL registers 406, 408, and 410, whether the hardware accelerator identified by accid is available in the protection level used to write to the LAUNCH register in step 2100. FIG. 25 discussed further below provides an example of determining the availability of a given hardware accelerator.

If at step 2102 it is determined that the hardware accelerator is unavailable, then at step 2104 the CPU 4 sets an unavailability indication indicating to software executing on the processing circuitry 6 that the hardware accelerator is unavailable to perform the accelerator operation. This unavailability mechanism may be used for example to prevent commands being issued to a hardware accelerator which has internal state associated with a different context and can enable the use of lazy state saving whereby the hardware accelerator 22 is only required to perform a context switch when software intends to delegate a new task to the hardware accelerator. The unavailability mechanism based on the PLxCTRL registers can be used by the CPU 4 to indicate an unavailable hardware accelerator (and prevent issuing of a CMD) even when that hardware accelerator is provided in the system, in contrast to the ERROR response with code ERRCODE_NOACC which may be returned to the CPU 4 in response to an issued CMD when the target accelerator is not present in the system. The unavailability indication set in step 2104 may involve the CLAC interface circuitry 14 setting LRESP_CODE to LRESP_UNAVAIL in the LRESP register 404.

If the hardware accelerator identified by accid is determined to be available, then at step 2106 it is determined whether any errors have been detected indicating that the LAUNCH register was written to incorrectly. For example, if LRESP_PENDING is set in the LRESP register then new commands are unable to be launched, as an acknowledgement for a previously issued command is still awaited from one of the accelerators 22 (as the LRESP register can be shared between accelerators 22, the accelerator from which the acknowledgement is expected may not necessarily be the same as the accelerator identified by accid to which the new command is to be launched). If an error is detected, then at step 2108 an error indication is set in a location accessible to software executing on the processor 4. For example, the LRESP register may be updated to set LRES_CODE to LRES_ERROR and indicate the cause of the error in LRE-SP_ERRORCODE (e.g., ERRCODE_LWPEND if LRESP_PENDING was set when data was written to the LAUNCH register).

If no error is detected, at step 2110, the current address translation context of the processor 4 is captured (e.g. the current address translation context can be determined from information specified in the translation control registers 30 of the MMU 16 and/or from other registers of the CPU 4, e.g. registers indicating the current exception level, security state or other operating mode). Context identifying information is set in association with the target hardware accelerator ID to indicate the current address translation context of the processing circuitry at the time of execution of the instruction which caused launch of an accelerator command to that hardware accelerator. Future accelerator-triggered memory access requests received by the CPU 4 from the hardware accelerator 22 for translation may need to be translated using a particular set of translation information selected based on the address translation context associated with the hardware accelerator. Because delegated tasks may be performed asynchronously from the CPU 4, the current address translation context of the CPU 4 at the later time when an accelerator-triggered memory access request is received may differ from the address translation context which should be used for translating memory access requests from the hardware accelerator, and therefore capturing context identifying information at the time a command is issued to the hardware accelerator can enable later accelerator-triggered memory access requests to be translated correctly.

At step 2112 a CMD transaction is issued to the target hardware accelerator 22 by the interface circuitry 14 of the CPU 4. The CMD transaction is issued on the CREQ control interface channel and comprises a header packet with 1 to 8 64 bit payload packets describing the command. The payload packets are determined based on the DATA[ ] registers of the CPU 4, which may be written to by software in advance of the software writing to the LAUNCH register at step 2100.

At step 2114, after the CMD transaction has been issued by the CPU 4 and before a launch response has been received from the hardware accelerator 22, the interface circuitry 14 of the CPU 4 updates the LRESP register 404 to indicate that a response is pending. For example the bit LRESP[0] providing the LRESP_PENDING field may be set to indicate a pending response. In the pending state, writes to the LAUNCH register may be ignored and raise an error (as explained above for step 2106).

At step 2116, the CPU 4 determines whether a response to the CMD transaction has been received on the CRSP channel. If no response has been received after a certain timeout period has expired (step 2120), then at step 2122 a timeout error is set in a software accessible location to indicate the lack of response to the software. For example, the LRESP register 404 may be set such that the LRESP_CODE field indicates LRESP_ERROR, and LRESP_ERRCODE indicates ERRCODE_TIMEOUT. Also, the LRESP_PENDING flag may be cleared when the timeout error code is indicated.

If a response is received to the CMD request, then at step 2118 the LRESP register 404 is updated accordingly. The LRESP_CODE field is set based on the response type of the response packet (to one of OK, BUSY, and ERROR), the LRESP_PENDING flag is cleared, and if the response is ERROR then the LRESP_ERRCODE field is set to indicate the cause of the error. If the response is an OK response then this indicates that the command has successfully started. The software executing on the CPU 4 may poll the LRESP register 404 to check for an OK response (if an attempt to read the LRESP register 404 finds the LRESP_PENDING flag is set, another attempt is made later, until eventually the LRESP_PENDING flag is cleared). Once an OK response is detected, the progress of the command can be monitored by software executing on the CPU 4, by polling the STATUS register corresponding to the target hardware accelerator (which will be updated based on STATUS transactions communicated from the hardware accelerator 22 to the CPU 4 on the CRSP channel).

Figure 22:
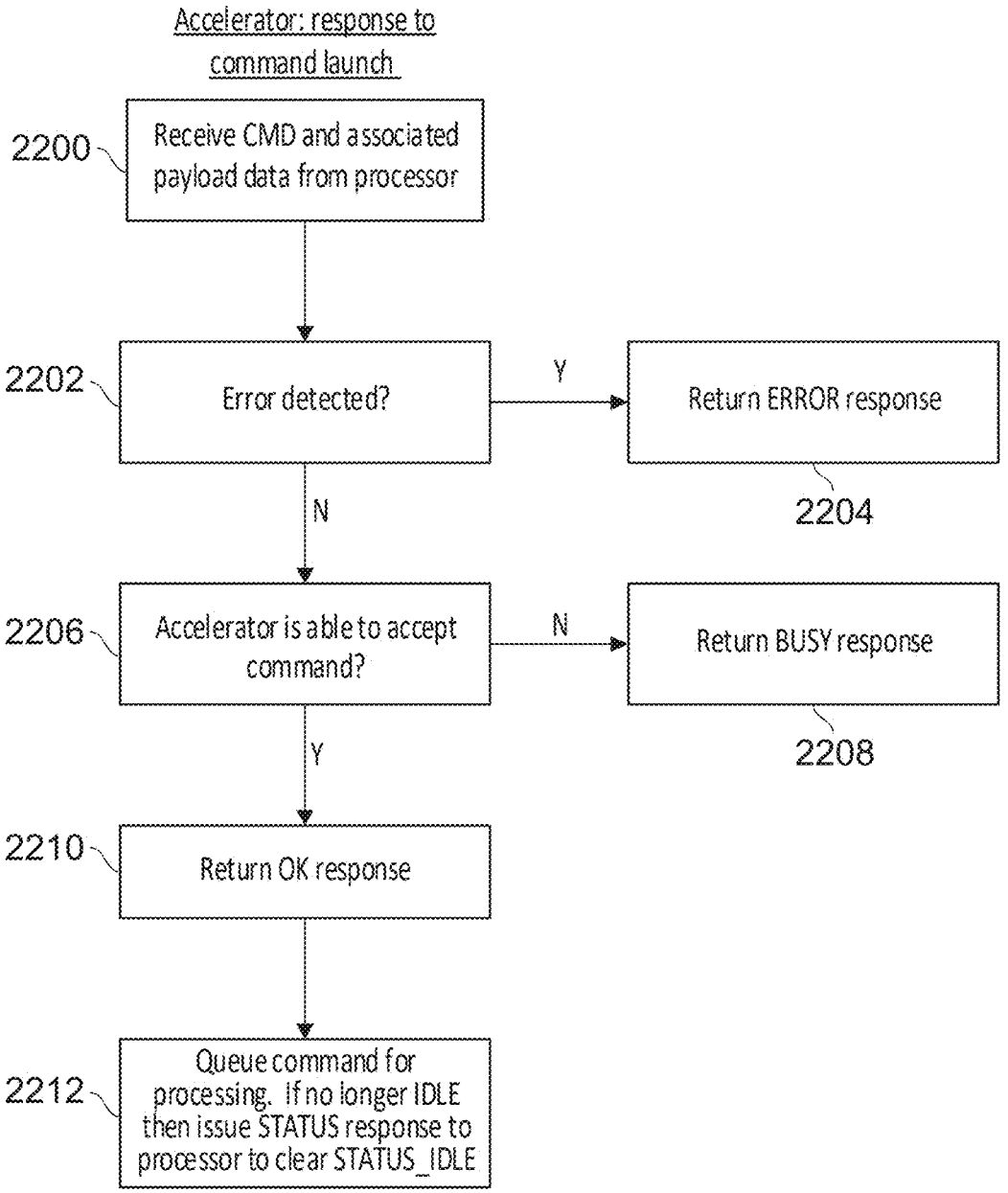
FIG. 22 is a flow diagram illustrating a process carried out by a hardware accelerator in response to a CMD transaction.

FIG. 22 is a flow diagram illustrating steps taken by a hardware accelerator 22 in response to a command transaction CMD communicated from a CPU 4. At step 2200 the hardware accelerator receives a CMD transaction over the CREQ channel from the CPU 4. The CMD transaction comprises a CMD header packet and one to eight payload packets.

At step 2202 it is determined whether an error condition arises in association with the CMD transaction. If so, then at step 2204 an ERROR response transaction is returned to the CPU 4 on the CRSP channel identifying an error code for setting the LRESP register of the CPU 4.

At step 2206 it is determined whether the hardware accelerator is currently available to accept the command. If not, for example if the hardware accelerator is currently processing another task and a work queue if provided is full, then a BUSY response transaction is returned on the CRSP channel to the CPU 4. The BUSY response indicates to the CPU 4 that the command can be retried again later.

If the hardware accelerator is available and there is no error, then at step 2210 the hardware accelerator 22 returns an OK response on the CRSP channel to the CPU 4 without a payload. At step 2212 the hardware accelerator queues the command for processing. If the hardware accelerator 22 was previously in the IDLE state, then a STATUS transaction is issued to the CPU 4 indicating that the STATUS register corresponding to that hardware accelerator should be updated to clear the STATUS_IDLE field.

Figure 23:
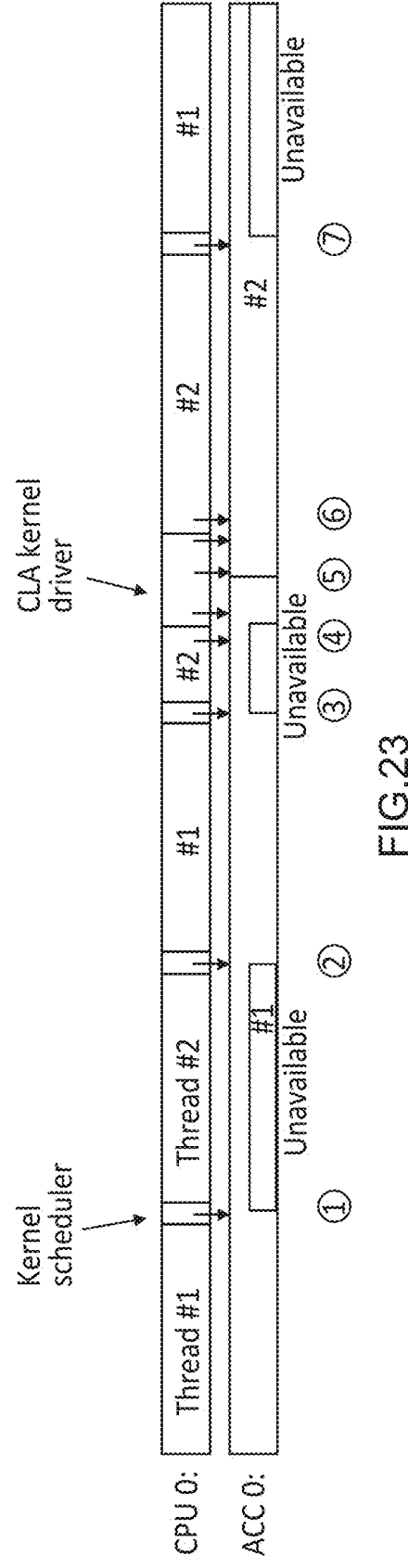
FIG. 23 schematically illustrates processing contexts of a CPU and a hardware accelerator over time.

FIG. 23 is a timeline illustrating processing contexts of the CPU 4 and a given hardware accelerator 22 over time. FIG. 23 illustrates that the internal state of a hardware accelerator may be associated with a context different from the context associated with the internal state of the CPU 4. Allowing the CPU 4 and the hardware accelerator 22 to be associated with different contexts means that the context of the hardware accelerator 22 does not need to change when the context of the CPU does. This can improve performance because the hardware accelerator can continue with its previous delegated tasks when the CPU 4 changes contexts until the CPU delegates a new task in the new context. If the CPU 4 wishes to delegate a task to the hardware accelerator in the new context then an accelerator context change can be carried out at that time. This also means that if the CPU 4 does not require the hardware accelerator at all in the new context and returns to its original context, then no context change may be required at all for the hardware accelerator which can save potentially large amounts of memory bandwidth.

Before point 1 in FIG. 23 the CPU 4 and hardware accelerator 22 are associated with the same context, labelled thread #1. This means that the internal state, e.g., the buffer and register contents, of the CPU 4 and the accelerator 22 are both associated with the same context. A particular context may be associated with a particular combination of exception level, virtual machine, thread (address space identifier), and so on.

At point 1, the kernel scheduler of the CPU 4 switches the CPU context to thread #2. The context of the hardware accelerator 22 however remains as the context of thread #1. If software of thread #2 on the CPU wishes to delegate a task to the hardware accelerator, then at this stage the hardware accelerator will have the incorrect internal state. Therefore, the kernel scheduler also flags the hardware accelerator as unavailable by setting the relevant bit of the PL0CTRL register to indicate unavailability (discussed further below).

At point 2, the kernel scheduler switches the context of the CPU 4 back from thread #2 to thread #1. The internal state of the hardware accelerator is once again associated with the same context as the CPU 4 and therefore the kernel scheduler also indicates the hardware accelerator is once again available by controlling the relevant field of the PL0CTRL register. As the CPU 4 did not require the hardware accelerator 22 at all between points 1 and 2, then an expensive hardware accelerator context switch was avoided altogether.

Figure 24:
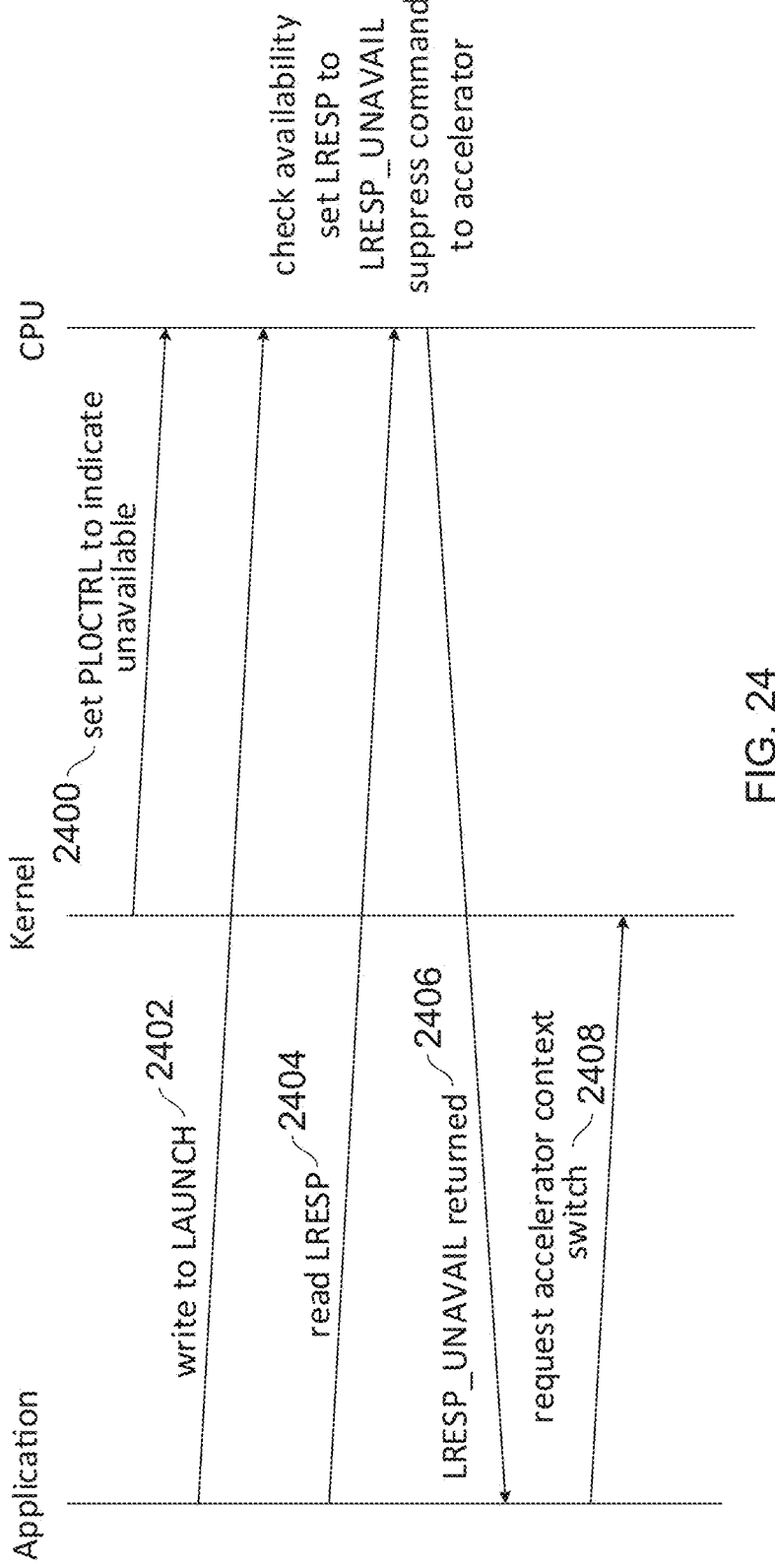
FIG. 24 is a ladder diagram illustrating a process carried out in a CPU when an application attempts to launch a transaction to an unavailable hardware accelerator.
Figure 33:
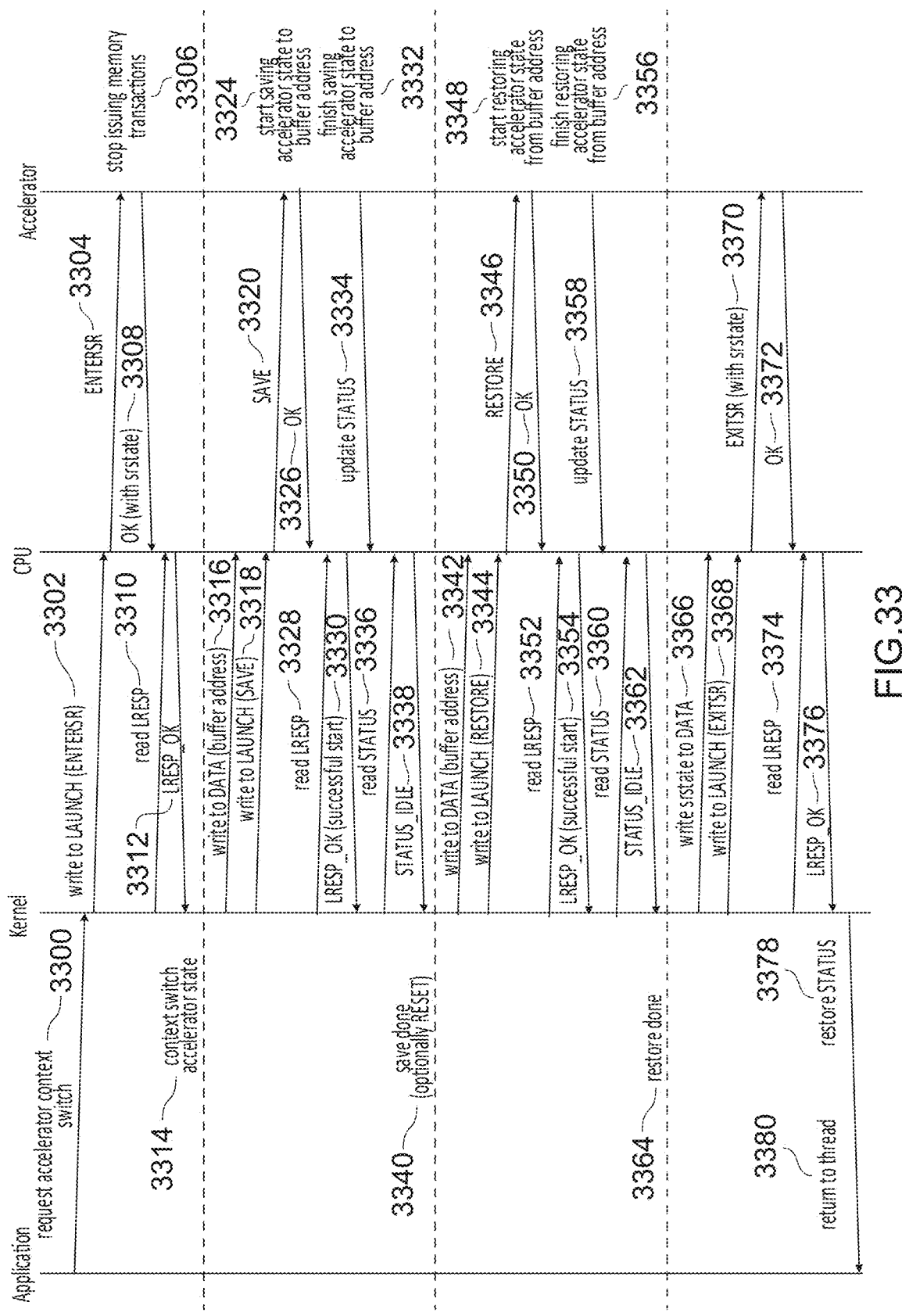
FIG. 33 is a ladder diagram illustrating a context switch of a hardware accelerator.

At point 3 the kernel scheduler once again switches the CPU to thread #2. At point 4 the software of thread #2 requests that a task is delegated to the hardware accelerator. At this point the hardware accelerator is indicated as unavailable, and hence in response to thread #2 writing to the LAUNCH register the LRESP register will be set to indicate LRESP_UNAVAIL. In the example of FIG. 23 the software of thread #2 therefore calls the CLA driver requesting that the context of the hardware accelerator is switched to thread #2 to allow the task to be delegated. This process is shown in FIG. 24. The context switch of the hardware accelerator is shown in FIG. 33 discussed further below. In summary, in the context switch process at point 5 the CLA driver causes the hardware accelerator to save its internal state to memory and load internal state corresponding to thread #2 from memory, and then flags the accelerator as available.

At point 6 the software of thread #2 running on the CPU 4 retries launching the command to the accelerator by writing again to the LAUNCH register. This time the launch is successful. At point 7 the CPU 4 once more switches context to thread #1 and the hardware accelerator is indicated as unavailable to thread #1 in PL0CTRL because the internal state of the hardware accelerator is associated with thread #2 not thread #1.

FIG. 24 is a ladder diagram illustrating steps taken by an application executing on the CPU 4, a kernel executing on the CPU 4, and the hardware of the CPU 4 when the application attempts to launch a transaction to an unavailable hardware accelerator. At step 2400 the kernel (operating at protection level 1) sets a field of the PL0CTRL register corresponding to a particular hardware accelerator to indicate unavailability of that hardware accelerator. For example, the kernel may have just changed contexts of the CPU 4 so an accelerator context switch would be required before the new thread on the CPU can request use of the accelerator.

At step 2402, the application requests an operation to be performed by the hardware accelerator 22 by writing to the LAUNCH register (from protection level 0). The CPU hardware, for example in the accelerator interface circuitry 14, detects that the accelerator identified by the accid field of the LAUNCH register is unavailable to protection level 0, and hence sets the LRESP register such that LRESP_CODE is set to LRESP_UNAVAIL. The interface 14 also suppresses issuing of any transactions to the hardware accelerator.

At step 2404 the application polls the LRESP register to determine whether the requested operation was completed successfully, and in response at step 2406 receives data indicating that the LRESP_UNAVAIL field is set in the LRESP register. The application therefore requests the kernel, which may be permitted to issue transactions at a higher protection level than the application, to switch the context of the hardware accelerator.

FIG. 25 is a flow diagram illustrating an example process for determining whether a given hardware accelerator is available in response to software requesting an operation to be performed by that given hardware accelerator. At step 2500 the CPU 4 detects a memory access writing data to an address mapped to the LAUNCH register. The CPU 4 determines which hardware accelerator is the target hardware accelerator for the operation identified in the LAUNCH register based on the accid field of the LAUNCH register.

The CPU 4 determines a protection level associated with the memory access request used to write to the LAUNCH register. An example process for determining the protection level will be described with reference to FIGS. 26 to 28. In this example, the protection level is determined based on the physical address used to trigger the write to the LAUNCH register, with multiple aliasing physical addresses corresponding to the same LAUNCH register but different protection levels.

Figures 26, 27:
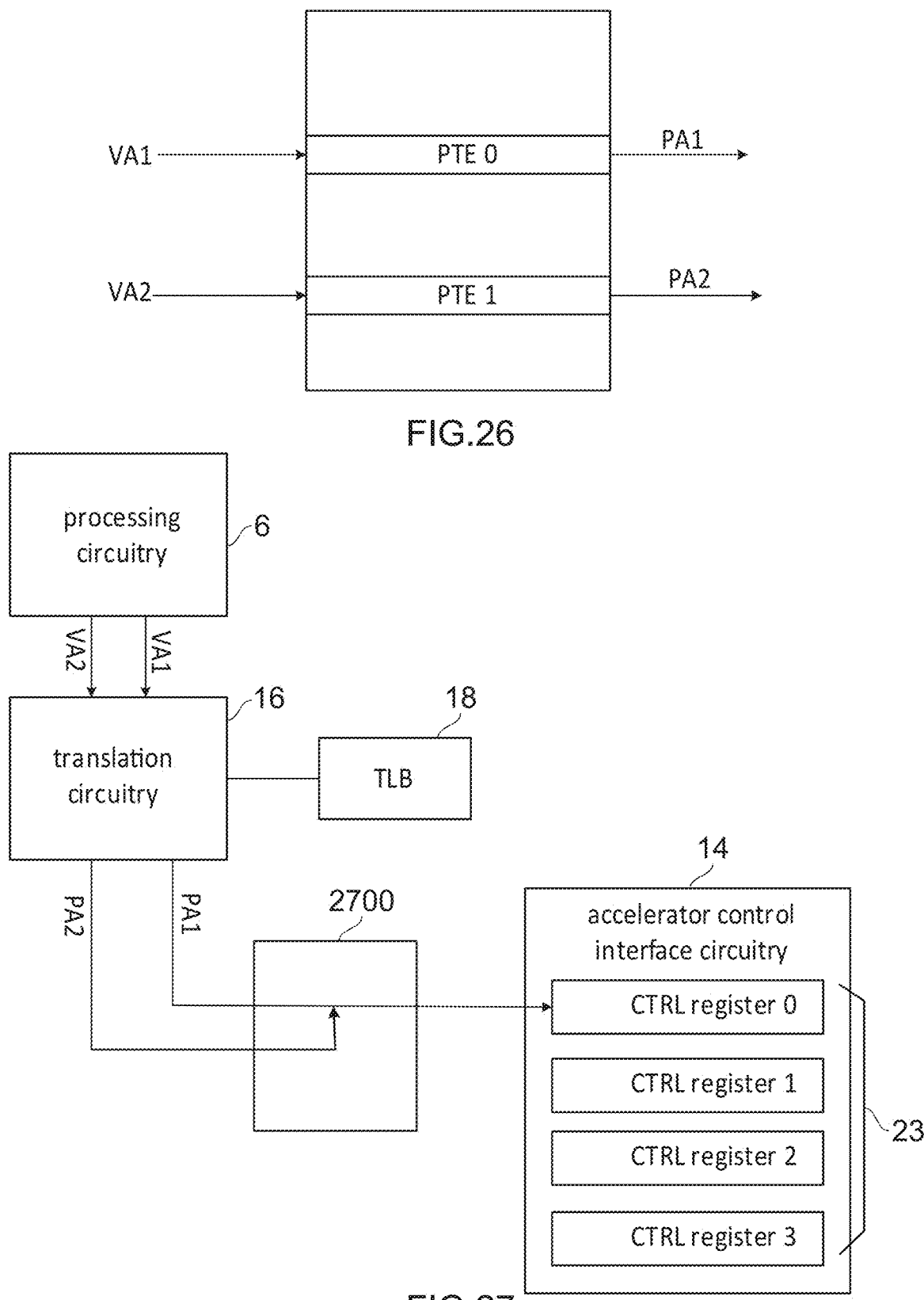
FIG. 26 schematically illustrates translation of virtual addresses to physical addresses.
FIG. 27 schematically illustrates a data processing system in which first and second physical addresses are used to access the same item of control state in a memory-mapped control register.

FIG. 26 illustrates a region of memory comprising two different page table entries (PTEs). Page table entries may be stored in memory or cached in a TLB 18 for access by an MMU 16 when translating a virtual address specified by a memory access request into a physical address identifying the location of an item of data in the memory system. Different sets of page table entries may be used for memory access requests specified in different contexts, so that different translations can be used for different contexts. Page table entries may additionally specify certain permissions restricting how a particular process may access a particular location in memory (e.g., identifying that memory location as read-only, write-only, etc.). As shown in FIG. 26, virtual addresses VA1 and VA2 are translated into physical addresses PA1 and PA2 using different page table entries. VA1 and VA2 may be the same virtual address specified in different contexts, translated into different physical addresses. While FIG. 26 shows a single stage of address translation from virtual address to physical address, it will be appreciated that in some translation regimes a two-stage address translation may be used, based on a first stage of translation translating the virtual address to an intermediate address based on a PTE of a first-stage set of page tables and a second stage of translation translating the intermediate address to a physical address based on a PTE of a second-stage set of page tables (some TLB instances 18 may however cache the mapping from VA to PA directly, even when two-stage address translation is used).

FIG. 27 schematically illustrates circuitry provided in the CPU 4 for controlling access to accelerator control registers 23. FIG. 27 illustrates that the processing circuitry issues memory access requests specifying virtual addresses to translation circuitry (MMU) 16. The translation circuitry 16 translates those virtual addresses into physical addresses using page table entries selected based on the context associated with the memory access request. The MMU 16 may retrieve cached page table entries from TLB 18, or may retrieve PTEs from memory by performing a page table walk in memory.

Memory access requests are issued from the translation circuitry 16 specifying physical addresses (PA1, PA2) which identify locations of data in a memory system. For certain types of memory access request (e.g., for accessing a predetermined range of addresses for which there is no corresponding storage location in the memory 24), the CPU may interpret those memory access requests as requests to access a set of memory-mapped registers, such as the memory-mapped control registers 23 for controlling the set of hardware accelerators.

FIG. 27 illustrates control register access circuitry 2700 for controlling access to the memory-mapped control registers 23. It might typically be expected that each physical address for accessing the memory-mapped registers corresponds to a particular item of control state in a memory-mapped control register. However, the control register access circuitry 2700 is configured to treat access requests specifying certain different physical addresses as accesses to the same item of control state in the memory-mapped control registers. Hence, as shown in FIG. 27, an access request to physical address PA1 may be treated as an access to control state in control register 0 and an access request to the different physical address PA2 may also be treated as an access to the same control state in control register 0.

Treating certain different physical addresses as accesses to the same control state provides a mechanism by which protection levels can be associated with access requests and access of software to particular protection levels can be controlled. In particular, the set of control registers 23 may be mirrored in different pages of the physical address space (the pages of physical address space corresponding to each instance of the set of control registers being referred to here as "register pages"), with each register page being associated with a different protection level. Hence, different physical addresses being associated with accesses to a particular control register can be assigned different protection levels. For example, an access to a first physical address may be treated as an access to the LRESP register in protection level 1, whereas an access to a different second physical address may be treated as an access to the LRESP register in protection level 2.

By providing different physical addresses corresponding to different protection levels, the ability of software to access registers via a particular protection level can be controlled using conventional page table techniques for controlling access of software to memory. For example, using the page table entries, a particular item of software may be prohibited from accessing physical addresses associated with the control registers in protection levels 1 to 3, but allowed access to physical addresses associated with the control registers in protection level 0. Hence, a particular software process may be restricted to accessing the control registers using protection level 0.

The page table entries associated with a particular software process can be used to control access to protection levels because the page table entries can be used to control access to certain physical addresses. For example, the page table structures provided for a given software process's address translation context may not include any page table entries which map to a given physical address corresponding to one of the register pages at a given protection level, and hence the particular software process is unable to issue memory access requests which can be translated to physical addresses for accessing the control registers from a particular protection level. Alternatively a page table entry may be provided defining a translation to a particular physical address, but the permissions bits of that page table entry may nevertheless prohibit access of the particular software process to the physical address associated with a certain protection level.

Figure 28:
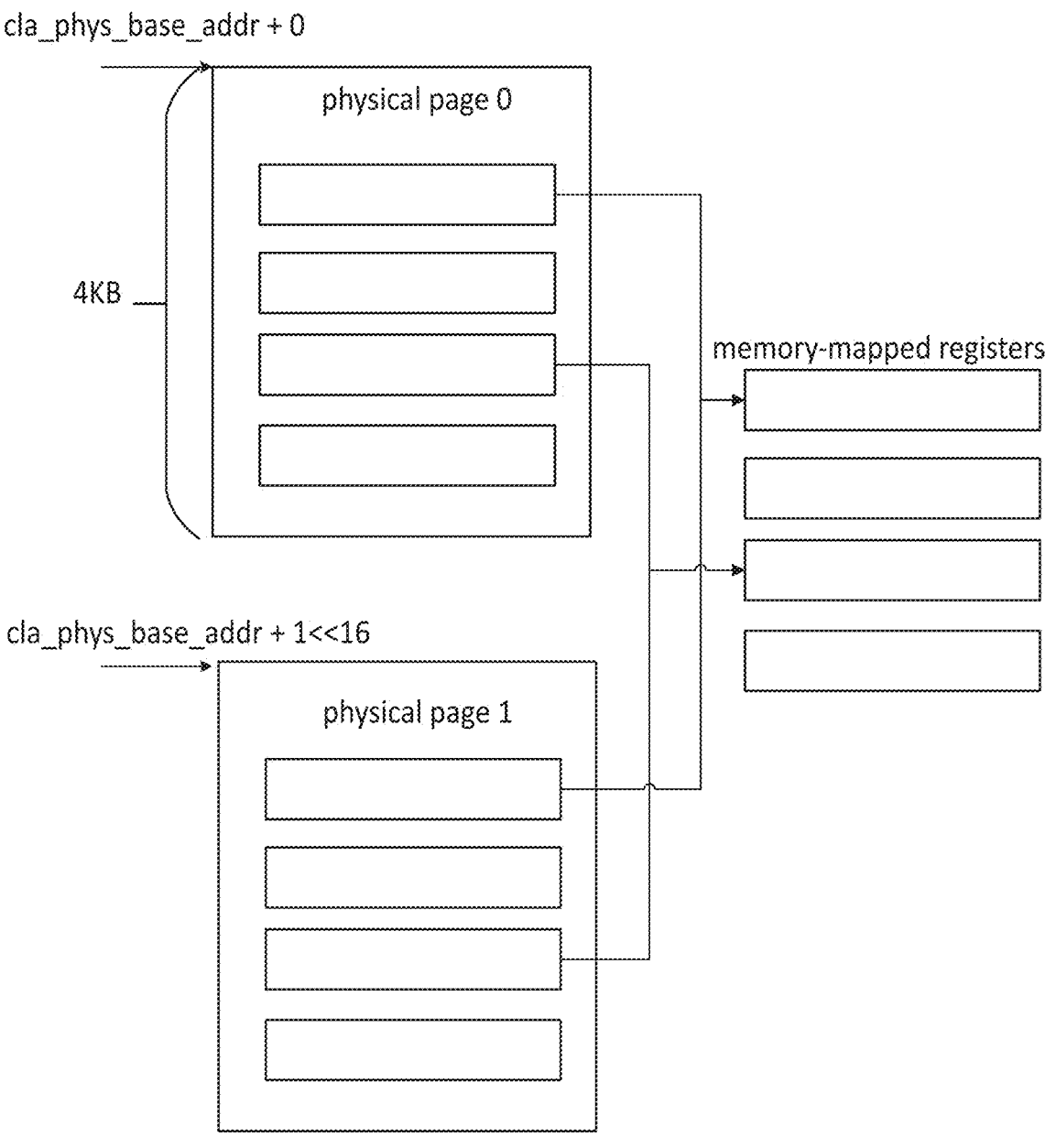
FIG. 28 schematically illustrates accesses to a set of memory-mapped control registers via different pages of physical memory.

In some examples, the physical addresses corresponding to the set of memory-mapped control registers in a particular protection level may be allocated in a particular region of physical address space, for example the physical addresses corresponding to a particular protection level may be provided in the same physical memory page. This arrangement of addresses is illustrated in FIG. 28, which shows two 4 KB pages of physical memory, each containing addresses mapped to each of the control registers and each page corresponding to a different protection level. The physical memory pages used for each protection level may be at respective offsets from a common base address, such that an address of a register page at protection level X can be calculated by adding a corresponding offset to a base address (cla_phys_base_addr in FIG. 28). In some examples, the pages used for each protection level are contiguous in memory such that the offset corresponding to protection level X is X left shifted by 16 bits—16 bits being specific to the example of 4 KB page sizes, but if other page sizes are used then the number of bits to shift by may vary). By providing the physical addresses corresponding to a particular protection level in the same memory page, then access to a particular protection level can be controlled by a single common page table entry.

FIG. 28 illustrates how accesses to different addresses in different register pages may be treated as accesses to the same memory-mapped register. Accesses originating from different physical register pages may be treated as accesses to the same item of control state via different protection levels. Therefore, as discussed above, providing physical addresses in different register pages means that page table entries can be used to control which protection levels software is permitted to use to access the hardware-accelerator control registers.

Returning to FIG. 25, at step 2500 the access control circuitry 2700 associated with the interface circuitry 14 of the CPU 4 determines a protection level associated with the memory access request used to write to the LAUNCH register based on which physical address was used to write to the LAUNCH register.

At step 2502, it is determined whether the software used the highest protection level, PL3, to access the LAUNCH register. If so, then at step 2504 it may be determined that the target hardware accelerator is available. All hardware accelerators may be treated as available to the highest protection level, as the highest protection level may only be accessible to the most privileged code of the CPU 4.

If the PL is not PL3, then at step 2506 it is determined which other PL was used to access the LAUNCH register, and hence which protection level requested the operation to be performed. In the example of FIG. 25 (as shown in FIG. 11), there are 4 different protection levels in a hierarchy in which PL0 is the least privileged protection level and PL3 is the most privileged protection level. It is up to the programmer to decide which protection levels are accessible by different software processes, by causing the page tables used by a given software process to be set appropriately. In one example implementation, access via the PL0 register page may be used by user level code, access via the PL1 level may be used by kernel level code, and access via the PL2 level may be used by the hypervisor. Hence, protection levels may generally follow exception levels (although it will be appreciated that this is not enforced by the hardware). Hence, as access to the LAUNCH register is possible from PL0 intended for use by user level code, user level application code is able to configure the accelerator to carry out delegated tasks directly, without necessarily needing to call into a kernel driver. This can greatly improve efficiency of accelerator control than in control schemes where only the kernel or software at higher privilege can request accelerator activity.

Figure 29:
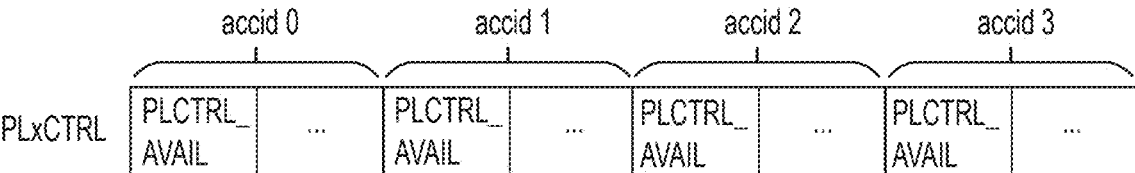
FIG. 29 illustrates an example encoding of a protection level control register.

Software may control access to a given hardware accelerator at a given protection level PLx or lower by setting values in the PLxCTRL register. Hence, PL0CTRL controls access at PL0, PL1CTRL controls access at PL0 or PL1, and so on. FIG. 29 provides an example encoding of a PLxCTRL register. As shown in FIG. 29, the PLxCTRL register includes a field per hardware accelerator providing at least a PLCTRL_AVAIL indication indicating whether that hardware accelerator is accessible in response to writes to the LAUNCH register associated with protection level PLx or lower. Whilst FIG. 29 illustrates a PLxCTRL register indicating attributes of four hardware accelerators, it will be appreciated that the PLxCTRL register may provide a PLC-TRL_AVAIL field for each hardware accelerator supported by a particular implementation. The PLxCTRL field may also provide further information for each hardware accelerator. As shown in FIG. 10, for example, 3 debug permissions bits may be provided for each hardware accelerator by each PLxCTRL register. The debug permissions bits may express the extent to which debug functions of the CPU 4 are able to probe internal state of the corresponding accelerator 22.

As shown in FIG. 11, the PLxCTRL register associated with protection level PLx can only be accessed by protection levels higher than PLx. Hence, PL1 can only modify PL0CTRL and hence can only control availability of hardware accelerators to PL0 but not availability of hardware accelerators to PL1, PL2, or PL3.

As each PLxCTRL register controls access to hardware accelerators at PLx or lower, there may be several PLxCTRL registers which control access to a particular hardware accelerator at a particular protection level. For example, access to an accelerator at PL1 is controlled by PL1CTRL and PL2CTRL. Hence, for determining whether a given hardware accelerator is available at a given protection level, several protection level control registers PLxCTRL may be relevant. In the example of FIG. 25, several PLxCTRL registers can be used to control access to a hardware accelerator at a certain PL by combining the relevant PLxC-TRL registers and using the combined registers to control access (although it will be appreciated that in other examples different techniques could be used). When combining PLxC-TRL registers, the selection of which registers to combine is made at steps 2508, 2510, and 2512 depending on which protection level is attempting to use the target hardware accelerator.

If the software wrote to the LAUNCH register using a physical address associated with protection level PL0 (e.g., user code requested a hardware accelerator operation to be performed), then access is controlled by all of PL0CTRL, PL1CTRL, and PL2CTRL. Hence, at step 2508 the PL0CTRL, PL1CTRL, and PL2CTRL registers are combined to provide an effective control register, and the effective control register is used to determine if the hardware accelerator is available. How the registers are combined depends on implementation choice.

FIG. 30 schematically illustrates example logic for combining PLxCTRL registers when the registers are encoded in the same format (corresponding bits control access to the same hardware accelerator) and the PLCTRL_AVAIL field indicates that an accelerator is available using logic 1 and unavailable using logic 0. In FIG. 30, the relevant PLxCTRL registers are ANDed together using AND logic 3000. In the example logic shown in FIG. 30, this can be controlled using two multiplexers 3002, which can selectively inject 1 corresponding to PLxCTRL registers which are not relevant at higher protection levels (although it will be appreciated that this is not the only way of implementing the logic).

Hence, at step 2508 the protection level control registers PL0CTRL, PL1CTRL, and PL2CTRL may be combined by a bitwise AND operation, and the PLCTRL_AVAIL field of the resulting value corresponding to the target hardware accelerator would provide an indication of whether the accelerator is available or not available.

If the software wrote to the LAUNCH register using a physical address associated with protection level PL1 (e.g., kernel code requested a hardware accelerator operation to be performed, e.g., during context switching), then access is controlled by PL1CTRL and PL2CTRL. This means that a particular hardware accelerator may be unavailable to PL0 (user code) but available to PL1 (kernel code) if the unavailable bit is only set PL0CTRL. This mechanism allows kernel code to still perform context switching of a hardware accelerator (which requires requesting accelerator operations such as ENTERSR, SAVE, etc.) even when the accelerator is unavailable to PL0. At step 2510 the PL1 CTRL and PL2CTRL registers are combined to provide an effective control register value (hence in the example logic shown in FIG. 30, the multiplexer 3002 corresponding to PL0CTRL would inject a 1 to remove the dependency of the effective availability control on PL0CTRL).

If the software wrote to the LAUNCH register using a physical address associated with protection level PL2 (e.g., hypervisor code requested a hardware accelerator operation to be performed), then access is controlled by PL2CTRL only. At step 2512 it is determined that the effective control register value is provided by PL2CTRL. In the example logic shown in FIG. 30, both multiplexers 3002 would inject 1 to remove the dependency on PL0CTRL and PL1 CTRL. It will be appreciated that the same effective control results could be obtained by a different combination of logic gates 3000 and multiplexers 3002, so FIG. 30 only shows one particular example.

At step 2514 the effective control register value is used to determine whether the target hardware accelerator is available to the software that requested the accelerator operation to be performed by writing to the LAUNCH register.

In one example, for a given hardware accelerator, assume that the corresponding field of the PLxCTRL registers have the following values:

PL2CTRL.AVAIL=1

PL1CTRL.AVAIL=1 (hypervisor flag accelerator as available)

PL0CTRL.AVAIL=0 (kernel flag accelerator as unavailable)

This particular combination of control values results in the following register visibility:

Through PL0 page (user space): Accelerator unavailable

Through PL1 page (kernel): Accelerator available

Through PL2 page (hypervisor): Accelerator available

For user space (accessing via the PL0 page), this means that writes to the LAUNCH register will result in LRESP response LRESP_UNAVAIL, and the accelerator STATUS registers will read as zero. In comparison, the kernel (accessing via the PL1 page) has full visibility.

In a second example, for a given hardware accelerator, assume that the corresponding field of the PLxCTRL registers have the following values:

PL2CTRL.AVAIL=1

PL1CTRL.AVAIL=0 (hypervisor flags accelerator as unavailable)

PL0CTRL.AVAIL=1 (kernel flags accelerator as available)

This particular combination of control values results in the following register visibility:

Through PL0 page (user space): Accelerator unavailable
Through PL1 page (kernel): Accelerator unavailable
Through PL2 page (hypervisor): Accelerator available For user space (accessing via the PL0 page) and kernel space (accessing via the PL1 page), this means that writes to the LAUNCH register will result in LRESP response LRE-SP_UNAVAIL, and the accelerator STATUS registers will read as zero. In comparison, the hypervisor (accessing via the PL2 page) has full visibility.

The PLxCTRL registers hence enable control over which software has access to each hardware accelerator 22. The PLxCTRL registers can also similarly be used to control access to the EVENT and STATUS[ ] registers, as shown in FIG. 11. The EVENT and STATUS registers provide hardware accelerator-specific event reporting and status information as described earlier.

A software designer may wish that software for which a particular hardware accelerator is unavailable does not have access to EVENT and STATUS information regarding that particular hardware accelerator, as this could leak information about sensitive processing carried out by the accelerator on behalf of other threads or more privileged software processes. Hence, the PLxCTRL registers combined as described above for determining availability of a given hardware accelerator can also be used as masks to control access to the EVENT and STATUS registers as shown in FIGS. 31 and 32.

Figures 31, 32:
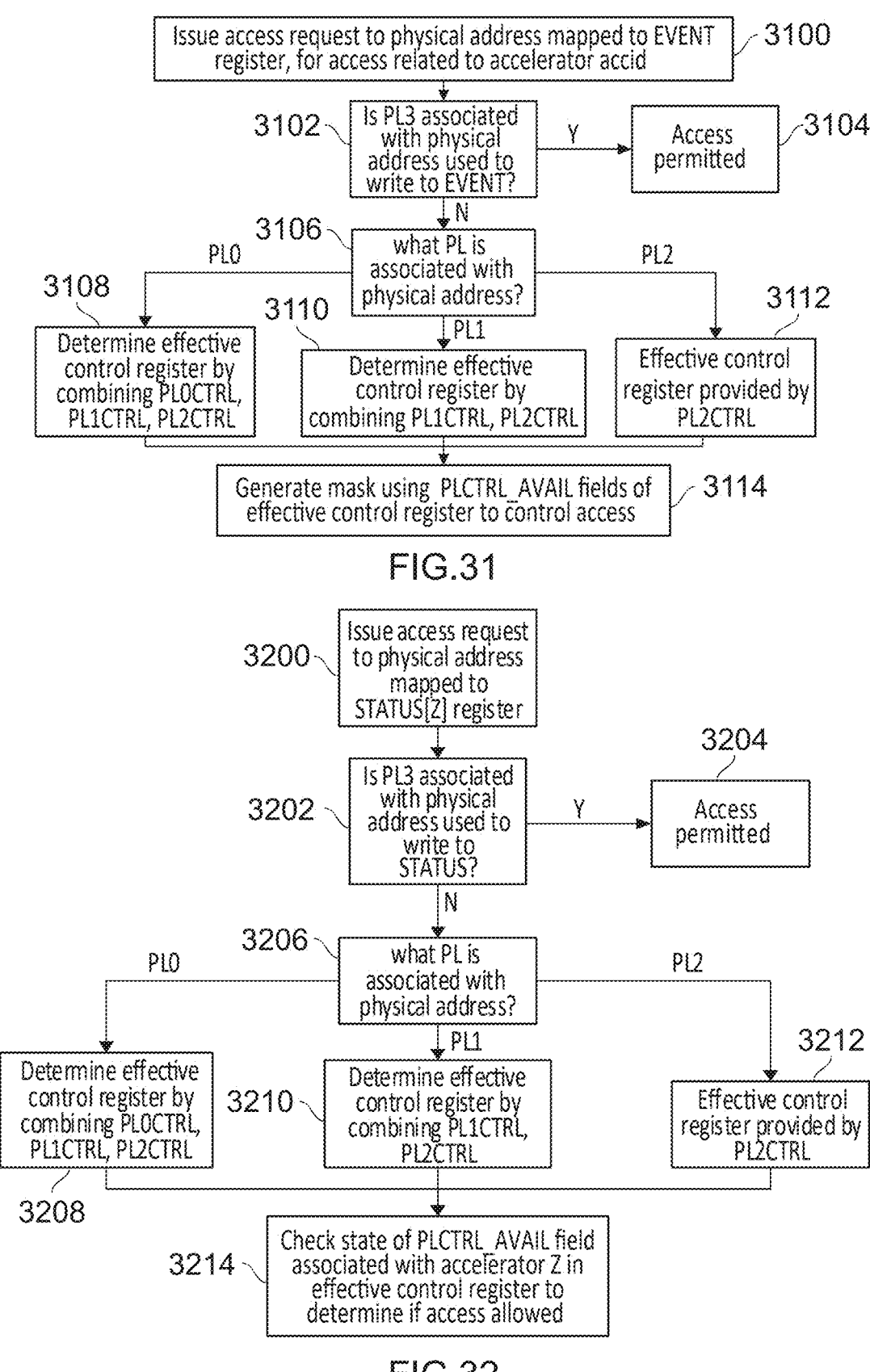
FIG. 31 is a flow diagram illustrating a process of controlling access to an EVENT control register.
FIG. 32 is a flow diagram illustrating a process of controlling access to a set of STATUS registers.

FIG. 31 is a flow diagram illustrating a method of using PLxCTRL registers to control access to the EVENT register 412. The EVENT register 412 provides per-accelerator event flags, and software for which a particular hardware accelerator is unavailable should not see the event flag corresponding to that hardware accelerator. At step 3100 an access request is observed which specifies a physical address mapped to the EVENT register. The EVENT register is read-only, so this memory access request should be a read request. The PL associated with the access request is determined based on which physical address was used to access the EVENT register.

At step 3102 it is determined whether the access is associated with PL3. If so, then the access request is provided full access to the EVENT register at step 3104. As shown in FIG. 11, PL3 always has full access to every control register 23.

If the PL is not PL3, then at steps 3106, 3108, 3110, and 3112 the PLxCTRL registers are combined based on the access PL, in the same way as described above for steps 2506, 2508, 2510, and 2512 shown in FIG. 25.

The resulting effective control register value is then used to control access to the EVENT register at step 3114. For example, the PLCTRL_AVAIL bits of the effective control register may be used as a mask for the per-accelerator status flags of the EVENT register. For example, the returned value of the EVENT register may include a 0 for each accelerator flag corresponding to an unavailable hardware accelerator, regardless of the actual value stored in the EVENT register.

FIG. 32 is a flow diagram illustrating a method of using PLxCTRL registers to control access to the STATUS registers STATUS[0] to STATUS[7]. Each STATUS[ ] register corresponds to a particular hardware accelerator, and software for which a particular hardware accelerator is unavailable should be able to access the STATUS register corresponding to that hardware accelerator. At step 3200 an access request is observed which specifies a physical address mapped to a STATUS register. The STATUS registers are read-only from the point of view of the software on the CPU 4, so this memory access request should be a read request. The PL associated with the access request is determined based on which physical address was used to access the STATUS register.

At step 3202 it is determined whether the access is associated with PL3. If so, then the access request is provided full access to the EVENT register at step 3204. As shown in FIG. 11, PL3 always has full access to every control register 23.

If the PL is not PL3, then at steps 3206, 3208, 3210, and 3212 the PLxCTRL registers are combined based on the access PL, in the same way as described above for steps 2506, 2508, 2510, and 2512 shown in FIG. 25.

The resulting effective control register value is then used to control access to the relevant STATUS register at step 3214. For example, the PLCTRL_AVAIL bit of the effective control register corresponding to the hardware accelerator corresponding to the accessed STATUS register is used to determine whether the access request should be allowed to proceed or not. If the combined control registers indicate that the hardware accelerator is available to the requesting PL, then the memory access request is allowed to read the data from the corresponding STATUS register. If the combined control registers indicate that the hardware accelerator is unavailable to the requesting PL, then the memory access request is prevented from reading the data from the corresponding STATUS register. For example, the corresponding STATUS register may read as all zeros.

FIG. 33 is a ladder diagram illustrating a process of performing a context change for a given hardware accelerator. The process of FIG. 33 may be carried out when, following a CPU 4 context switch, the new CPU context requests use of the hardware accelerator while the internal state of the hardware accelerator is associated with a different processing context.

At step 3300 user code (e.g., having access to PL0 only) requests more privileged kernel code to switch the context of a given hardware accelerator. The kernel code executes a store instruction at step 3302 to store data identifying the ENTERSR operation to the LAUNCH register.

The kernel code uses the PL1 protection level, to which the given hardware accelerator is available, allowing an ENTERSR transaction to be issued to the given hardware accelerator (such an operation would have not been permitted if the user code attempted to trigger the ENTERSR operation if the given hardware accelerator is unavailable to PL0). At step 3304 hardware of the CPU (e.g., control register access circuitry 2700 and control interface circuitry 14) determines that the given hardware accelerator is available to the kernel and issues an ENTERSR transaction to the given hardware accelerator over the CREQ control interface channel.

At step 3306 the given hardware accelerator receives the ENTERSR transaction and stops issuing memory transactions to prepare the hardware accelerator for a context switch (e.g., by reducing the amount by which the internal state of the hardware accelerator changes). When the hardware accelerator has completed the operation to enter the save/restore mode, the hardware accelerator 22 responds to the CPU 4 with an OK response packet on the CRSP channel at step 3308. The OK response includes, as payload data to be stored to the DATA[ ] registers of the CPU 4, save/restore state (srstate), which indicates internal state data of the hardware accelerator.

At step 3310 the kernel polls the LRESP register of the CPU 4 and at step 3312 reads data indicating that the LRESP_CODE field is set to LRESP_OK. Between steps 3302 and 3308 the kernel may also poll the LRESP register, although in this case the response would indicate LRESP_PENDING as a response would not have been received from the hardware accelerator.

In response to determining that the hardware accelerator has successfully entered the save/restore mode and has returned srstate, at step 3314 the kernel context switches the memory-mapped control registers by saving the memory-mapped control registers to a buffer region in memory and loading memory-mapped control register state associated with the new context from a buffer in memory corresponding to the new context. This involves context switching srstate (in the DATA registers).

At step 3316 the kernel writes data to the DATA registers indicating the address of a buffer region in memory associated with the old context (which could be the same buffer to which the contents of the memory-mapped control registers was saved at step 3314, or could be a different buffer), to identify to the hardware accelerator the location in memory to which the old internal state should be stored. In some architectural implementations, the DATA register used for the buffer target address may be constrained to be DATA[$_0$] by default. At step 3318 the kernel executes a store instruction to write data to the LAUNCH register identifying the SAVE operation and the target hardware accelerator. At step 3320, the CPU 4 issues a SAVE transaction over the CREQ control interface channel to the given hardware accelerator including the save address (from the DATA registers) in a payload word. At step 3324 the hardware accelerator starts saving its internal state (e.g., source and result data for ongoing processing operations, state of control registers, and so on) to memory to a buffer identified by the target address specified in the SAVE transaction. When this save operation successfully starts, the hardware accelerator issues an OK transaction (without payload) to the CPU 4 at step 3326, causing the LRESP register to be set such that LRESP_CODE indicates LRESP_OK (and LRESP_PEND-ING is cleared).

At step 3328 the kernel polls LRESP and reads LRE-SP_OK at step 3330, indicating to the kernel software that the save operation has been successfully started by the hardware accelerator (but not necessarily successfully completed). The kernel therefore begins polling the STATUS register corresponding to the given hardware accelerator to monitor progress of the save operation.

At step 3332 the hardware accelerator completes the save operation and at step 3334 issues a STATUS transaction over the CRSP channel to the CPU 4 to set the STATUS_IDLE field to indicate that the hardware accelerator has completed its operation and is idle. At step 3336 the kernel reads the STATUS register as part of its regular polling and at step 3338 receives data indicating STATUS_IDLE. Therefore, at step 3340 the kernel has determined that the hardware accelerator has successfully completed saving its internal state to memory.

At this stage the kernel may optionally perform a reset operation to reset the internal state of the hardware accelerator, to prevent leakage of information between contexts. If switching between contexts belonging to the same process (e.g., between threads in the same context) or switching from a lower privilege thread to a higher privilege thread, for example, then the reset operation could be omitted as it may be determined that no security vulnerability arises from the leakage of information between contexts. The reset operation is shown in more detail in FIG. 34 described below.

After the save operation, and optionally the reset operation, has been completed by the given hardware accelerator, at step 3342 the kernel writes the address of the buffer in memory corresponding to the new context to a selected DATA register (in some implementations, the DATA register to be used for the address may be constrained to be DATA[0] by default). At step 3344 the kernel executes a store instruction to write data to the LAUNCH register identifying the RESTORE operation and the target hardware accelerator. At step 3346, the CPU 4 issues a RESTORE transaction over the CREQ control interface channel to the given hardware accelerator including the restore address (from the DATA registers) in a payload word. At step 3348 the hardware accelerator starts loading internal state from the buffer structure in memory that is identified by the target address specified in the RESTORE transaction. When this restore operation successfully starts, the hardware accelerator issues an OK transaction (without payload) to the CPU 4 at step 3350, causing the LRESP register to be set such that LRESP_CODE indicates LRESP_OK (and LRESP_PEND-ING is cleared).

At step 3352 the kernel polls LRESP and reads LRE-SP_OK at step 3354, indicating to the kernel software that the restore operation has been successfully started by the hardware accelerator (but not necessarily successfully completed). The kernel therefore begins polling the STATUS register corresponding to the given hardware accelerator to monitor progress of the restore operation.

At step 3356 the hardware accelerator completes the restore operation and at step 3358 issues a STATUS transaction over the CRSP channel to the CPU 4 to set the STATUS_IDLE field to indicate that the hardware accelerator has completed its operation and is idle. At step 3360 the kernel reads the STATUS register as part of its regular polling and at step 3362 receives data indicating STA-TUS_IDLE. Therefore, at step 3364 the kernel has determined that the hardware accelerator has successfully completed loading new internal state corresponding to the new context from memory.

At step 3366 the kernel loads srstate associated with the new context from memory and stores srstate into the DATA registers. At step 3368 the kernel writes to the LAUNCH register with data indicating the EXITSR operation. At step 3370 the CPU 4 therefore issues an EXITSR transaction to the given hardware accelerator 22, including in its payload data the srstate associated with the new context. Assuming that no errors arise, at step 3372 the hardware accelerator restores its internal state using srstate and exits the save/restore mode, responding to the EXITSR transaction with an OK response packet. The kernel polls the LRESP register at step 3374 and receives a response indicating LRESP_OK at step 3376. At step 3378 the status register corresponding to the given hardware accelerator is updated with the restored status and STATUS_PAUSE is set. Hence, the context change of the given hardware accelerator is complete and at step 3380 the kernel updates PL0CTRL to indicate that the given hardware accelerator is available to PL0 and returns processing to the user code.

Therefore, FIG. 33 illustrates a mechanism by which code having access to a higher protection level can be called by code having access to a lower protection level, to request that the context of a hardware accelerator is switched.

Figure 34:
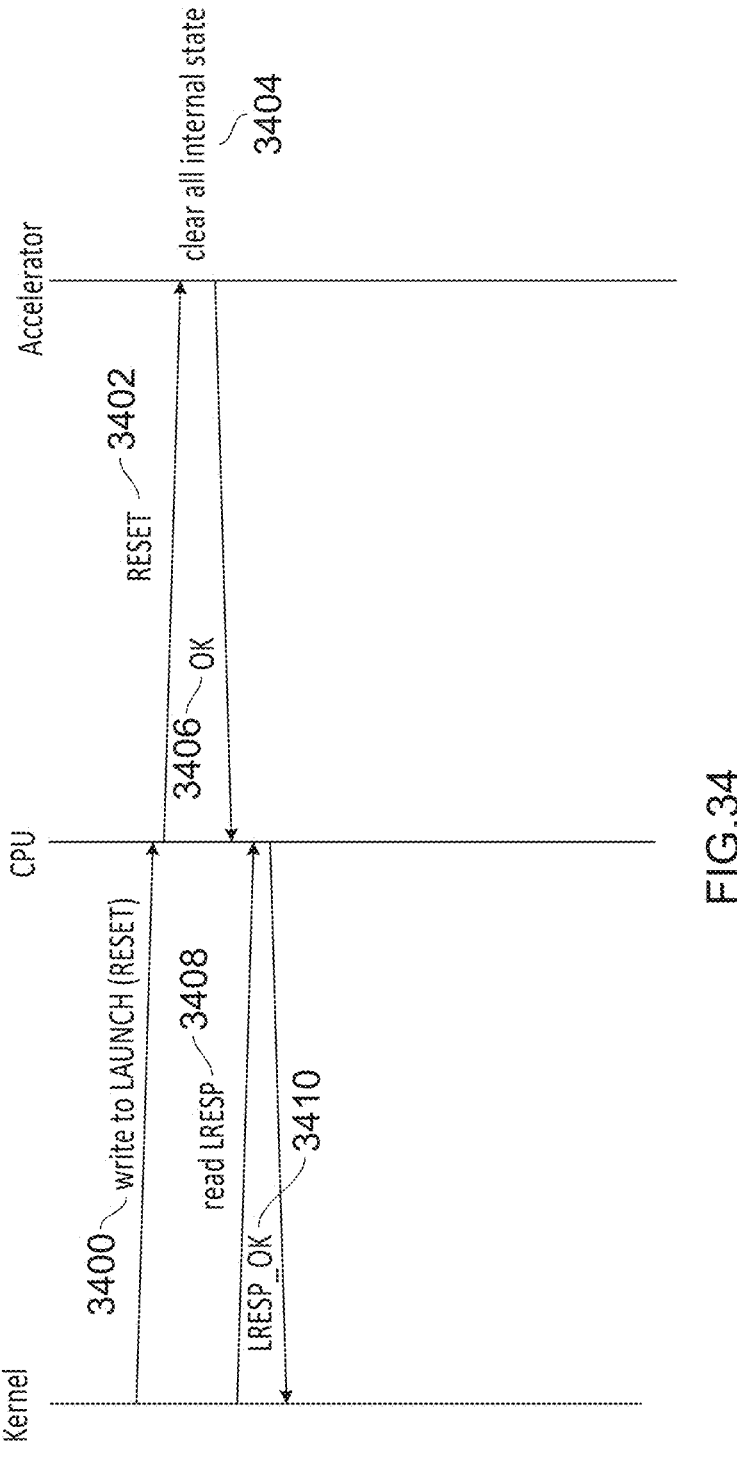
FIG. 34 is a ladder diagram illustrating a process for issuing a RESET transaction.

FIG. 34 is a ladder diagram illustrating a process of resetting internal state for a given hardware accelerator. At step 3400 the kernel executes a store instruction to write data to the LAUNCH register identifying the RESET operation and the target hardware accelerator. At step 3402 the accelerator interface circuitry 14, after checking that the target hardware accelerator is available to the PL used to write to the LAUNCH register issues a RESET transaction to the identified target hardware accelerator over the CREQ control interface. The target hardware accelerator responds to the RESET transaction at step 3404 by resetting its internal storage (e.g., setting all to zero), and once complete issuing an OK response transaction over the CRSP channel to the CPU 4. The kernel polls LRESP at step 3408 and receives data indicating LRESP_OK at step 3410, hence indicating that the internal state of the target hardware accelerator was successfully reset.

FIG. 35 is a flow diagram illustrating a process carried out by the CPU 4 in response to an accelerator-triggered memory access request. At step 3500 the processor 4 receives a memory access request from a given hardware accelerator 22 over a channel of the memory interface, e.g., a RD_AR channel or a WR_AW channel. The accelerator-triggered memory access request specifies a target virtual address in a context associated with the hardware accelerator (which may differ from a current context of the CPU 4).

At step 3502 the accelerator address translation context of the hardware accelerator from which the memory access was received is determined using context identifying information associated with the given hardware accelerator (e.g. the context identifying information which was captured at step 2110 of FIG. 21 at launch of the command which caused the accelerator to issue the corresponding memory access request). It is determined whether the accelerator address translation context is an address translation context currently enabled by the MMU 18 of the processor 4. This determination is described in more detail with reference to FIG. 43 described below. In some implementations, the MMU 18 may support only a single active address translation context at a time. In other examples, the MMU 18 may support two or more active address translation contexts. An active context is a context for which the MMU 18 has sufficient control state defined in its translation control registers 30 to enable the MMU to perform a page table walk operation to locate translation table entries for that context from memory 24. For an inactive context, although the MMU's TLB 18 may still cache entries relating to the inactive context, on a TLB miss it would not be possible to perform a page table walk as the relevant state information (e.g. page table base address, page table structure defining information) may not be present in the translation control registers 30. The translation control registers 30 may contain information (e.g. context identifiers such as a virtual machine identifier and/or address space identifier) identifying which contexts are currently active.

If it is determined that the accelerator address translation context is an inactive context not currently enabled by the processor MMU 18, then at step 3504 a context fault indication is generated and returned to the hardware accelerator in a read/write response to the accelerator-triggered memory access request. The context fault indication has an encoding specifying an indicator NOCTX set to indicate that the cause of the fault is that the context associated with the faulting memory access request was an inactive address translation context not currently enabled by the MMU 18.

If it is determined at step 3502 that the accelerator address translation context is currently enabled by the processor MMU 18, then at step 3506 a request is sent to the processor 4 MMU 18 requesting that the target virtual address specified by the accelerator-triggered memory access request is translated into a physical address using the accelerator address translation context. At step 3508 it is determined whether any address translation faults arise during the translation. Although in this case the request relates to an active address translation context, the request could nevertheless encounter an address translation fault for various reasons, e.g. if the request violates access permissions specified for the target virtual address (e.g. the request is a write request but the access permissions define a read-only region of memory), or if no valid page table entry has been configured by software to provide an address mapping for the target virtual address. If an address translation fault is encountered for reasons other than the request relating to an inactive address translation context, then at step 3510 a translation fault indication is generated and returned to the hardware accelerator in a read/write response (e.g., over the RD_R or WR_B channels). The translation fault indication indicates that a translation fault has occurred, but has the NOCTX indicator clear to indicate that the fault is for reasons other than the memory access transaction relating to an inactive translation context.

At both steps 3504 and 3510, the context fault indication or translation fault indication are reported back to the accelerator 22 and do not cause processing on the processor 4 to be interrupted. Because the accelerator-triggered memory access requests are issued asynchronously from processing on the processor 4, signalling a fault to the processing circuitry of the processor immediately on detecting the inactive context fault or address translation fault for an accelerator-triggered memory access request may not be desirable as this may make it difficult for an exception handler to determine which software process or point of program flow is associated with the detected fault. Hence, at step 3512 the processor 4 can continue with uninterrupted execution of instructions even after an inactive context fault or address translation fault is identified in response to the accelerator-triggered memory access request.

If no address translation fault is detected at step 3508, and the virtual address of the accelerator-triggered memory access request is successfully translated into a physical address identifying a location in the memory system (either based on a cached entry in the TLB 18, or based on performing a page table walk to memory to locate the required page table information), then at step 3514 a read or write request is issued to the memory system to access the location identified by the translated physical address. When it is determined at step 3516 that a response is received to the memory access request, then a memory access response is returned to the requesting hardware accelerator at step 3518. For read requests, the response is a read response including the requested data over the RD_R channel. For write requests, the response is sent over the WR_B channel and does not include payload data. In both cases the response indicates to the hardware accelerator that no address translation fault was identified.

FIG. 36 is a flow diagram illustrating a process carried out by a given hardware accelerator following the issuing of an accelerator-triggered memory access request to the CPU 4. The process of FIG. 36 supports indication, by the hardware accelerator, of faults encountered by the CPU 4 during address translation. This can allow the CPU 4 to resolve address translation faults at a more appropriate time compared to an alternative technique in which address translation faults caused by the hardware accelerator cause exceptions to be raised at the CPU 4 at the time of the MMU 18 detecting the address translation fault.

At step 3600 the hardware accelerator 22 issues an accelerator-triggered memory access request to the CPU 4. When the memory access request is a read request the request is issued over the RD_AR memory interface channel, and when the memory access request is a write request the request and its corresponding write data are issued over the WR_AW and WR_W channels. The memory access request specifies a target virtual address of the memory location to be accessed, the virtual address being specified within the address translation context active on the hardware accelerator (and unlike a physical address does not directly specify a location in the memory system to be accessed).

At step 3602 the hardware accelerator 22 determines whether a response to the read or write transaction has been received from the processor 4 (over the RD_R or WR_B channels respectively).

When it is determined that a response has been received, then at step 3604 it is determined whether that response indicates that an address translation fault has occurred during translation of the target virtual address by the CPU 4.

If no address translation fault was encountered then, when the memory access request was a read request, at step 3606 the read data is obtained from the read response and, regardless of the request type (read or write), at step 3608 the hardware accelerator 22 continues with processing of the delegated task having successfully completed the memory access.

If at step 3604 it is determined that an address translation fault did occur, then at step 3610 it is determined whether the target virtual address of the memory access request issued at step 3600 is within a virtual memory page for which an unresolved address translation fault is already pending. This determination can be made by referencing the EFSR and FSAR registers with each FSAR register indicating, in the FSAR_ADDR field, an address of a virtual memory page comprising a pending address translation fault.

If the address translation fault occurred for a target virtual address within a memory page for which an unresolved address translation fault is already pending, then at step 3612 it is determined that there is no need to update the EFSR and FSAR registers as they already identify that the fault has occurred for the corresponding page, so resolving the earlier detected fault for that page should also address the fault for the current faulting memory access request. The memory access request issued at 3600 can be retried in response to determining that the previous fault for the same virtual memory page has been resolved (indicated by a RESOLVE transaction). Following step 3612, processing continues at step 3614 with portions of the delegated task which can be performed without waiting for the address translation fault to be resolved, if any such portions exist.

If at step 3610 it is determined that there is no unresolved fault already pending for the virtual memory page comprising the target virtual address which gave rise to the address translation fault, then at step 3616 registers of the hardware accelerator 22 are updated to indicate the fault. In particular, an available FSAR register 1308 (previously having FSAR_VALID field FSAR[0] set to indicate invalidity) is updated to indicate that said FSAR register is valid and specify the address of the memory page comprising the target virtual address in the FSAR_ADDR field. The FSAR register is also updated to indicate whether the memory access request issued at step 3600 was a read or write (in the FSAR_WRITE field), and whether the address translation fault was caused by the translation context not being available (in the FSAR_NOCTX field). If the selected FSAR register 1308 updated with the fault information was the last available FSAR register not already storing valid fault information, then the accelerator 22 halts issuing further memory access requests until an FSAR register 1308 can become free again, as issuing further memory access requests would risk a further fault being detected which would not be able to be recorded in the FSAR registers 1308. Hence, it may be implicit that if a memory access request is issued at step 3600, there would be at least one FSAR register 1308 available to record information about a fault detected for that memory access request.

Also, the EFSR register is updated at step 3618 such that the EFSR_FSARV bit corresponding to the updated FSAR register is set to indicate that the updated FSAR register contains valid fault status information.

At step 3620 it is determined whether there are any other address translation faults which have already been reported to the processor 4 but which remain unresolved. This may involve determining whether the EFSR_FSARV field indicates any valid FSAR registers other than the one set at step 3616. If so, then the STATUS register corresponding to the given hardware accelerator performing the steps of FIG. 36 will already indicate a pending fault in the STATUS_FAULT field. If not, then at step 3622 the given hardware accelerator issues a STATUS transaction to the CPU 4 requesting that the STATUS_FAULT field of the corresponding STATUS register is updated to indicate that there is now a pending address translation fault to be resolved by the CPU 4. In either case, following steps 3620 or 3622 the hardware accelerator continues processing at step 3614 with portions of the delegated task which can be performed without waiting for the address translation fault to be resolved, if any such portions exist.

FIG. 37 is a flow diagram illustrating steps taken by the CPU 4 in response to processing circuitry 6 writing to the LAUNCH register to request launch of the RESOLVE operation. The RESOLVE operation is used to indicate to a given hardware accelerator that one or more address translation faults have been resolved, so that the hardware accelerator can retry faulting memory accesses and continue making progress on the delegated task. Address translation faults for resolution by the CPU 4 are indicated in the FSAR and EFSR as discussed above, and may be resolved by the CPU 4 whenever software of the CPU 4 determines that it is appropriate to do so. Providing the error reporting mechanism using the EFSR and FSAR registers allows the CPU 4 to defer handling the address translation fault until the most appropriate time. For example, the CPU 4 may handle the address translation fault when it is processing the thread which delegated the task which gave rise to the address translation fault.

At step 3700 the processing circuitry 6, having resolved one or more address translation faults (e.g., by allocating memory pages, updating permissions, updating the relevant page table entries, assigning a new active address translation context, and so on) writes to the DATA[0] register with a 32 bit mask, each bit corresponding to an FSAR register, and each bit indicating whether the fault indicated in the corresponding FSAR register has been resolved. The processing circuitry 6 then writes to the LAUNCH register identifying the RESOLVE command and the target hardware accelerator, to request the accelerator control interface circuitry 14 to issue the RESOLVE transaction.

At step 3702, the CPU 4 determines whether the target accelerator indicated in the LAUNCH register is available to the protection level associated with the physical address used to write to the LAUNCH register, following the process shown in FIG. 25. If at step 3702 it is determined that the hardware accelerator is unavailable, then at step 3704 the CPU 4 sets the LRESP_CODE field in the LRESP register to indicate LRESP_UNAVAIL, to signal to the software that the target hardware accelerator is not available.

At step 3706 it is determined whether any errors have been detected associated with the write to the LAUNCH register. For example, if LRESP_PENDING is set in the LRESP register then new commands are unable to be launched. If an error is detected, then at step 3708 an error indication is set in a location accessible to software executing on the processor 4. For example, the LRESP register may be updated to set LRES_CODE to LRES_ERROR and indicate the cause of the error in LRESP_ERRORCODE (e.g., ERRCODE_LWPEND if LRESP_PENDING was set when data was written to the LAUNCH register).

At step 3710, the RESOLVE transaction is issued to the target hardware accelerator using the CREQ control interface channel. The RESOLVE transaction comprises a header word followed by a payload word including the 32 bit bitmask from the DATA[0] register identifying the FSAR registers for which an address translation fault has been resolved.

At step 3712, after the RESOLVE transaction has been issued by the CPU 4 and before a launch response has been received from the hardware accelerator 22, the LRESP register 404 is set to indicate that a response is pending. For example the bit LRESP[0] providing the LRESP_PENDING field may be set to indicate a pending response. In the pending state, writes to the LAUNCH register may be discarded and raise an error.

At step 3714, the CPU 4 determines whether a response to the RESOLVE transaction has been received on the CRSP channel. If no response has been received after a certain timeout period has expired (step 3716), then at step 3718 a timeout error is set in a software accessible location to indicate the lack of response to the software. For example, the LRESP register 404 may be set such that the LRESP_CODE field indicates LRESP_ERROR, and LRESP_ERRCODE indicates ERRCODE_TIMEOUT.

If a response is received to the RESOLVE transaction via the CRSP control interface channel, then at step 3720 the LRESP register is updated accordingly. The LRESP_CODE field is set to one of OK or ERROR, the LRESP_PENDING flag is cleared, and if the response is ERROR then the LRESP_ERRCODE field is set to indicate the cause of the error.

FIG. 38 is a flow diagram illustrating a process carried out by a given hardware accelerator in response to receiving a RESOLVE transaction.

At step 3800 the given hardware accelerator 22 receives the RESOLVE transaction over the CREQ control interface, the RESOLVE transaction including a payload word providing a 32 bit bitmask.

At step 3802 it is determined whether any error is detected in response to the transaction.

For example, the hardware accelerator may become unavailable during processing of the RESOLVE transaction. If an error is detected, then this is reported by returning the ERROR response at step 3804. While error reporting is shown for completeness in steps 3720 of FIGS. 37 and 3802, 3804 of FIG. 38, in other examples it may be that the architecture does not support any error response reporting for RESOLVE transactions.

If no error is detected at step 3802, then at step 3806 an OK transaction is returned to the CPU 4 over the CRSP control interface.

At step 3808, the hardware accelerator 22 uses the bitmask included in the RESOLVE transaction to invalidate FSAR registers indicating address translation faults which have been resolved by the CPU 4. The EFSR register is updated to identify that the invalidated FSAR registers do not contain valid fault status information by clearing the EFSR_FSARV bits corresponding to the invalidated FSAR registers.

At step 3810 the hardware accelerator 22 may optionally retry memory accesses for which faults have been resolved by the CPU 4. Alternatively the hardware accelerator 22 may wait until all outstanding faults have been resolved before retrying memory accesses.

At step 3812 it is determined whether any unresolved faults remain, by checking whether the EFSR_FSARV field of the EFSR register identifies any valid fault status information in the set of FSAR registers. If there are no unresolved faults, then at step 3814 the hardware accelerator 22 issues a STATUS transaction to the CPU 4 requesting that the corresponding STATUS register is updated to clear the STATUS_FAULT field. Processing of the delegated task can then continue with no outstanding address translation faults.

If at step 3812 it is determined that there are remaining address translation faults, then processing continues at step 3816 with portions of the delegated task which can be performed without waiting for the outstanding address translation faults to be resolved, if any such portions exist.

Figure 39:
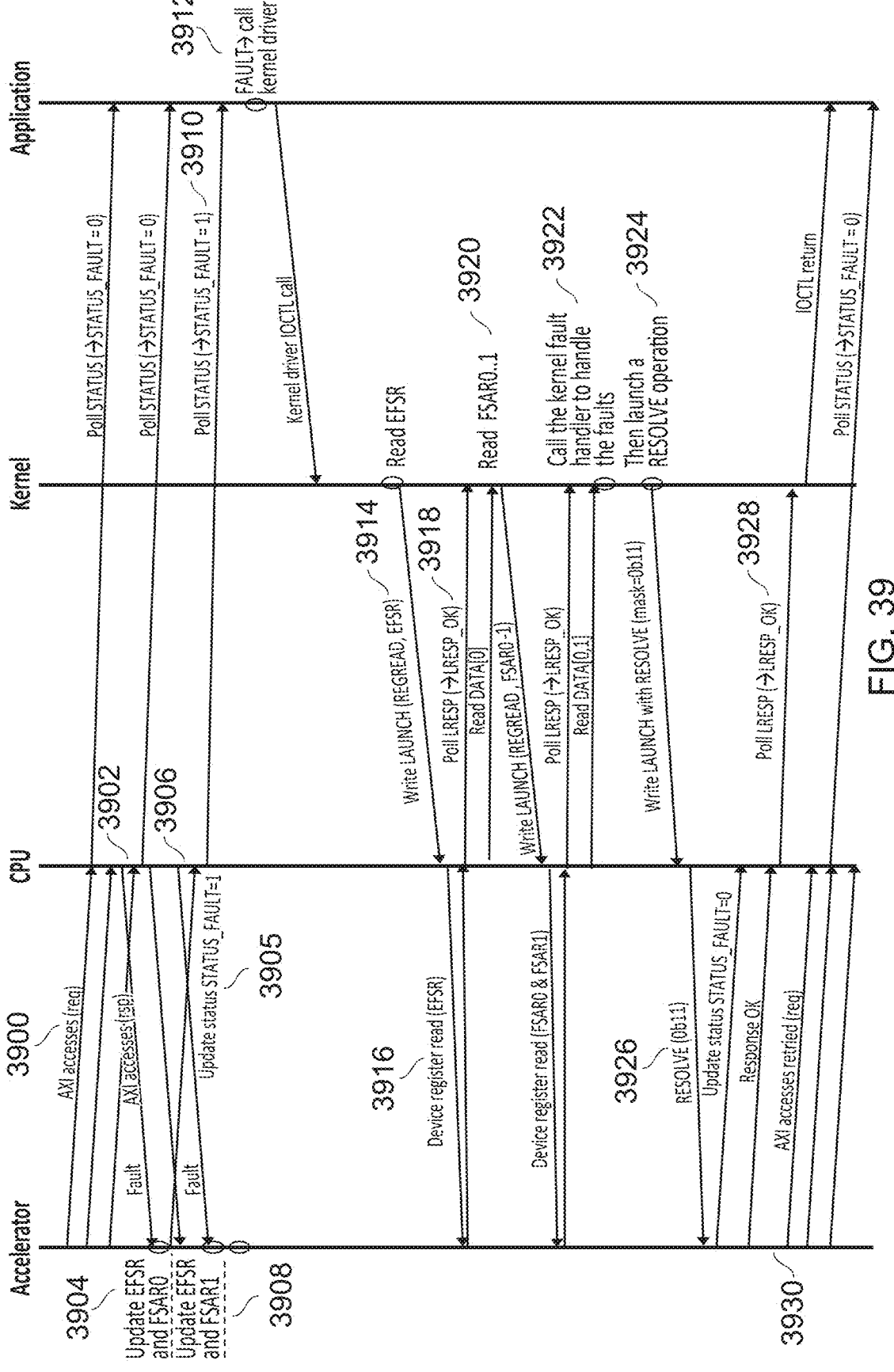
FIGS. 39 and 40 are ladder diagrams illustrating processes of identifying and resolving address translation faults raised in response to accelerator-triggered memory access requests.

FIG. 39 is a ladder diagram illustrating a process of identifying and resolving address translation faults raised during handling of accelerator-triggered memory access requests.

At step 3900 a given hardware accelerator 22 issues memory access requests to the CPU 4 over the memory access interface. The CPU 4 uses its MMU 18 to translate the target virtual addresses into target physical addresses, and carries out memory access operations in the memory system using the target physical addresses. Software executing on the CPU 4 (labelled "application") polls the STATUS register (in this example, periodically), and FIG. 39 illustrates the values of the STATUS register being returned to the software, indicating that there are no pending address translation faults for the given hardware accelerator as STATUS_FAULT=0.

At step 3902 an address translation fault arises during translation of a target virtual address specified in an accelerator-triggered memory access request. The address translation fault does not cause an exception to be raised, and processing of software continues uninterrupted. However, a memory access response is returned to the given hardware accelerator in response to the memory access request indicating that an address translation fault arose due to the memory access request. At step 3904, in response to receiving the address translation fault response, the given hardware accelerator sets the FSAR0 register and the EFSR register to identify the address translation fault as described in steps 3616 and 3618 of FIG. 36. The accelerator returns a STATUS response to the CPU 4 at step 3905 of FIG. 39, which causes the STATUS register corresponding to the hardware accelerator which issued the faulting memory access request to be set so that STATUS_FAULT=1 to indicate the address translation fault to the software.

In response to a further accelerator-triggered memory access request, a further address translation fault is identified, reported to the hardware accelerator, and used to update the EFSR and FSAR1 registers in steps 3906 and 3908. The STATUS response does not need to be sent again because the response sent at step 3905 already has indicated to the CPU that at least one fault is pending.

At step 3910, the poll of the STATUS register by the software returns STATUS_FAULT=1 indicating that an address translation fault has been encountered. This makes the software aware of the address translation fault associated with the given hardware accelerator. The software can then make a decision about how to handle the fault.

At step 3912, the application software decides to call the kernel driver to handle the outstanding address translation faults associated with the hardware accelerator. Processing on the processing circuitry 6 therefore switches context from the user code to kernel code.

At step 3914 the kernel requests a REGREAD operation to read the EFSR register of the given hardware accelerator, to identify which FSAR registers identify faults to be handled. The REGREAD operation is requested by the kernel writing to the LAUNCH register identifying the target hardware accelerator, the REGREAD operation, and the target accelerator register to be read (EFSR).

At step 3916 the accelerator control interface circuitry 14 performs a register read operation by issuing a REGREAD transaction to the target hardware accelerator and receiving in response an OK transaction including as payload data the value of the EFSR register.

At step 3918 the kernel code polls the LRESP register to determine whether the REGREAD operation was successful. The kernel reads the LRESP_CODE field indicating LRESP_OK, indicating that the register read operation completed successfully and therefore that the DATA registers contain the requested register information. Therefore, the kernel code reads the DATA registers (in particular, DATA[0] in this example) to read the value of the EFSR register of the target hardware accelerator.

The EFSR register indicates that FSAR0 and FSAR1 indicate valid fault status information, and hence at step 3920 the kernel requests a REGREAD operation to read FSAR0 and FSAR1 registers of the given hardware accelerator. As the FSAR0 and FSAR1 registers are consecutive in the example of FIG. 39, they may be read in a single transaction. If they were not consecutive or the number of accelerator registers to be read exceeds the maximum number of registers that can be read in a single transaction (e.g. 8 in the example discussed above having 8 DATA registers), multiple REGREAD transactions may be performed. The read of FSAR0 and FSAR1 proceeds in the same way as the read of the EFSR register, and following the register read operation DATA[0] and DATA[1] include the data stored in FSAR0 and FSAR1 respectively. The kernel now has access to information identifying the address translation faults, including the page addresses of the pages comprising the faulting addresses.

The kernel therefore calls the kernel fault handler at step 3922 to handle the address translation faults, and once the faults have been resolved writes a 32-bit bitmask to DATA [0] identifying that faults associated with FSAR0 and FSAR1 have been resolved. For example, the bitmask may have the first bit (corresponding to FSAR0) and the second bit (FSAR1) set to 1 and the remaining bits (corresponding to FSAR2:31) set to 0.

At step 3924 the kernel writes to the LAUNCH register to request a RESOLVE operation be carried out. In response, the accelerator control interface 14 issues, at step 3926, a RESOLVE transaction to the target hardware accelerator 22, conveying as payload the resolve bitmask obtained from DATA[0]. The target hardware accelerator then carries out the process illustrated in FIG. 38, and because there are no unresolved faults remaining issues a STATUS transaction to the CPU 4 requesting that the STATUS_FAULT field is cleared, as well as an OK transaction to indicate successful completion of the resolve operation.

At step 3928 the kernel polls LRESP and determines that the RESOLVE operation was completed. The kernel therefore returns processing to user code to continue processing.

At step 3930 the hardware accelerator, having been notified that the address translation faults have been resolved, retries the memory access requests which previously faulted.

Figure 40:
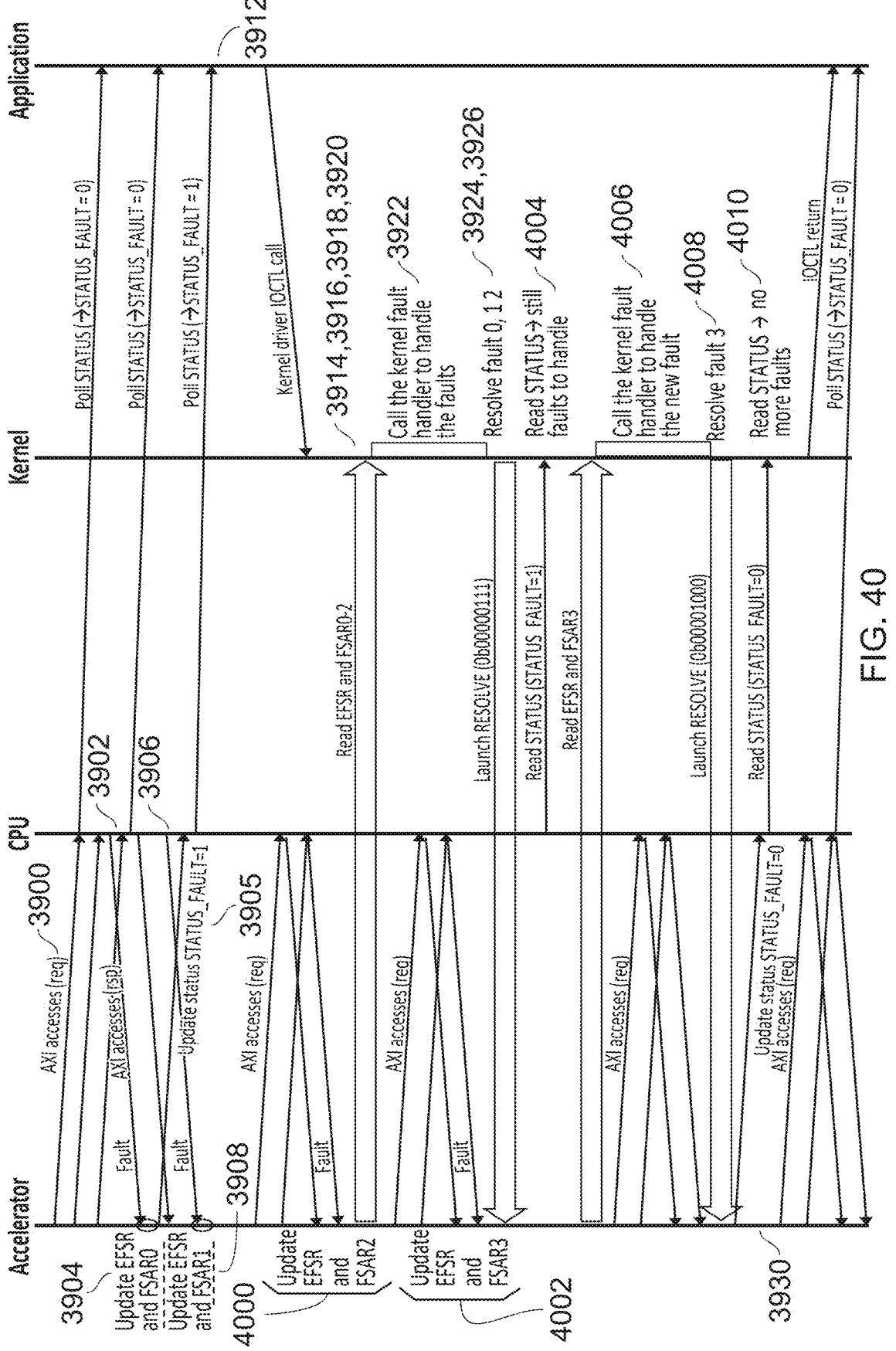

FIG. 40 is a ladder diagram illustrating another example of a process of identifying and resolving address translation faults raised during handling of accelerator-triggered memory access requests. Steps which are commonly labelled between FIGS. 39 and 40 are the same, and therefore the description of these steps will not be repeated in detail.

FIG. 40 illustrates that the hardware accelerator 22 continues processing whilst its address translation faults are being handled. Therefore, further address translation faults may arise during the handling of earlier address translation faults.

At step 4000 an address translation fault is identified and recorded in FSAR2 after the software has called the kernel driver, but before the REGREAD transaction is issued to the hardware accelerator. Therefore, FSAR2 is identified by the read value of EFSR and hence the kernel fault handler handles the fault associated with FSAR2 at step 3922.

At step 4002 an address translation fault is identified and recorded in FSAR3. The fault recorded in FSAR3 is recorded after EFSR and FSAR0:2 have been read, and therefore the address translation fault recorded in FSAR3 is not handled at step 3922, and is not resolved in the RESOLVE operation of steps 3924 and 3926. The RESOLVE operation clears FSAR0 to FSAR2 and EFSR_FSARV bits 0:2, but leaves FSAR3 set and hence a STATUS update is not issued by the hardware accelerator (step 3814 of FIG. 38 is not carried out).

At step 4004, after issuing the RESOLVE operation and before returning to the user code, the kernel code reads the STATUS register corresponding to the target hardware accelerator. This read indicates that the STATUS_FAULT field is still set to indicate a pending translation fault. Therefore, the kernel code requests a further register read operation to read EFSR, and this read indicates that FSAR3 is set. The kernel code therefore requests a register read operation to read FSAR3 from the hardware accelerator and, using the returned data, at step 4006 handles the address translation fault identified in FSAR3. At step 4008, the kernel requests a resolve operation to indicate to the given hardware accelerator that the fault indicated in FSAR3 has been resolved.

This causes EFSR to be completely cleared, and hence the hardware accelerator issues a STATUS transaction requesting that the STATUS_FAULT field of the corresponding STATUS register is cleared.

At step 4010, the kernel code reads the STATUS register and determines that there are no outstanding address translation faults, and hence returns processing to the application code. The hardware accelerator reattempts the previously faulting memory access requests at step 3930.

As described above with reference to FIG. 12, the hardware accelerator 22 may use memory access request circuitry 1204 to issue an accelerator-triggered memory access request requesting access to a memory system. However, if the hardware accelerator 22 is operating in an address translation context that may be a different address translation context to a current address translation context of the processing circuitry. Hence, in the following examples, an MMU is provided that is capable of maintaining and operating in multiple active address translation contexts simultaneously.

Figure 41:
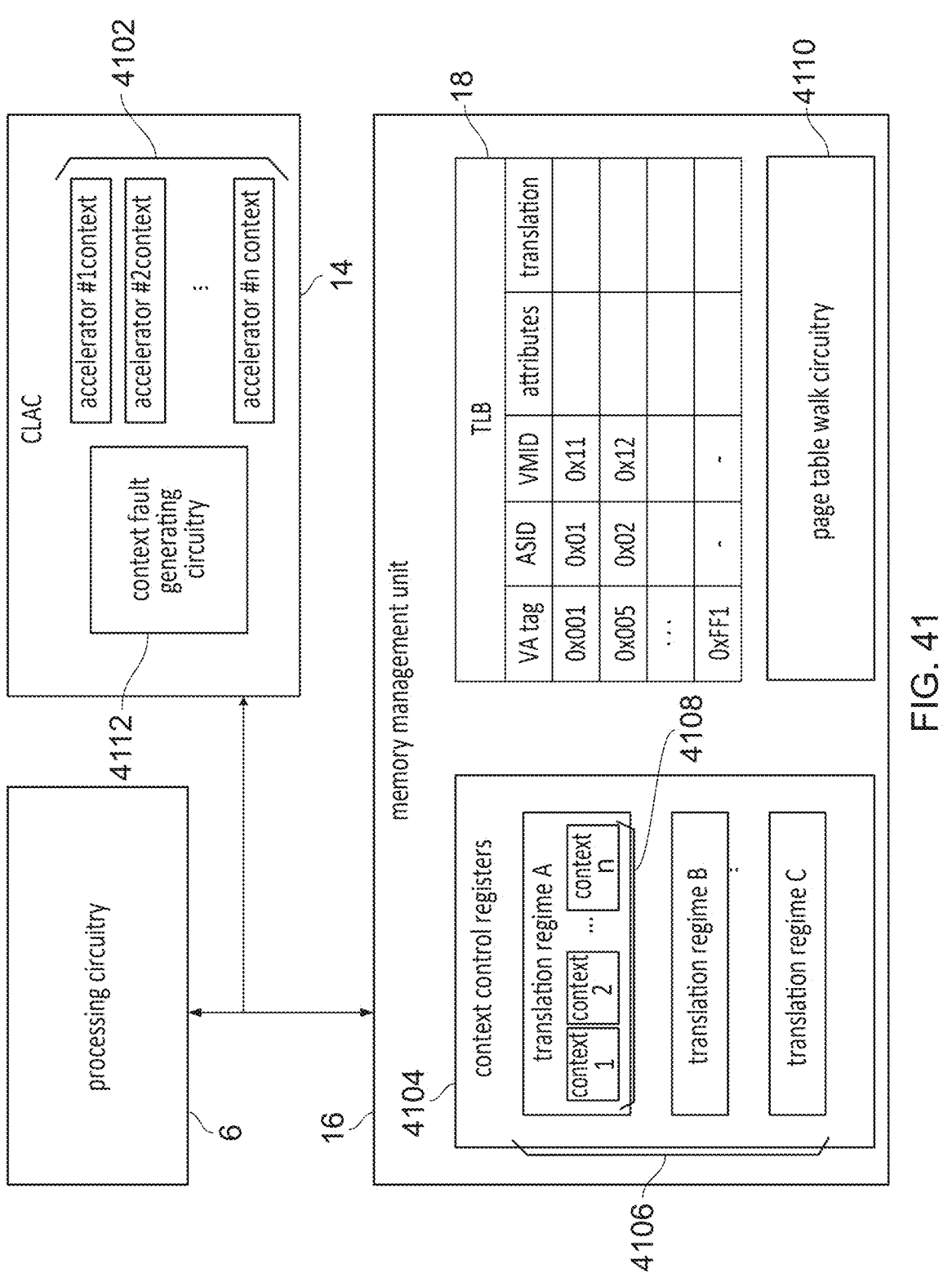
FIG. 41 schematically illustrates a data processing apparatus illustrating an MMU and accelerator control interface.

FIG. 41 schematically illustrates a data processing apparatus comprising the processing circuitry 6 such as that described in previous examples. The hardware accelerator control interface 14 comprises a plurality of accelerator context registers 4102, each corresponding to a hardware accelerator 22 that is accessible by the CPU 4. In each accelerator context register 4102, the hardware accelerator control interface 14 stores an indication of the address translation context of the processing circuitry 6 at the time of execution of an instruction which caused launch of an accelerator command for the corresponding hardware accelerator 22, which would thereby indicate the address translation context of any accelerator-triggered memory access requests from that hardware accelerator 22.

As described previously, the MMU 16 of the CPU 4 is configured to support address translation for one or more hardware accelerators. In this example, the MMU 16 comprises context control registers 4104 where information about one or more supported address translation regimes 4106 is stored. For the purposes of explanation, this example will only focus on translation regime A, but it will be appreciated that the same techniques can be applied to further translation regimes B and C. It will be appreciated that, while the MMU 16 may support definition of control state for multiple translation regimes A, B, C, at any given time the CPU 6 is in a particular operating state requiring use of a particular one of the translation regimes A, B, C, so only one translation regime's context(s) are active at a given time (control registers of the processing circuitry 6 or the MMU's internal control registers 4104 may define operating state information which restricts which translation regime is active).

The MMU 16 maintains a plurality of active translation contexts within translation regime A, by storing context information in a corresponding set of context control registers 4108. The number of active translation contexts may vary depending on a particular implementation, but it would be appreciated that maintaining more active translation contexts may result in more circuit area being required.

The accelerator control interface 14 is provided with context fault generating circuitry 4112 to manage which accelerator-triggered memory access requests are to be translated by the MMU 16. When an accelerator-triggered memory access request is received at the accelerator control interface 14, the context fault generating circuitry 4112 verifies the translation context associated with the accelerator-triggered memory access, e.g. based on information in one of the accelerator context registers 4102. The context fault generating circuitry 4112 may then compare the translation context associated with the accelerator-triggered memory access to each of the plurality of active translation contexts 4108 maintained by the MMU 16 to determine if any of the active contexts match so that the MMU 16 can proceed with address translation. In the event of a mismatch, the context fault generating circuitry returns a context fault indication to the hardware accelerator 22 that had triggered the memory access request. Similar to in previously described examples where the hardware accelerator 22 encounters an address translation fault, the hardware accelerator may update the EFSR and FSARn registers which, when polled, returns STATUS_FAULT=1 indicating that a fault has occurred. The fault can then be handled and resolved. Faults caused by an access to an inactive context are distinguished from other causes of address translation fault by the FSAR_NOCTX field of the FSARn registers as shown in FIG. 16.

In some examples, the context information for defining one of the plurality of active contexts is any information that enables the MMU 16 to obtain page table entries from memory and enables the MMU 16 to identify whether the context of a given accelerator-triggered memory access matches one of the active contexts. In particular, obtaining page table entries from memory may require performing a page table walk using page table walk circuitry 4110. For identifying which context is the active context, some examples of such context information includes any one or more of an address space identifier (ASID), a virtual machine identifier (VMID), a privilege level, a security state, an indication of a current translation regime. For enabling page table walks to be performed for an active context, the context information for the active context may include a base address of a page table stored in the memory system, and could also include other page table structure defining information used by the MMU 16 to identify addresses from which page table entries are to be obtained from memory (e.g. information defining page sizes, the maximum number of levels of the page table structure, and/or other information for identifying which portions of an input address are to be used to index into a page table at a given level of the page table structure).

It will be appreciated that, since page table entries that are stored in the TLB 18 can be obtained by the MMU 16 without involving any access to memory, some of the TLB entries may not be associated with an active translation context, e.g. they are instead associated with an inactive translation context. In particular, while a previously obtained page table entry may still be retained in the TLB 18, the context information defining that context may no longer be maintained in the context control registers 4108. For example, context 1 of the context control registers 4108 may be associated with a combination of ASID=0x01 and VMID=0x11, e.g. in the first entry of the TLB 18. An accelerator-triggered memory access request associated with the combination of ASID=0x01 and VMID=0x11 and specifying the virtual address tag 0x001 may be validly translated by the MMU 16 to carry out the memory access request. On the other hand, say second entry of the TLB 18 associated with the combination of ASID=0x02 and VMID=0x12 has been retained despite the associated context information being removed from the context control registers 4108, e.g. as part of a context switch. An accelerator-triggered memory access request associated with the combination of ASID=0x02 and VMID=0x12 would cause a context fault to be generated by the context fault generating circuitry 4112 and the address translation would not be performed (even though the TLB currently includes a corresponding entry— that entry may subsequently be expected to be removed through natural cache replacement in the TLB as further TLB entries are allocated). Accordingly, it will be appreciated that a translation in a given translation context being available in the TLB 18 does not necessarily mean that given translation context is an active translation context.

Figure 42:
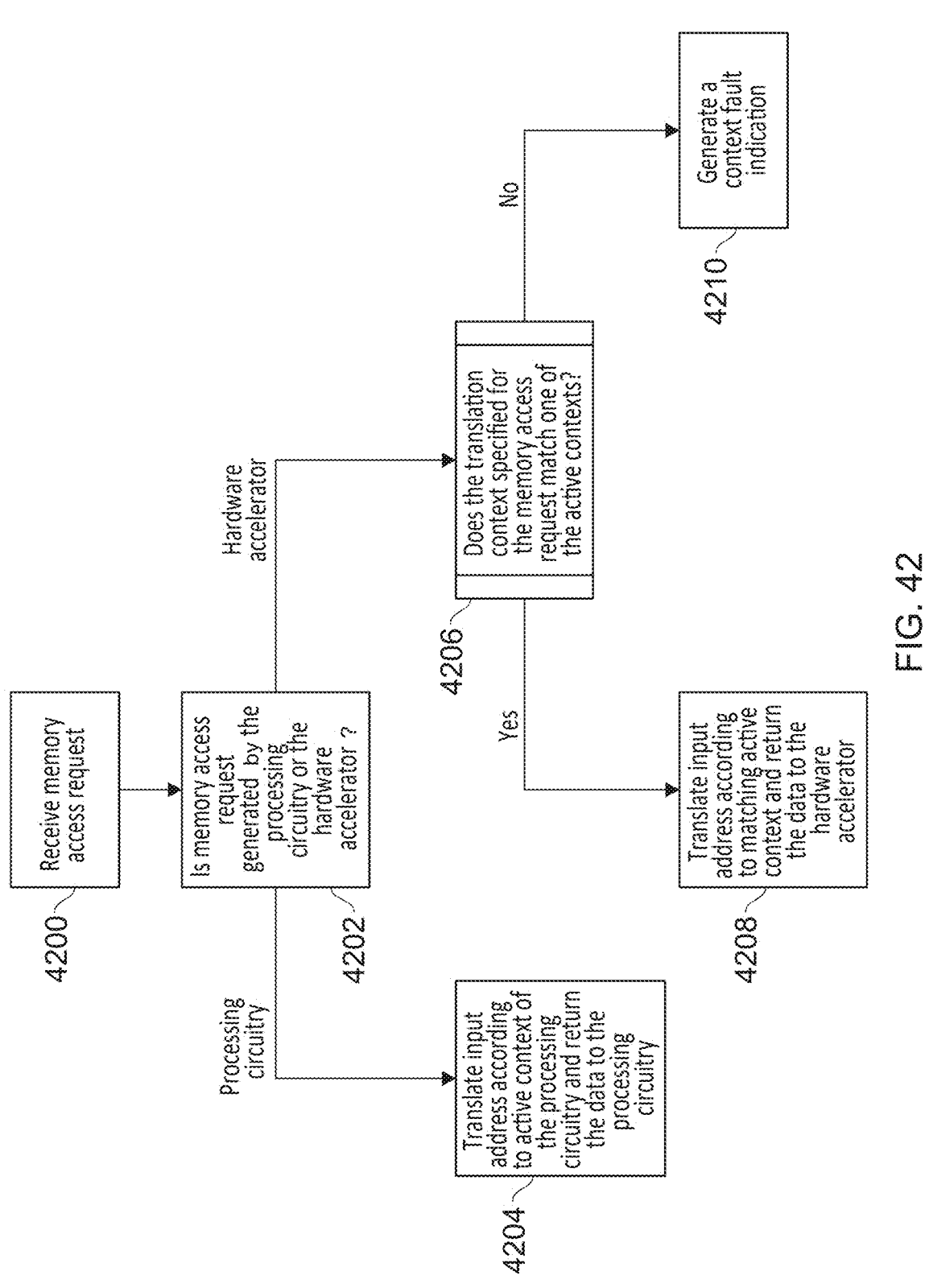
FIG. 42 is a flow diagram illustrating a process for managing memory access requests when an MMU maintains a plurality of active translation contexts.

FIG. 42 is a flow diagram illustrating an example process for managing memory access requests when the MMU 16 maintains a plurality of active translation contexts. At step 4200, a memory access request is received and it is subsequently determined whether the memory access request was generated by the processing circuitry 6 or by the hardware accelerator 22 at step 4202. Since the active translation contexts maintained by the MMU 16 are under the control of the processing circuitry 6, e.g. due to context switch operations performed by the processing circuitry 6, it is expected that the translation context of the processing circuitry 6 would be one of the active translation contexts maintained by the MMU 16. Therefore, if the memory access request is generated by the processing circuitry 6, the input address is translated according to the active translation context of the processing circuitry at step 4204.

If the memory access request is an accelerator-triggered memory access request, then at step 4206, it is determined whether the context specified for the memory access request matches one of the active translation contexts. This determination is described in more detail with reference to FIG. 43.

If the translation context specified by the accelerator-triggered memory access request matches one of the active translation contexts, then at step 4208 the input address is translated according to the matching active translation context and the translation is returned to the hardware accelerator. If the translation context does not match one of the active translation contexts, then a context fault indication is generated at step 4210.

Figure 43:
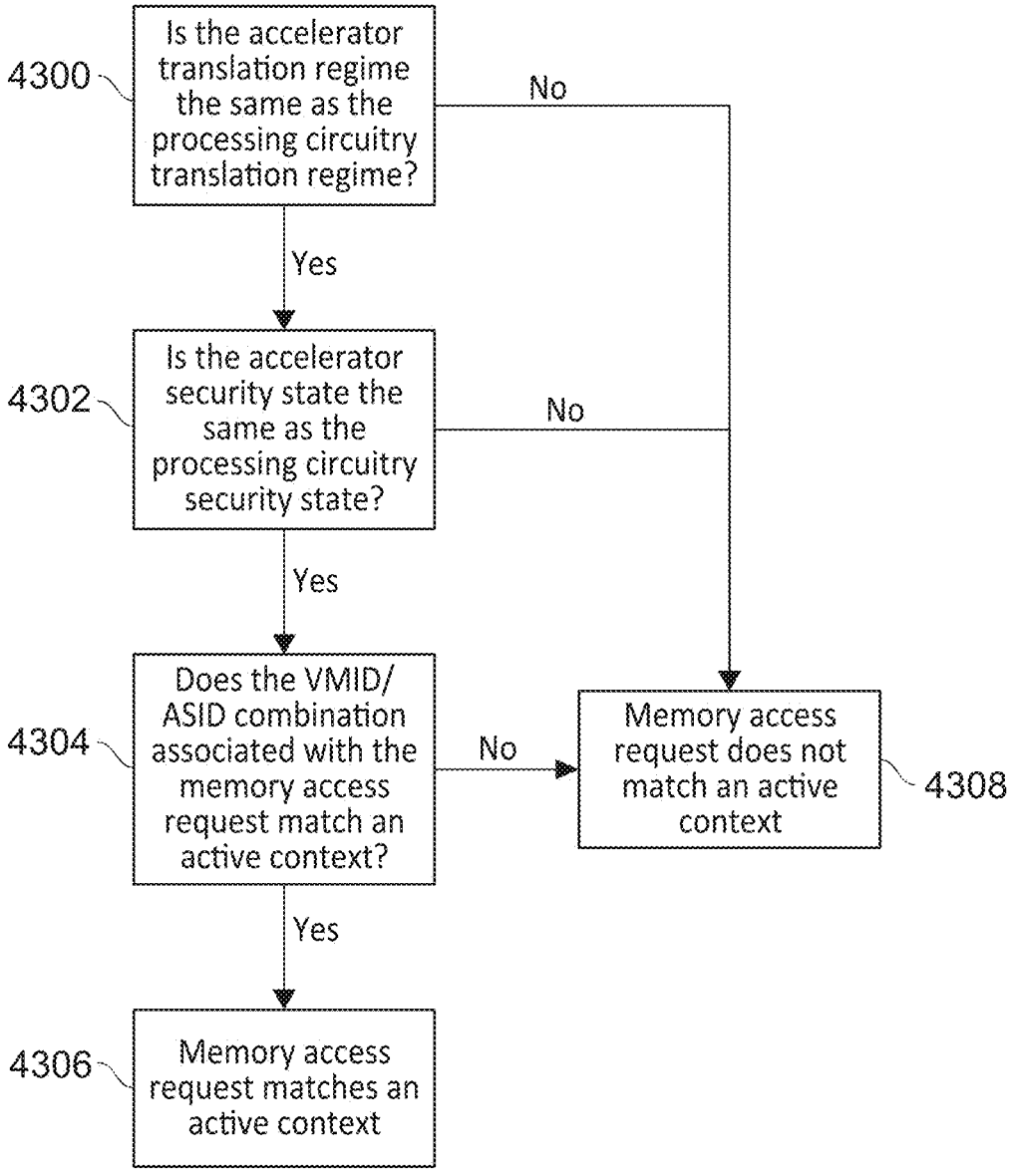
FIG. 43 is a flow diagram illustrating a process for determining whether an address translation context specified by an accelerator-triggered memory access request matches an active translation context.

FIG. 43 is a flow diagram illustrating an example process for determining whether an address translation context specified by an accelerator-triggered memory access request matches an active translation context such that the MMU 16 is capable of translating the input address for an accelerator-triggered memory access request. At step 4300, it is determined whether the translation regime of the hardware accelerator 22 is the same as the translation regime of the processing circuitry 6. For example, the translation regime of the processing circuitry 6 may be defined by the current operating state of the processing circuitry 6 (e.g. based on exception level of the processing circuitry 6) as well as depending on other control state information (e.g. information for distinguishing different virtualisation mechanisms which may be associated with different techniques for controlling address translation). The translation regime of the accelerator may depend on information captured in the accelerator context register 4102 corresponding to that accelerator at the time of the command launch that caused the accelerator-triggered memory access request to subsequently be issued (e.g. see capture of the context defining information at step 2110 of FIG. 21 described earlier). Different translation regimes may be associated with different numbers of stages of address translation, e.g. from virtual address to physical address with or without an intermediate physical address translation between.

In some examples, the MMU 16 may require that the processor-generated memory access requests and the accelerator-triggered memory access requests are of the same translation regime.

At step 4302, it is determined whether the security state of the hardware accelerator 22 is the same as that of the processing circuitry 6. Translations performed in different security states may generally be associated with different translation contexts, so it is undesirable to allow an accelerator configured in one security state to access memory based on a translation context associated with a different security state.

At step 4304, it is determined whether the VMID (virtual machine identifier) and/or ASID (address space identifier) combination associated with the accelerator-triggered memory access request is the same as any one of the active translation contexts, as defined by the context information 4108 stored in the corresponding set of context control registers 4104. The ASID may be an identifier used to distinguish different stage-1 translation table structures (managed by an operating system) that are used for different application-level threads managed by that operating system. The VMID may be an identifier used to distinguish different stage-2 translation table structures (managed by a hypervisor) associated with different guest operating systems managed by the hypervisor in a virtualised system.

If the answer to any of the above steps 4300, 4302, 4304 is "no", then it is determined that the accelerator-triggered memory access request does not match an active context. Accordingly, the MMU 16 does not translate the input address and the context fault generating circuitry 4112 generates a context fault. Otherwise, if the answer to all of the above steps is "yes", then it is determined that the accelerator does match one of the active contexts maintained by the MMU 16. Accordingly, the MMU 16 will be able to attempt to locate page table information corresponding to the target virtual address of the accelerator-triggered memory access request, and provided no other cause of address translation fault occurs (such as violation of access permissions or no valid page table entry being available in the relevant active context corresponding to the target virtual address), the memory access can be performed.

Figure 44:
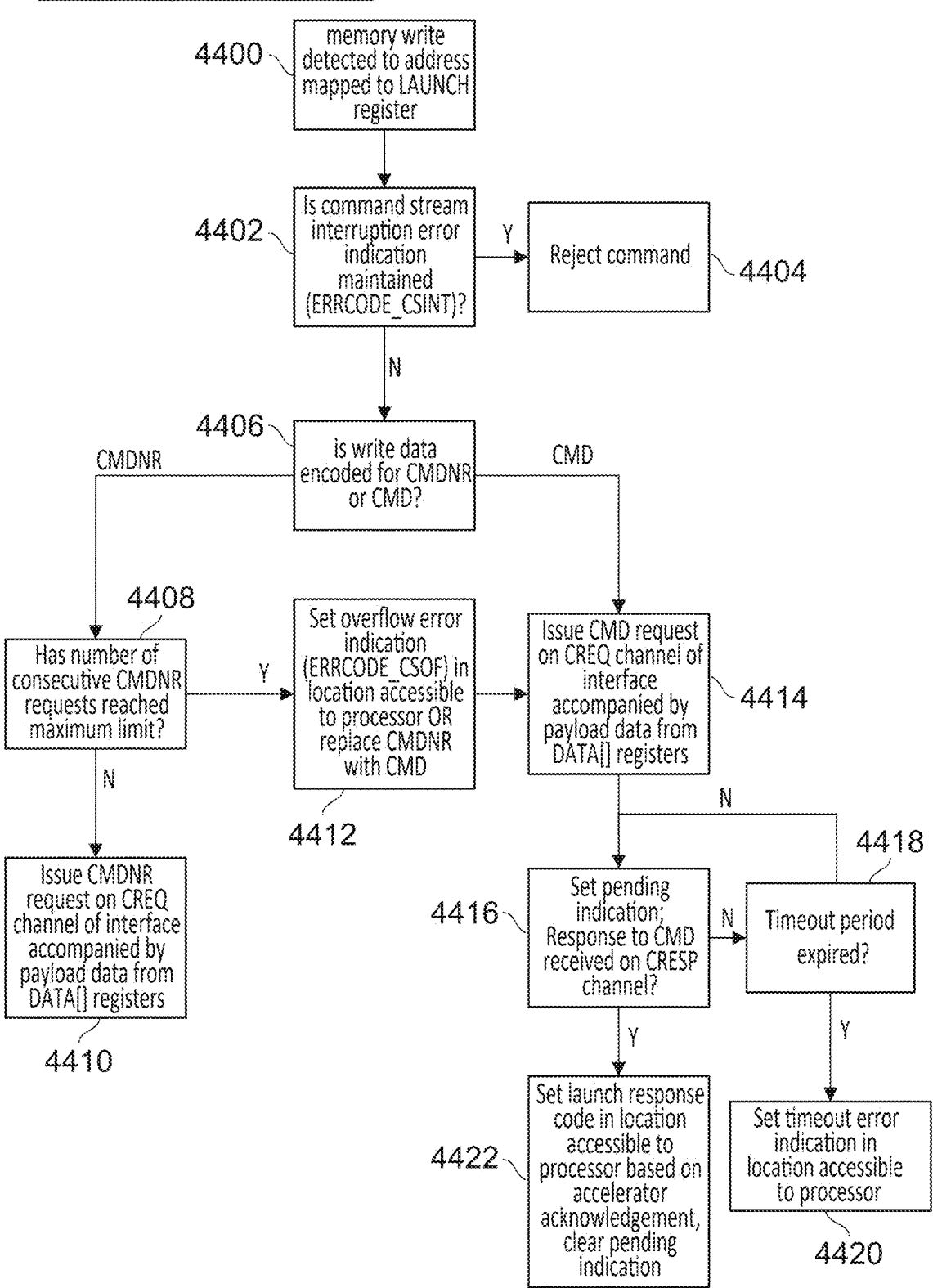
FIG. 44 is a flow diagram illustrating an example process for launching compound commands made up of a plurality of commands.

FIG. 44 is a flow diagram illustrating an example process for launching compound commands made up of a plurality of commands. As shown earlier in FIG. 20L, a compound command may be implemented by launching one or more CMDNR commands to start a stream of commands that are not individually acknowledged by the hardware accelerator 22. The stream can then be terminated with a CMD command to complete the compound command, which is then acknowledged by the hardware accelerator 22. At step 4400, the CPU 4 detects a memory access writing data to an address mapped to the LAUNCH register. At step 4402, the accelerator control interface 14 determines whether there is an outstanding interruption error, for example, by reading whether the LRESP_ERRCODE field in the LRESP register 404 is indicative of ERRCODE_CSINT. If so, then it can be determined that a previously attempted stream of commands was interrupted due to the hardware accelerator 22 becoming unavailable before the stream had been terminated and acknowledged. Since the error has not been resolved, the accelerator control interface 14 rejects the command at step 4404 by ignoring the write data.

If there is no interruption error indicated, then at step 4406, it is determined whether the data being written to the LAUNCH register is encoded to request that the CPU 4 issues a CMDNR or a CMD. A compound command is begun by launching a CMDNR, with an indication that the CMDNR is the first command of a stream, e.g. by setting the seq field to zero. Subsequent CMDNR commands in the same stream may then follow with seq=1. In response to determining that the current command is a CMDNR, the accelerator control interface 14 determines whether a number of consecutive CMDNR requests have reached a maximum limit at step 4408. The maximum limit may be constrained by the interface architecture, to prescribe a maximum limit on the size of buffers that the hardware accelerator 22 have to reserve for command data to be queued or buffered in relation to the same command stream. For example, the maximum limit may require that a CMD command is issued at least every 8 commands, e.g. a compound command contains a maximum of 7 consecutive CMDNR commands and a CMD command. If the accelerator control interface 14 determines that the maximum limit has not been reached, then at step 4410, the CMDNR command can be issued to the hardware accelerator on the CREQ control interface channel. Similar to previous examples of launching commands, the request is accompanied by payload data stored into the DATA[ ] registers, which may have been written to by software in advance of the writing to the LAUNCH register at step 4400. Since the command is a CMDNR, the command launch process ends at step 4410 until a new memory write is detected to the LAUNCH register. In particular, the CMDNR indicates that the hardware accelerator 22 is not required to provide a response to acknowledge the command. Therefore, there is no need to wait for a response on the CRSP channel, such as that described in the example of FIG. 21, and there is no need for software to poll the LRESP register corresponding to each CMDNR command.

Returning to step 4408, if the maximum limit of consecutive CMDNRs has been exceeded, then at step 4412, the accelerator control interface 14 may indicate an overflow error by setting the LRESP register 404 to indicate ERR-CODE_CSOF in the LRESP_ERRCODE field and command streaming is halted. Alternatively, the accelerator control interface 14 may take a more proactive approach by replacing the most recent CMDNR command with a CMD command. In this way, command streaming can continue while still enforcing the maximum limit of consecutive CMDNR commands.

When the write data is determined to be encoded for a CMD at step 4406 (or in examples where a CMDNR is replaced with a CMD at step 4412), the CMD request is issued on the CREQ control interface channel with the payload data from the DATA[ ] registers at step 4414. To indicate that the CMD is terminating a compound command, the write data can include an indication that the CMD is associated with one or more preceding CMDNR commands, e.g. by setting the seq field to 1 (this distinguishes the CMD command that is part of a compound command sequence from standalone CMD commands (with seq field set to 0) that are not associated with any related CMDNR commands). The remaining steps taken after issuing a CMD transaction may be similar to that in previous examples. In particular, at step 4416, after the CMD transaction has been issued by the CPU 4 and before a launch response has been received from the hardware accelerator 22, the LRESP register 404 is set to indicate that a response is pending. For example the bit LRESP[0] providing the LRESP_PENDING field may be set to indicate a pending response. This is in contrast to the CMDNR, in which a response is not required from the hardware accelerator 22, and hence no indication of a pending response is set. In the pending state, writes to the LAUNCH register may be ignored and raise an error. The CPU 4 determines whether a response to the CMD transaction has been received on the CRSP channel. If no response has been received after a certain timeout period has expired (step 4418), then at step 4420 a timeout error is set in a software accessible location to indicate the lack of response to the software. For example, the LRESP register 404 may be set such that the LRESP_CODE field indicates LRESP_ERROR, and LRESP_ERRCODE indicates ERR-CODE_TIMEOUT.

If a response is received to the CMD request, then at step 4422 the LRESP register 404 is updated accordingly. The LRESP_CODE field is set based on the response type of the response packet (to one of OK, BUSY, and ERROR), the LRESP_PENDING flag is cleared, and if the response is ERROR then the LRESP_ERRCODE field is set to indicate the cause of the error. An ERROR response to the CMD may not necessarily be due to an ERROR in the CMD request, but instead due to an ERROR in one of the preceding CMDNR requests in the compound command. If the response is an OK response then this indicates that the compound command (including the preceding CMDNR requests) has successfully started, and the progress of the compound command can be monitored by the software by polling the STATUS register corresponding to the target hardware accelerator (which will be updated based on STATUS transactions communicated from the hardware accelerator 22 to the CPU 4 on the CRSP channel).

Figure 45:
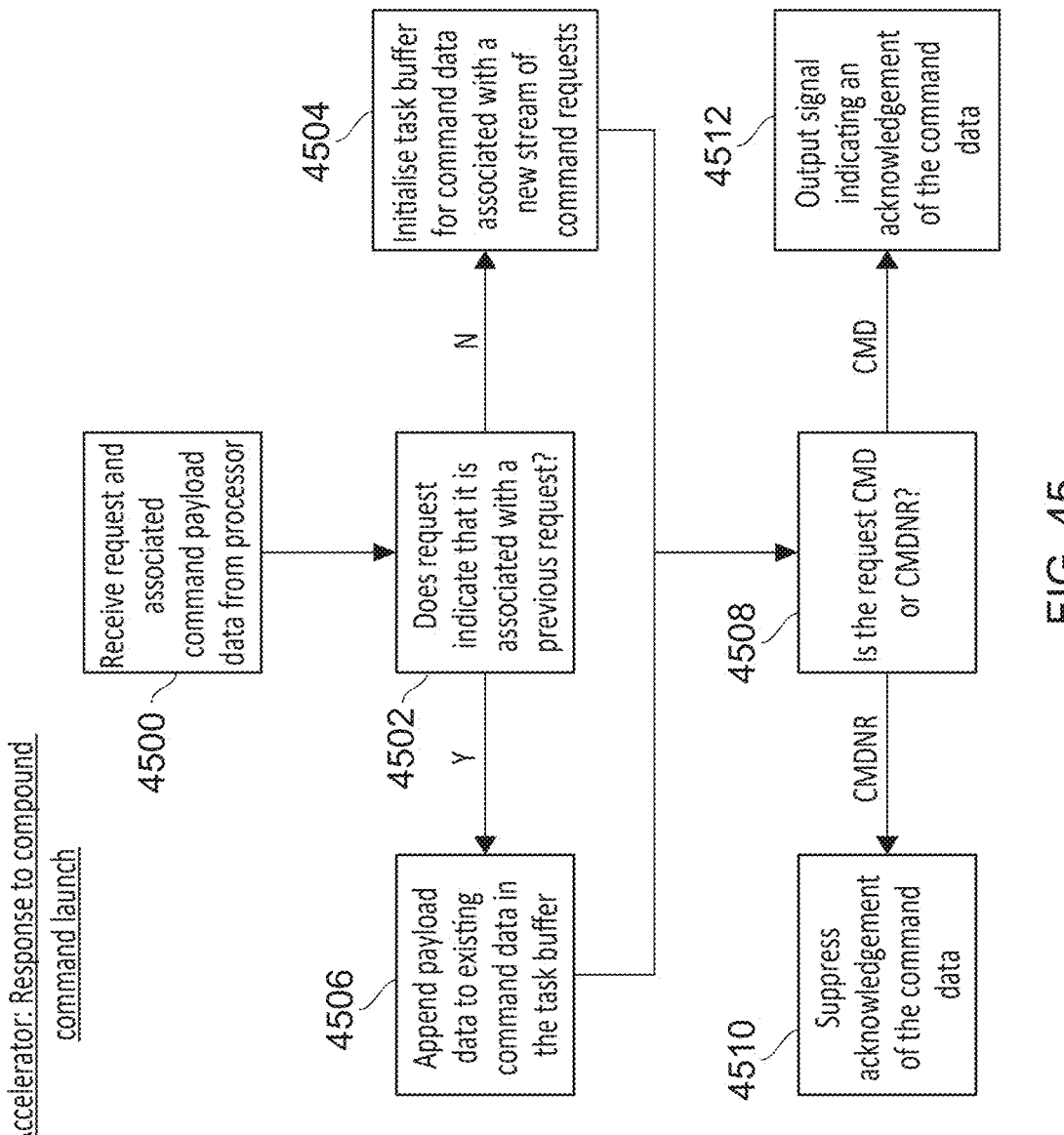
FIG. 45 is a flow diagram illustrating steps taken by a hardware accelerator in response to a compound command communicated from a CPU.

FIG. 45 is a flow diagram illustrating steps taken by a hardware accelerator 22 in response to a compound command communicated from a CPU 4. At step 4500 the hardware accelerator 22 receives the request, i.e. CMD or CMDNR over the CREQ channel from the CPU 4. Regardless of which type of request is received, the request will comprise a command header and payload data.

At step 4502, it is determined whether the request is associated with a previous request. In other words, it is determined whether the request a continuation of a stream of commands or the beginning of a new stream. The request may contain a field (e.g. the seq field) indicative of whether it is a first request of a stream. If the request is the beginning of a new stream of commands, the hardware accelerator 22 initialises the buffers 1210 for storing command data associated with the new stream of command requests at step 4504. Alternatively, if the request is associated with an ongoing stream of commands, then the buffers 1210 will have already been initialised for this stream. Accordingly, the payload data can be appended to existing command data received from previous requests in the buffers 1210 at step 4506.

After handling the command data, the hardware accelerator 22 determines whether the command is a CMD request or a CMDNR request at step 4508. If the request is a CMDNR, then no acknowledgement is required. Therefore, to save power and bandwidth on the interface channels, the hardware accelerator 22 suppresses any acknowledgement of the command data at step 4510. If the request is a CMD, then an acknowledgement is required. Accordingly, the hardware accelerator 22 determines and returns an appropriate response at step 4512, for example following the process described in FIG. 22 (e.g. to indicate a response of OK, BUSY, or ERROR). It will be appreciated, however, that for compound commands, the response may also serve as an acknowledgement of the CMDNR requests, despite the response only being returned in response to the CMD request. For example, an error condition may be potentially detected at step 2202 for either the CMD or any preceding CMDNR requests. Accordingly, an ERROR response, although provided in response to the CMD, may instead relate to the command data associated with a preceding CMDNR.

One error that is possible during the issuance of compound commands is that the hardware accelerator 22 is available when one or more CMDNR requests of a stream is received, but then becomes unavailable before the stream is terminated by a CMD request. FIG. 46 is a flow diagram illustrating steps taken by the CPU 4 for detecting an error during launch of a compound command. At step 4600, the CPU 4 monitors the availability of the hardware accelerator 22, for example based on the STATUS_AVAIL field of the STATUS register corresponding to that hardware accelerator 22 (which itself is set based on the availability controls in the PLxCTRL registers managed by software associated with different protection levels as described above).

If the hardware accelerator 22 becomes unavailable, then at step 4602, it is determined whether the CPU 4 had issued one or more preceding CMDNR requests have been not yet been terminated by a CMD request. If not, then it can be determined that a compound command had not been in progress, and hence a stream of commands has not been interrupted. At step 4604, the CPU 4 continues without setting an indication of an interruption error. The unavailability indication may then be handled as described in previous examples.

If it is determined that an uncompleted stream of CMDNR requests have been output without yet being terminated by a CMD request, then it is determined that a compound command has been interrupted. Therefore, at step 4606, the CPU 4 sets an indication of an interruption error, e.g. by setting the LRESP_ERRCODE field in the LRESP register 404 to indicate ERRCODE_CSINT. The interruption error may be maintained in the accelerator control interface 14 so that, as described in relation to FIG. 44, future attempts to launch commands are ignored.

Concepts described herein may be embodied in a system comprising at least one packaged chip. The apparatus and/or hardware accelerator described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 47:
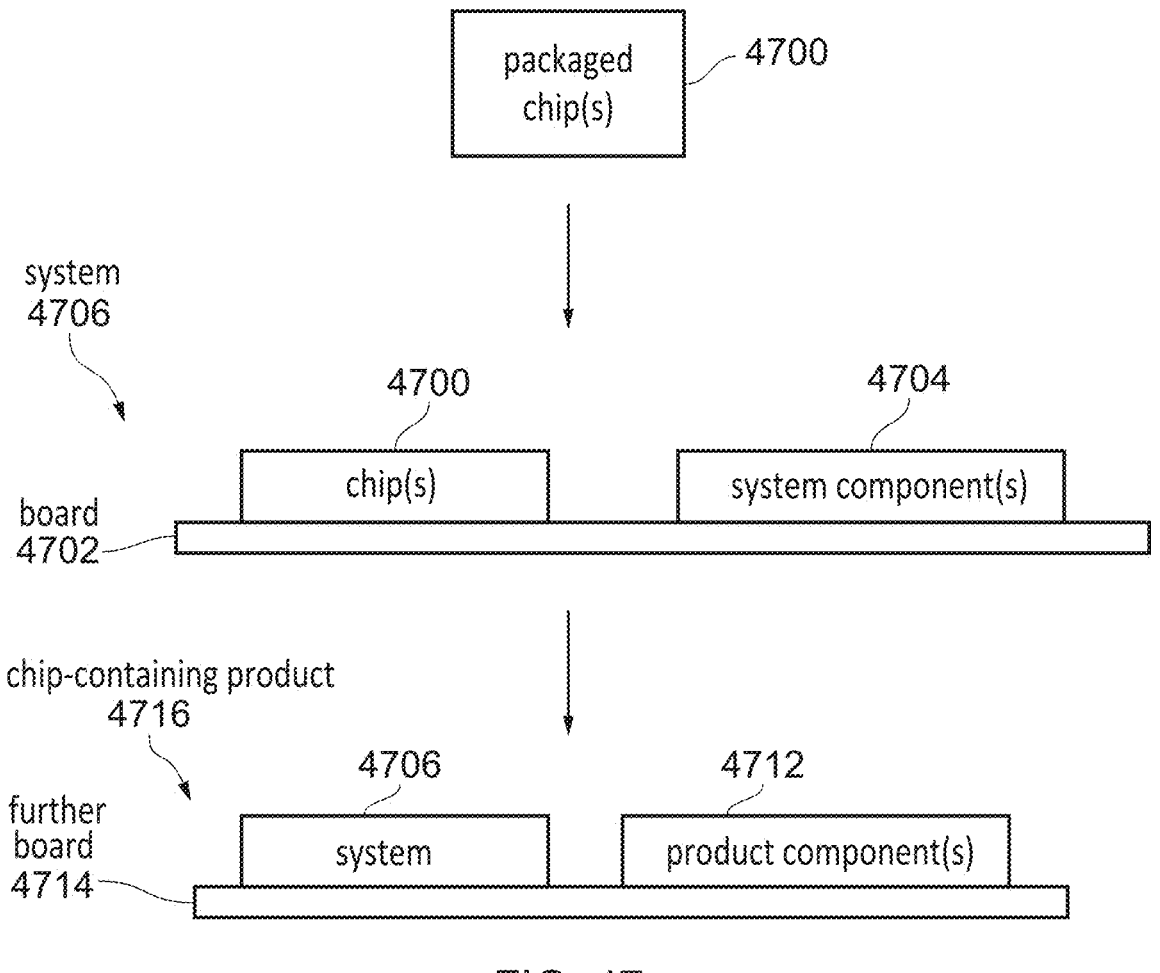
FIG. 47 illustrates a system and a chip-containing product.

As shown in FIG. 47, one or more packaged chips 4700, with the apparatus and/or hardware accelerator described above implemented on one chip or distributed over two or more of the chips, are manufactured by a semiconductor chip manufacturer. In some examples, the chip product 4700 made by the semiconductor chip manufacturer may be provided as a semiconductor package which comprises a protective casing (e.g. made of metal, plastic, glass or ceramic) containing the semiconductor devices implementing the apparatus and/or hardware accelerator described above and connectors, such as lands, balls or pins, for connecting the semiconductor devices to an external environment. Where more than one chip 4700 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips which, when combined, provide the functionality of a chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 4700 are assembled on a board 4702 together with at least one system component 4704 to provide a system 4706. For example, the board may comprise a printed circuit board. The board substrate may be made of any of a variety of materials, e.g. plastic, glass, ceramic, or a flexible substrate material such as paper, plastic or textile material. The at least one system component 4704 comprise one or more external components which are not part of the one or more packaged chip(s) 4700. For example, the at least one system component 4704 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 4716 is manufactured comprising the system 4706 (including the board 4702, the one or more chips 4700 and the at least one system component 4704) and one or more product components 4712. The product components 4712 comprise one or more further components which are not part of the system 4706. As a non-exhaustive list of examples, the one or more product components 4712 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 4706 and one or more product components 4712 may be assembled on to a further board 4714.

The board 4702 or the further board 4714 may be provided on or within a device housing or other structural support (e.g. a frame or blade) to provide a product which can be handled by a user and/or is intended for operational use by a person or company.

The system 4706 or the chip-containing product 4716 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 48:
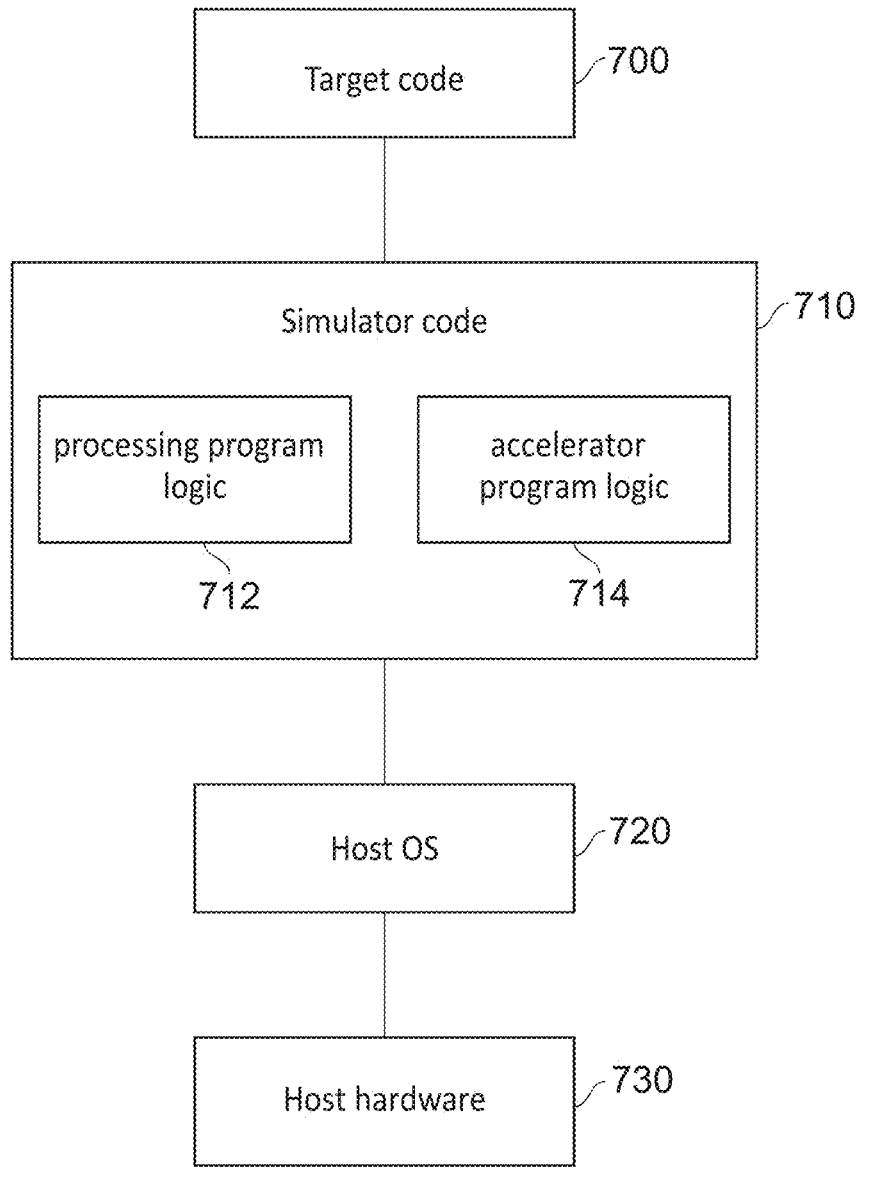
FIG. 48 illustrates a simulation example.

FIG. 48 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700 described above, may be executed from within the instruction execution environment using the simulator program 710, so that a host computer 730 which does not actually have the hardware features of the apparatus 2 discussed above can emulate these features.

The simulator program 710 may comprise processing program logic 712 configured to control the host data processing apparatus 730 to perform the operations of the CPU 4 (including operations corresponding to the interface circuitry 14), and accelerator program logic 714 configured to control the host data processing apparatus 730 to perform the operations of a hardware accelerator 22.

Various examples are set out in the following clauses:

1. A hardware accelerator comprising:
   accelerator processing circuitry to perform a delegated task on behalf of a processor;
   control interface circuitry to exchange control signals with the processor to configure the accelerator processing circuitry to perform the delegated task;
   fault status register storage to store fault status information, the fault status register storage being readable by the processor based on an accelerator register read request received from the processor via the control interface circuitry; and
   control circuitry to:
      detect a fault indication received from the processor via the control interface circuitry indicating that a faulting accelerator-triggered memory access request, issued via the control interface circuitry to the processor and specifying a target virtual address, has encountered an address translation fault; and
      in response to detecting the fault indication, set fault status information in the fault status register storage to indicate information about the faulting accelerator-triggered memory access request that encountered the address translation fault.

2. The hardware accelerator according to clause 1, in which the control circuitry is configured to issue a status update message via the control interface circuitry to the processor to request that the processor updates software-readable accelerator status information associated with the hardware accelerator to a value specified by the status update message;

the status update message supporting at least one encoding indicating that the software-readable accelerator status information associated with the hardware accelerator should be set to indicate to software executing on the processor that the hardware accelerator has encountered an address translation fault for at least one faulting accelerator-triggered memory access request.

3. The hardware accelerator according to any of clauses 1 and 2, in which, in response to receipt of a resolve request received from the processor indicating that a cause of at least one address translation fault has been resolved, the control circuitry is configured to invalidate at least one item of fault status information in the fault status register storage relating to the at least one address translation fault indicated as being resolved.

4. The hardware accelerator according to clause 3, in which the resolve request specifies a resolve parameter specifying which address translation faults have been resolved and the control circuitry is configured to select which items of fault status information to invalidate based on the resolve parameter of the resolve request.

5. The hardware accelerator according to any of clauses 3 and 4, in which, in response to receipt of the resolve request, the control circuitry is configured to:

determine whether there are any remaining address translation faults tracked in the fault status register storage which are still unresolved; and in response to determining that there are no remaining unresolved address translation faults tracked in the fault status register storage, issue a status update message via the control interface circuitry to the processor to request that the processor updates software-readable accelerator status information associated with the hardware accelerator to indicate that there are no longer any unresolved address translation faults associated with the hardware accelerator.

6. The hardware accelerator according to any preceding clause, in which the fault status register storage comprises:

a plurality of fault status registers each configurable to record fault status information about an address translation fault encountered for a corresponding page of virtual address space; and a fault status summary register to store fault status summary information specifying which of the plurality of fault status registers stores valid fault status information.

7. The hardware accelerator according to any preceding clause, in which the fault status register storage is configured to store fault status information associated with a given unresolved address translation fault, the fault status information comprising at least one of:

an indication of a virtual page address indicating a page of virtual address space comprising a target virtual address for which the unresolved address translation fault was encountered;

an indication of whether the unresolved address translation fault was caused by a read request or a write request; and an indication of whether the unresolved address translation fault was caused by an accelerator address translation context associated with the hardware accelerator being an inactive translation context not currently enabled by memory management circuitry of the processor.

8. The hardware accelerator according to any preceding clause, in which the control interface circuitry comprises at least one memory access request channel, each memory access request channel comprising:

an address path to issue a virtual address of an accelerator-triggered memory access request to the processing circuitry; and a response path to return a response message from the processing circuitry to the hardware accelerator in response to a corresponding accelerator-triggered memory access request for which the virtual address was issued over the address path;

and the fault indication comprises the response message signalled on the response path having an encoding indicating that the corresponding accelerator-triggered memory access request encountered an address translation fault.

9. The hardware accelerator according to any preceding clause, in which the hardware accelerator is private to the processor.

10. A processor comprising:

control interface circuitry to exchange control signals with at least one hardware accelerator configurable, based on instructions executed by processing circuitry, to perform a delegated task; and control circuitry to:

in response to an address translation fault being detected for an accelerator-triggered memory access request received via the control interface circuitry from a given hardware accelerator and specifying a target virtual address, issue a fault indication to the given hardware accelerator via the control interface circuitry; and in response to an accelerator register read instruction specifying the given hardware accelerator and indicating that at least a portion of fault status register storage of the given hardware accelerator is to be read in response to the accelerator register read instruction:

issue an accelerator register read request via the control interface circuitry to the given hardware accelerator requesting that the given hardware accelerator returns fault status information specified in said at least a portion of the fault status register storage of the given hardware accelerator; and store the fault status information returned by the given hardware accelerator in at least one software-readable storage location.

11. The processor according to clause 10, comprising accelerator status information storage circuitry to store software-readable accelerator status information corresponding to at least one hardware accelerator; in which:

the control circuitry is responsive to a status update message received from a given hardware accelerator via the control interface circuitry to update the software-readable accelerator status information associated with the given hardware accelerator to a value specified by the status update message; and in response to the status update message having at least one encoding indicating presence of an address translation fault, the control circuitry is configured to update the software-readable accelerator status information associated with the given hardware accelerator to indicate to software executing on the processor that the hardware accelerator has encountered an address translation fault for at least one faulting accelerator-triggered memory access request.

12. The processor according to clause 11, in which the status update message also supports at least one encoding indicating that software-readable accelerator status information should be updated to indicate that the software-readable accelerator status information is idle and has no uncompleted delegated tasks pending.

13. The processor according to any of clauses 10 to 12, in which:

in response to a resolve instruction identifying a given hardware accelerator, the control circuitry is configured to issue a resolve request to the given hardware accelerator via the control interface circuitry to indicate that a cause of at least one address translation fault has been resolved and that the given hardware accelerator can invalidate at least one item of fault status information in the fault status register storage.

14. The processor according to clause 13, in which the resolve instruction specifies a resolve parameter specifying which address translation faults have been resolved.

15. The processor according to any of clauses 13 and 14, in which the resolve instruction comprises a store instruction specifying store data and specifying a target address mapped to a memory-mapped launch control register, the store data having an encoding indicating that store instruction represents the resolve instruction.

16. The processor according to any of clauses 10 to 15, in which the accelerator register read instruction comprises a store instruction specifying store data and specifying a target address mapped to a memory-mapped launch control register, the store data having an encoding indicating that the store instruction represents the accelerator register read instruction.

17. The processor according to any of clauses 10 to 16, in which the at least one software-readable storage location comprises at least one memory-mapped register.

18. The processor according to any of clauses 10 to 17, in which in response to the address translation fault being detected for the accelerator-triggered memory access request, the control circuitry is configured to issue the fault indication to the given hardware accelerator while allowing the processing circuitry to continue uninterrupted execution of instructions.

19. The processor according to any of clauses 10 to 18, in which the fault status information read in response to the accelerator register read instruction indicates at least one of:

an indication of a virtual page address indicating a page of virtual address space comprising a target virtual address for which an unresolved address translation fault was encountered;

an indication of whether the unresolved address translation fault was caused by a read request or a write request;

an indication of whether the unresolved address translation fault was caused by an accelerator address translation context associated with the hardware accelerator not currently being enabled by memory management circuitry of the processor; and fault status summary information specifying which of a plurality of fault status registers of the given hardware accelerator specifies valid fault status information.

20. A system comprising the hardware accelerator of any of clauses 1 to 9 and the processor of any of clauses 10 to 19.

21. A system comprising:

the hardware accelerator of any of clauses 1 to 9, and/or the processor of any of clauses 10 to 19, implemented in at least one packaged chip;

at least one system component; and a board, wherein the at least one packaged chip and the at least one system component are assembled on the board.

22. A chip-containing product comprising the system of clause 21, wherein the system is assembled on a further board with at least one other product component.

23. Computer-readable code for fabrication of the hardware accelerator according to any of clauses 1 to 9 or the processor according to any of clauses 10 to 19.

24. A computer program for controlling a host data processing apparatus to provide an instruction execution environment, the computer program comprising:

processing program logic to execute instructions; and accelerator control program logic to control at least one simulated hardware accelerator configurable, based on instructions executed by the processing program logic, to perform a delegated task; wherein:

in response to an address translation fault being detected for an accelerator-triggered memory access request triggered by a given simulated hardware accelerator and specifying a target virtual address, the accelerator control program logic is configured to issue a fault indication to the given simulated hardware accelerator via the control interface circuitry; and in response to an accelerator register read instruction processed by the processing program logic specifying the given simulated hardware accelerator and indicating that at least a portion of fault status register storage of the given simulated hardware accelerator is to be read in response to the accelerator register read instruction, the accelerator control program logic is configured to request return of fault status information specified in said at least a portion of the fault status register storage of the given simulated hardware accelerator, and to store the fault status information returned for the given simulated hardware accelerator in at least one software-readable storage location.

Various further examples are set out in the following clauses:

25. An apparatus, comprising:

processing circuitry to execute instructions;

accelerator control interface circuitry to exchange control signals with at least one hardware accelerator configurable, based on instructions executed by the processing circuitry, to perform a delegated task, the accelerator control interface circuitry comprising at least one memory-mapped control register for controlling the at least one hardware accelerator; and control register access circuitry to control access to the at least one memory-mapped control register; wherein for a set of aliasing physical addresses each corresponding to a different physical memory page, the control register access circuitry is configured to treat a first access request issued by the processing circuitry to access a first physical address in the set of aliasing physical addresses and a second access request issued by the processing circuitry to access a second physical address in the set of aliasing physical addresses as access requests to the same item of control state in a given memory-mapped control register.

26. The apparatus according to clause 25, wherein
for at least a distinguishing-permissions subset of the at least one memory-mapped control register, the control register access circuitry is configured to handle an access request to a given item of control state stored in the distinguishing-permissions subset of the at least one memory-mapped control register using access permissions selected depending on which physical address from the set of aliasing physical addresses is used to access the given item of control state.

27. The apparatus according to clause 26, wherein for the distinguishing-permissions subset of the at least one memory-mapped control register, the control register access circuitry is configured to select access permissions depending on a protection level associated with a physical address used to access the given item of control state;
wherein a physical address having a higher protection level has greater access privileges compared to a physical address having a lower protection level.

28. The apparatus according to clause 27, wherein the distinguishing-permissions subset of the at least one memory-mapped control register comprises a set of protection level control registers, each protection level control register for controlling operations at a particular protection level; and
the control register access circuitry is configured to prevent a physical address associated with a given protection level being used to access a given protection level control register for controlling operations at a protection level equal to or higher than the given protection level.

29. The apparatus according to any of clauses 25 to 28, wherein the control register access circuitry is configured to handle an access request to an item of control state stored in a given set of the at least one memory-mapped control register using access permissions determined based on access state stored in at least one other memory-mapped control register.

30. The apparatus according to clause 29, wherein the control register access circuitry is configured to select access state for determining access permissions for the item of control state depending on which physical address in the set of aliasing physical address is used to access the item of control state.

31. The apparatus according to any of clauses 29 and 30, wherein
the control register access circuitry is configured to associate a protection level with each physical address in the set of aliasing physical addresses for accessing an item of control state; and the at least one control register comprises a set of protection level control registers each for controlling operations at a particular protection level.

32. The apparatus according to clause 31, wherein the control register access circuitry is configured to determine said access permissions by combining access state stored in a selected subset of protection level control registers for controlling operations at a protection level equal to or higher than the protection level associated with the aliasing physical address used to access the item of control state.

33. The apparatus according to any of clauses 29 to 32, wherein the control register access circuitry is configured to control access to access state in a protection level control register based on a protection level associated with a physical address in the set of aliasing physical addresses used to access said protection level control register.

34. The apparatus according to any of clauses 29 to 33, wherein the given set of memory-mapped control registers comprises at least one of:
an event control register for indicating whether an event has occurred at the at least one hardware accelerator; and
a status control register for indicating a current status of a given hardware accelerator.

35. The apparatus according to any of clauses 25 to 34, wherein for at least a non-distinguishing-permissions subset of the at least one memory-mapped control register, the control register access circuitry is configured to handle an access request to the item of control state using the same access permissions regardless of which physical address in the set of aliasing physical addresses is used to access the item of control state.

36. The apparatus according to clause 35, wherein the non-distinguishing-permissions subset comprises at least one of:
a launch register which, when written to by the processing circuitry, controls the accelerator control interface circuitry to issue to a selected hardware accelerator a control signal;
a launch response register for indicating a launch response received from the selected hardware accelerator in response to the control signal; and
a data register for indicating a data payload packet to be transmitted to the selected hardware accelerator.

37. The apparatus according to any of clauses 25 to 36, comprising memory management circuitry to perform address translation from virtual addresses to physical addresses, wherein the memory management circuitry is configured to determine whether a memory access request issued by a particular software process to a given virtual address is permitted to access a given physical address in the set of aliasing physical addresses based on at least one of:
whether a page table entry mapping the given virtual address to the given physical address has been established; and
if a page table entry mapping the given virtual address to the given physical address has been established, page table permissions associated with a page of virtual memory comprising the given virtual address.

38. The apparatus according to any of clauses 25 to 37, comprising address storage configured to indicate a control register structure base address, addresses of each of the at least one memory-mapped control register being derivable from the control register structure base address.

39. The apparatus according to any of clauses 25 to 38 comprising access mapping circuitry to detect, based on selected bits of a physical address in the set of aliasing physical addresses, which protection level is associated with that physical address.

40. The apparatus according to any of clauses 25 to 39, in which the aliasing physical addresses corresponding to the same item of control state are at the same offset position within respective physical memory pages.

41. The apparatus according to any of clauses 25 to 40, wherein the physical memory pages corresponding to the set of aliasing physical addresses are at respective offsets from a register structure base address.

42. Computer-readable code for fabrication of the apparatus of any preceding clause.

43. A system comprising:
the apparatus of any of clauses 25 to 41, implemented in at least one packaged chip;
   at least one system component; and
   a board,
   wherein the at least one packaged chip and the at least one system component are assembled on the board.

44. A chip-containing product comprising the system of clause 43, wherein the system is assembled on a further board with at least one other product component.

45. A method, comprising:
   executing instructions with processing circuitry;
   exchanging control signals with at least one hardware accelerator configurable, based on instructions executed by the processing circuitry, to perform a delegated task; and for a set of aliasing physical addresses each corresponding to a different physical memory page, treating a first access request issued by the processing circuitry to access a first physical address in the set of aliasing physical addresses and a second access request issued by the processing circuitry to access a second physical address in the set of aliasing physical addresses as access requests to the same item of control state in a given memory-mapped control register.

46. A computer program for controlling a host data processing apparatus to provide an instruction execution environment, the computer program comprising:
   processing program logic to execute instructions;
   accelerator control interface program logic to control at least one simulated hardware accelerator configurable, based on instructions executed by the processing circuitry, to perform a delegated task, the accelerator control interface program logic comprising at least one memory-mapped control data structure for controlling the at least one simulated hardware accelerator; and
   control data structure access program logic to control access to the at least one memory-mapped control data structure; wherein
   for a set of aliasing simulated physical addresses each corresponding to a different simulated physical memory page, the control register access program logic is configured to treat a first access request issued by the processing program logic to access a first simulated physical address in the set of aliasing simulated physical addresses and a second access request issued by the processing program logic to access a second simulated physical address in the set of aliasing simulated physical addresses as access requests to the same item of control state in a given memory-mapped control data structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A hardware accelerator comprising:
   accelerator processing circuitry to perform a delegated task on behalf of a processor;
   control interface circuitry to exchange control signals with the processor to configure the accelerator processing circuitry to perform the delegated task;
   fault status register storage to store fault status information, the fault status register storage being readable by the processor based on an accelerator register read request received from the processor via the control interface circuitry; and
   control circuitry to:
      detect a fault indication received from the processor via the control interface circuitry indicating that a faulting accelerator-triggered memory access request, issued via the control interface circuitry to the processor and specifying a target virtual address, has encountered an address translation fault; and
      in response to detecting the fault indication, set fault status information in the fault status register storage to indicate information about the faulting accelerator-triggered memory access request that encountered the address translation fault.

2. The hardware accelerator according to claim 1, in which the control circuitry is configured to issue a status update message via the control interface circuitry to the processor to request that the processor updates software-readable accelerator status information associated with the hardware accelerator to a value specified by the status update message;
   the status update message supporting at least one encoding indicating that the software-readable accelerator status information associated with the hardware accelerator should be set to indicate to software executing on the processor that the hardware accelerator has encountered an address translation fault for at least one faulting accelerator-triggered memory access request.

3. The hardware accelerator according to claim 1, in which, in response to receipt of a resolve request received from the processor indicating that a cause of at least one address translation fault has been resolved, the control circuitry is configured to invalidate at least one item of fault status information in the fault status register storage relating to the at least one address translation fault indicated as being resolved.

4. The hardware accelerator according to claim 3, in which the resolve request specifies a resolve parameter specifying which address translation faults have been resolved and the control circuitry is configured to select which items of fault status information to invalidate based on the resolve parameter of the resolve request.

5. The hardware accelerator according to claim 3, in which, in response to receipt of the resolve request, the control circuitry is configured to:

determine whether there are any remaining address translation faults tracked in the fault status register storage which are still unresolved; and in response to determining that there are no remaining unresolved address translation faults tracked in the fault status register storage, issue a status update message via the control interface circuitry to the processor to request that the processor updates software-readable accelerator status information associated with the hardware accelerator to indicate that there are no longer any unresolved address translation faults associated with the hardware accelerator.

6. The hardware accelerator according to claim 1, in which the fault status register storage comprises:

a plurality of fault status registers each configurable to record fault status information about an address translation fault encountered for a corresponding page of virtual address space; and a fault status summary register to store fault status summary information specifying which of the plurality of fault status registers stores valid fault status information.

7. The hardware accelerator according to claim 1, in which the fault status register storage is configured to store fault status information associated with a given unresolved address translation fault, the fault status information comprising at least one of:

an indication of a virtual page address indicating a page of virtual address space comprising a target virtual address for which the unresolved address translation fault was encountered;

an indication of whether the unresolved address translation fault was caused by a read request or a write request; and an indication of whether the unresolved address translation fault was caused by an accelerator address translation context associated with the hardware accelerator being an inactive translation context not currently enabled by memory management circuitry of the processor.

8. The hardware accelerator according to claim 1, in which the control interface circuitry comprises at least one memory access request channel, each memory access request channel comprising:

an address path to issue a virtual address of an accelerator-triggered memory access request to the processing circuitry; and a response path to return a response message from the processing circuitry to the hardware accelerator in response to a corresponding accelerator-triggered memory access request for which the virtual address was issued over the address path; and the fault indication comprises the response message signalled on the response path having an encoding indicating that the corresponding accelerator-triggered memory access request encountered an address translation fault.

9. The hardware accelerator according to claim 1, in which the hardware accelerator is private to the processor.

10. A system comprising the hardware accelerator of claim 1 and a processor comprising:

control interface circuitry to exchange control signals with at least one hardware accelerator configurable, based on instructions executed by processing circuitry, to perform a delegated task; and control circuitry to:

in response to an address translation fault being detected for an accelerator-triggered memory access request received via the control interface circuitry from a given hardware accelerator and specifying a target virtual address, issue a fault indication to the given hardware accelerator via the control interface circuitry; and in response to an accelerator register read instruction specifying the given hardware accelerator and indicating that at least a portion of fault status register storage of the given hardware accelerator is to be read in response to the accelerator register read instruction:

issue an accelerator register read request via the control interface circuitry to the given hardware accelerator requesting that the given hardware accelerator returns fault status information specified in said at least a portion of the fault status register storage of the given hardware accelerator; and store the fault status information returned by the given hardware accelerator in at least one software-readable storage location.

11. A system comprising:

the hardware accelerator of claim 1 implemented in at least one packaged chip;

at least one system component; and a board, wherein the at least one packaged chip and the at least one system component are assembled on the board.

12. A chip-containing product comprising the system of claim 11, wherein the system is assembled on a further board with at least one other product component.

13. A non-transitory computer-readable storage medium comprising computer-readable code for fabrication of the hardware accelerator according to claim 1.

14. A processor comprising:

control interface circuitry to exchange control signals with at least one hardware accelerator configurable, based on instructions executed by processing circuitry, to perform a delegated task; and control circuitry to:

in response to an address translation fault being detected for an accelerator-triggered memory access request received via the control interface circuitry from a given hardware accelerator and specifying a target virtual address, issue a fault indication to the given hardware accelerator via the control interface circuitry; and in response to an accelerator register read instruction specifying the given hardware accelerator and indicating that at least a portion of fault status register storage of the given hardware accelerator is to be read in response to the accelerator register read instruction:

issue an accelerator register read request via the control interface circuitry to the given hardware accelerator requesting that the given hardware accelerator returns fault status information specified in said at least a portion of the fault status register storage of the given hardware accelerator; and store the fault status information returned by the given hardware accelerator in at least one software-readable storage location.

15. The processor according to claim 14, comprising accelerator status information storage circuitry to store software-readable accelerator status information corresponding to at least one hardware accelerator; in which:

the control circuitry is responsive to a status update message received from a given hardware accelerator via the control interface circuitry to update the software-readable accelerator status information associated with the given hardware accelerator to a value specified by the status update message; and in response to the status update message having at least one encoding indicating presence of an address translation fault, the control circuitry is configured to update the software-readable accelerator status information associated with the given hardware accelerator to indicate to software executing on the processor that the hardware accelerator has encountered an address translation fault for at least one faulting accelerator-triggered memory access request.

16. The processor according to claim 15, in which the status update message also supports at least one encoding indicating that software-readable accelerator status information should be updated to indicate that the software-readable accelerator status information is idle and has no uncompleted delegated tasks pending.

17. The processor according to claim 14, in which:

in response to a resolve instruction identifying a given hardware accelerator, the control circuitry is configured to issue a resolve request to the given hardware accelerator via the control interface circuitry to indicate that a cause of at least one address translation fault has been resolved and that the given hardware accelerator can invalidate at least one item of fault status information in the fault status register storage.

18. The processor according to claim 17, in which the resolve instruction specifies a resolve parameter specifying which address translation faults have been resolved.

19. The processor according to claim 17, in which the resolve instruction comprises a store instruction specifying store data and specifying a target address mapped to a memory-mapped launch control register, the store data having an encoding indicating that store instruction represents the resolve instruction.

20. The processor according to claim 14, in which the accelerator register read instruction comprises a store instruction specifying store data and specifying a target address mapped to a memory-mapped launch control register, the store data having an encoding indicating that the store instruction represents the accelerator register read instruction.

21. The processor according to claim 14, in which the at least one software-readable storage location comprises at least one memory-mapped register.

22. The processor according to claim 14, in which in response to the address translation fault being detected for the accelerator-triggered memory access request, the control circuitry is configured to issue the fault indication to the given hardware accelerator while allowing the processing circuitry to continue uninterrupted execution of instructions.

23. The processor according to claim 14, in which the fault status information read in response to the accelerator register read instruction indicates at least one of:

an indication of a virtual page address indicating a page of virtual address space comprising a target virtual address for which an unresolved address translation fault was encountered;

an indication of whether the unresolved address translation fault was caused by a read request or a write request;

an indication of whether the unresolved address translation fault was caused by an accelerator address translation context associated with the hardware accelerator not currently being enabled by memory management circuitry of the processor; and fault status summary information specifying which of a plurality of fault status registers of the given hardware accelerator specifies valid fault status information.

24. A non-transitory computer-readable storage medium comprising a computer program for controlling a host data processing apparatus to provide an instruction execution environment, the computer program comprising:

processing program logic to execute instructions; and accelerator control program logic to control at least one simulated hardware accelerator configurable, based on instructions executed by the processing program logic, to perform a delegated task; wherein:

in response to an address translation fault being detected for an accelerator-triggered memory access request triggered by a given simulated hardware accelerator and specifying a target virtual address, the accelerator control program logic is configured to issue a fault indication to the given simulated hardware accelerator via the control interface circuitry; and in response to an accelerator register read instruction processed by the processing program logic specifying the given simulated hardware accelerator and indicating that at least a portion of fault status register storage of the given simulated hardware accelerator is to be read in response to the accelerator register read instruction, the accelerator control program logic is configured to request return of fault status information specified in said at least a portion of the fault status register storage of the given simulated hardware accelerator, and to store the fault status information returned for the given simulated hardware accelerator in at least one software-readable storage location.

* * * * *